(12) United States Patent
Nohara

(10) Patent No.: US 7,553,249 B2
(45) Date of Patent: Jun. 30, 2009

(54) SPEED REDUCER, PRODUCTION METHOD FOR SPEED REDUCER, ROLLER BEARING, CRANKSHAFT AND PRODUCTION METHOD FOR CRANK SHAFT

(75) Inventor: Osamu Nohara, Tarui-cho (JP)

(73) Assignee: Nabtesco Corporation (JP)

( * ) Notice: Subject to any disclaimer, the term of this patent is extended or adjusted under 35 U.S.C. 154(b) by 409 days.

(21) Appl. No.: 11/526,518

(22) Filed: Sep. 25, 2006

(65) Prior Publication Data

US 2007/0072727 A1 Mar. 29, 2007

(30) Foreign Application Priority Data

Sep. 26, 2005 (JP) ............... 2005-278527
Dec. 7, 2005 (JP) ............... 2005-353269
Mar. 2, 2006 (JP) ............... 2006-055926

(51) Int. Cl.
*F16H 3/70* (2006.01)
(52) U.S. Cl. ............... 475/170; 475/162; 475/163; 475/166; 475/168; 475/179
(58) Field of Classification Search ............... 475/162, 475/163, 165, 166, 168, 170, 178, 179
See application file for complete search history.

(56) References Cited

U.S. PATENT DOCUMENTS

| | | | |
|---|---|---|---|
| 3,994,187 A | 11/1976 | Milenkovic | |
| 4,485,593 A | 12/1984 | Munzing et al. | |
| 4,599,922 A | 7/1986 | Behnke | |
| 4,909,102 A | 3/1990 | Haga | |
| 5,695,425 A | 12/1997 | Hashimoto et al. | |
| 5,795,080 A | 8/1998 | Fujiwara et al. | |
| 7,390,277 B2 * | 6/2008 | Egawa | 475/159 |
| 2003/0224893 A1* | 12/2003 | Tsurumi | 475/163 |

FOREIGN PATENT DOCUMENTS

| | | |
|---|---|---|
| DE | 729 777 | 12/1942 |
| DE | 30 11 358 A1 | 10/1981 |
| EP | 0 291 052 | 11/1988 |
| FR | 971246 | 1/1951 |
| GB | 752854 | 7/1956 |
| GB | 2 184 490 | 6/1987 |
| GB | 2 296 751 | 7/1996 |
| JP | 64-15556 | 1/1989 |
| JP | 2-261943 | 10/1990 |
| JP | 2003-83400 | 3/2003 |
| JP | 2004-36662 | 2/2004 |
| JP | 2005-265126 | 9/2005 |

* cited by examiner

*Primary Examiner*—David D. Le
(74) *Attorney, Agent, or Firm*—Gerald E. Hespos; Anthony J. Casella

(57) ABSTRACT

A speed reducer has a crankshaft to be rotated in conjunction with a drive unit. First through third eccentric portions are provided on the crankshaft. First through third externally-toothed gears are adapted to be moved respectively in conjunction with the first through third eccentric portions. Pin teeth are disposed along an inner periphery of a case to allow each of the first, second and third externally-toothed gears to be in meshing engagement therewith. An output shaft unit is adapted to be rotated in conjunction with the first, second and third externally-toothed gears. The first, second and third eccentric portions are arranged with a given phase difference in a rotation direction of the crankshaft with respect to each other. Each of the first, second and third externally-toothed gears is in meshing engagement with less than half of the plurality of pin teeth.

4 Claims, 29 Drawing Sheets

SPEED REDUCER, PRODUCTION METHOD FOR SPEED REDUCER, ROLLER BEARING, CRANKSHAFT AND PRODUCTION METHOD FOR CRANK SHAFT

BACKGROUND OF THE INVENTION

1. Field of the Invention

The present invention relates to a speed reducer designed to obtain an output rotation reduced from an input rotation and to be used for speed reduction in a robot, a traveling or revolving device for construction machines or the like, or a windmill.

2. Description of the Related Art

Heretofore, three has been known a differential/wobbling or oscillating type speed reducer, such as a cyclo speed reducer, which is designed to revolve an externally-toothed gear fitted onto an eccentric portion while being meshed with an internally-toothed gear, so as to obtain an output rotation reduced from an input rotation. Typically, in this differential/oscillating type speed reducer, a crankshaft is provided with two eccentric portions with a given phase difference therebetween, and two externally-toothed gears each fitted onto a corresponding one of the eccentric portions is in meshing engagement with the pin teeth. The pin teeth are arranged along an inner peripheral surface of a case at given circumferential intervals, and the phase difference between the two eccentric portions is set at 180 degrees. Thus, in conjunction with a rotation of the crankshaft, the two externally-toothed gears are revolved with the phase difference while being meshed with the pin teeth, so as to obtain an intended output rotation. Each of the pin teeth in meshing engagement with the externally-toothed gears is adapted to be rotated on its axis by a force received from each of the externally-toothed gears during the above movement. This prevents the externally-toothed gears from being slidingly moved relative to the pin teeth, so as to reduce a rotational resistance of the externally-toothed gears. In addition, the externally-toothed gears each designed to be in meshing engagement with the pin teeth in an angular range of 180 degrees make it possible to reduce a load to be imposed on each of the pin teeth.

There has also been known a differential/oscillating type speed reducer which is provided with three eccentric portions and three externally-toothed gears each arranged on a corresponding one of the eccentric portions, as disclosed, for example, in Japanese Patent Laid-Open Publication No. 64-15556. In this speed reducer, the three eccentric portions are arranged to have a phase difference of 120 degrees with respect to each other.

In a differential/oscillating type speed reducer provided with three externally-toothed gears as disclosed in the Japanese Patent Laid-Open Publication No. 64-15556, if each of the three externally-toothed gears is designed to be in meshing engagement with the pin teeth in an angular range of 180 degrees as in the conventional manner, the three externally-toothed gears will be in meshing engagement with the pin teeth in a total angular angle of 540 degrees. This means that there exist certain ones of the pin teeth are simultaneously in meshing engagement with two of the externally-toothed gears. Thus, each of the certain pin teeth simultaneously receives respective forces from the two externally-toothed gears, and these forces are different from each other in direction and magnitude. Consequently, at least one of the two externally-toothed gears will be slidingly moved relative to the certain pin teeth. As above, if a differential/oscillating type speed reducer is designed to have three externally-toothed gears under the condition that an angular range of meshing engagement between each of the externally-toothed gears and the pin teeth is set at 180 degrees without modification, the effect of allowing each of the pin teeth to be rotated on its axis so as to reduce a rotational resistance of the externally-toothed gears, as in the differential/oscillating type speed reducer provided with two externally-toothed gears, cannot be obtained to cause a problem about an increase in rotational loss of the differential/oscillating type speed reducer.

In the conventional differential/oscillating type speed reducer disclosed in the Japanese Patent Laid-Open Publication No. 64-15556, each of the three externally-toothed gears is fitted onto a corresponding one of the three eccentric portions of the eccentric shaft through a bearing comprising a retainer adapted to hold a plurality of rollers (rolling elements). Further, each of the three externally-toothed gears is in meshing engagement with an internally-toothed gear. Thus, when a certain torque is given from an input shaft to the externally-toothed gears through the respective eccentric portions of the eccentric shaft, the externally-toothed gears will be revolved while being meshed with the internally-toothed gear.

In this conventional differential/oscillating type speed reducer, the three eccentric portions have a phase difference with respect to each other. Thus, when one of the bearings is attached from the side of one end of the eccentric shaft along an axial direction of the eccentric shaft and then fitted onto an intermediate one of the eccentric portions, the rollers of the bearing are liable to interfere with the eccentric portion on the side of the end, i.e., the first eccentric portion. In order to avoid this interference, the retainer of the bearing is designed to have a wobbling movement for allowing the rollers to be displaced radially outward. Specifically, before the bearing is moved to pass through the first eccentric portion, the rollers of the bearing are displaced radially outward. Then, the bearing in this state is moved to pass through the first eccentric portion and fitted onto the intermediate eccentric portion. This allows the bearing to be moved along the eccentric shaft and fitted onto the intermediate eccentric portion having a phase difference relative to the remaining eccentric portions.

With a view to downsizing a differential/oscillating type speed reducer, a diameter of each of the externally-toothed gears is reduced to allow the differential/oscillating type speed reducer to have a smaller diameter, in some cases. In these cases, a load to be imposed from the eccentric portions of the eccentric shaft onto the rollers of the bearings is increased to cause a disadvantage of deterioration in durability of the rollers. As measures for solving this disadvantage, there has been known a so-called full-type roller bearing. This bearing is disclosed, for example, in Japanese Patent Laid-Open Publication No. 2005-265126.

In the bearing disclosed in the Japanese Patent Laid-Open Publication No. 2005-265126, only a plurality of rollers are disposed along an outer peripheral surface of an eccentric portion without interposing any other member therebetween. This makes it possible to increase the number of rollers to be disposed around the eccentric portion, so as to further disperse a load to be imposed from the eccentric portion onto each of the rollers to solve the above disadvantage. Further, the bearing disclosed in the Japanese Patent Laid-Open Publication No. 2005-265126 is provided with a plurality of presser arms for pressing each of the plurality of rollers disposed around the eccentric portion, inward from an outward side of the rollers. That is, the rollers are held by the presser arms so as not to fall out of the eccentric portion.

However, in the conventional differential/oscillating type speed reducer disclosed in the Japanese Patent Laid-Open Publication No. 64-15556, the retainer of the bearing to be fitted onto the intermediate eccentric portion is designed to have a wobbling movement, as mentioned above. Thus, even after the bearing is fitted onto the intermediate eccentric portion, the rollers of the bearing will wobble to cause a disadvantage of difficulty in arranging the rollers around the intermediate eccentric portion at even intervals.

As measures for solving this disadvantage, it is contemplated that only an intermediate one of the three eccentric portions is formed to have a larger diameter so as to absorb wobbling movements of the rollers to suppress wobbling movements of the rollers after the fitting of the bearing. However, in this structure, a mounting hole of the externally-toothed gear to be fitted onto the intermediate eccentric portion is required to be increased in diameter in conformity to a diameter of the intermediate eccentric portion. Consequently, among the three eccentric portions, only the intermediate eccentric portion will have a different configuration to cause problems about an increase in number of component types and complexities in production process and component management during production.

The full-type roller bearing disclosed in the Japanese Patent Laid-Open Publication No. 2005-265126 has a disadvantage in that there is the difficulty in suppressing inclination of the rollers when a certain force is applied from the eccentric portion to the rollers. Specifically, in the bearing disclosed in the Japanese Patent Laid-Open Publication No. 2005-265126, each of the presser arms is deformable in response to a certain force applied thereto, because one end of the presser arm is not fixed. Thus, when a certain force is applied from the eccentric portion to the rollers, the presser arms are displaced from their proper positions due to the force to cause a disadvantageous phenomenon that each of the rollers wobbles and inclines in an oblique direction. If the roller inclines in an oblique direction, an excessive load is likely to be imposed from the eccentric portion onto the roller to cause a problem about breakage of the roller.

Heretofore, there has been a camshaft integrally having a plurality of cams. This camshaft is disclosed, for example, in Japanese Patent Laid-Open Publication No. 2004-36662.

In the camshaft disclosed in the Japanese Patent Laid-Open Publication No. 2004-36662, a camshaft material is subjected to a polishing process using a grindstone or the like, to form each portion of the camshaft into a given shape. In a camshaft designed such that first and second adjacent cams are disposed closer to each other, when an edge of the first cam is formed, an accurate polishing operation is likely to be hindered by interference between the grindstone and the second cam. Thus, the above conventional camshaft is designed such that first and second adjacent cams are disposed spaced apart from each other by a given distance, and connected to each other by a shaft portion formed in a given area less than an overlapping area between the first and second cams when viewed in an axial direction of the camshaft. More specifically, in this camshaft, the first and second adjacent cams are connected to each other through the shaft portion in such a manner as to avoid interference between a grindstone and a camshaft material even if the grindstone protrudes toward the second cam during an operation of polishing an edge of the first cam. Thus, the cams including edges thereof can be subjected to a polishing process with a high degree of accuracy.

The structure of the camshaft disclosed in the Japanese Patent Laid-Open Publication No. 2004-36662 may be applied to the crankshaft integrally formed with the plurality of eccentric portions each having a different rotational phase. In this case, a connection portion for connecting the adjacent eccentric portions to each other is formed in a given area less than an overlapping area between the adjacent eccentric portions when viewed in an axial direction of the crankshaft. However, in this structure, a sectional area of the connection portion becomes smaller, and therefore the strength of the connection portion will be lowered. This causes a problem about deterioration in strength of the crankshaft.

Heretofore, there has also been known a differential/oscillating type speed reducer designed to revolve an externally-toothed gear member while being meshed with an internally-toothed gear member, through an eccentric portion, so as to obtain an output rotation reduced or increased from an input rotation. This differential/oscillating type speed reducer is disclosed, for example, in Japanese Patent Laid-Open Publication No. 2003-83400. As shown in FIGS. 34 and 35, the differential/oscillating type speed reducer disclosed in the Japanese Patent Laid-Open Publication No. 2003-83400 comprises a cylindrical-shaped outer case (internally-toothed gear member) 381 provided with internal teeth 381*a* along an inner periphery thereof, a carrier 382 disposed coaxially with the outer case 381 in a rotatable manner relative to the outer case 381, and a pinion (externally-toothed gear member) 383 in meshing engagement with the internal teeth 381*a* of the outer case 381. The carrier 382 serves as an output shaft, and includes a base member 382*a*, a sectionally approximately-triangular-shaped column portion 382*b* provided on the base member 382*a*, and an end plate 382*c* fastened to the column portion 382*b*. Two of the pinions 383 are disposed in an axial direction of the outer case 381. Each of the pinions 383 is penetrated by the column portion 382*b* and a crankshaft 384 provided with an eccentric portion 384*a*. Four of the crankshafts 384 and four of the column portions 382*b* are arranged in a circumferential direction of the outer case 381. Each of the crankshafts 384 is rotatably supported by a pair of upper and lower crankshaft bearings 385, 386 disposed, respectively, at upper and lower ends thereof. The upper crankshaft bearings 385 are provided on the end plate 382*c*, and the lower crankshaft bearings 386 are provided on the base member 382*a*. Each of the crankshafts 384 is adapted to be rotated in conjunction with an input shaft 388 through a gear 387. When the crankshafts 384 are rotated in conjunction with a rotation of the input shaft 388, each of the pinions 383 is revolved while being meshed with the internal teeth 381*a* of the outer case 381, according to a rotation of a corresponding one of the eccentric portions 384*a*. Then, according to the revolutions of the pinions 383, the column portions 382*b* are revolved to rotate the carrier 382.

An attempt to reduce an outer diameter of the above differential/oscillating type speed reducer involves the need for arranging each of the crankshafts 384 at a position closer to the axis of the outer case 381 and reducing each diameter of the pinions 383. In this case, when each of the crankshafts 384 is arranged at a position closer to the axis of the outer case 381, a load acting on each of the crankshafts 384 will be increased. Further, when each diameter of the pinions 383 is reduced, a load acting on each of the pinions 383 will be increased, and therefore a load acting on each of the crankshafts 384 through the pinions 383 will be increased. Thus, an attempt to reduce an outer diameter of the differential/oscillating type speed reducer while maintaining an output torque involves the need for increasing a supporting rigidity for each of the crankshafts 384. To this end, the crankshaft bearings 385, 386 are inevitably increased in size to place limits on reduction in outer diameter of the differential/oscillating type speed reducer.

SUMMARY OF THE INVENTION

It is an object of the present invention to provide a speed reducer capable of solving the above problems.

It is another object of the present invention to provide a speed reducer having three externally-toothed gears arranged therein, capable of suppressing an increase in rotational loss.

According to a first aspect of the present invention, there is provided a speed reducer which comprises a crankshaft adapted to be rotated in conjunction with a drive unit, a first eccentric portion provided on the crankshaft, a second eccentric portion provided on the crankshaft, a third eccentric portion provided on the crankshaft, a first externally-toothed gear adapted to be moved in conjunction with the first eccentric portion, a second externally-toothed gear adapted to be moved in conjunction with the second eccentric portion, a third externally-toothed gear adapted to be moved in conjunction with the third eccentric portion, a plurality of pin teeth disposed along an inner periphery of a case to allow each of the first, second and third externally-toothed gears to be in meshing engagement therewith, and an output shaft unit adapted to be rotated in conjunction with the first, second and third externally-toothed gears. The first, second and third eccentric portions are arranged with a given phase difference in a rotation direction of the crankshaft with respect to each other. In this speed reducer, each of the first, second and third externally-toothed gears is in meshing engagement with less than half of the plurality of pin teeth.

It is yet another object of the present invention to provide a speed reducer capable of allowing a bearing member to be readily moved along an eccentric shaft and fitted on an intermediate one of three eccentric portions, and simplifying a production process and a component management during production.

According to a second aspect of the present invention, there is provided a speed reducer which comprises an eccentric shaft provided with a first eccentric portion, a second eccentric portion and a third eccentric portion in a serial arrangement along an axial direction thereof and adapted to be rotated in conjunction with an input shaft, a first externally-toothed gear attached to the first eccentric portion through a first bearing and adapted to be oscillatingly moved in conjunction with the first eccentric portion, a second externally-toothed gear attached to the second eccentric portion through a second bearing and adapted to be oscillatingly moved in conjunction with the second eccentric portion, a third externally-toothed gear attached to the third eccentric portion through a third bearing and adapted to be oscillatingly moved in conjunction with the third eccentric portion, and an output shaft unit adapted to be rotated in conjunction with the first, second and third externally-toothed gears. In this speed reducer, the first, second and third eccentric portions are arranged to have a given phase difference with respect to each other and formed to have substantially the same outer diameter, and the first bearing, the second bearing and the third bearing are attached, respectively, to the first eccentric portion, the second eccentric portion and the third eccentric portion, in such a manner as to have substantially the same outer diameter. Further, the second bearing includes a plurality of rollers, and a retainer holding the plurality of rollers around the second eccentric portion at given intervals while holding at least one of the plurality of rollers detachably in a radially outward direction or an axial direction of the second eccentric portion.

It is still another object of the present invention to provide a roller bearing capable of solving the aforementioned problems.

It is yet still another object of the present invention to provide a roller bearing capable of ensuring enhanced durability of rollers and suppressing damages in the rollers.

According to a third aspect of the present invention, there is provided a roller bearing for supporting a shaft member inserted into a circular-shaped through-hole formed in a given member. The roller bearing comprises a plurality of rollers each disposed between an inner wall surface of the through-hole and an outer peripheral surface of the shaft member, and a retainer for holding the plurality of rollers around the shaft member. The retainer includes a pair of circular ring portions adapted to be fitted onto the shaft member or into the through-hole at positions adjacent, respectively, to axially opposite ends of each of the plurality of rollers so as to restrict an axial movement of the plurality of rollers, and a column portion having opposite ends each connected to a corresponding one of the pair of circular ring portions. The column portion is disposed between first and second ones of the plurality of rollers which are located in adjacent relation to each other, to restrict a movement of the plurality of rollers in a circumferential direction of the shaft member. The retainer includes a plurality of the column portions disposed along a circumferential direction of the circular ring portions at given intervals while interposing at least two or more of the plurality of rollers between adjacent ones of the column portions.

It is another further object of the present invention to provide a crankshaft capable of solving the aforementioned problems.

It is still a further object of the present invention to provide a crankshaft capable of accurately polishing an eccentric portion including an edge thereof and ensuring enhanced strength thereof.

According to a fourth aspect of the present invention, there is provided a crankshaft which integrally comprises a first shaft portion adapted to be rotatably supported by a bearing, a second shaft portion formed to have an axis located coaxially with an axis of the first shaft portion and adapted to be rotatably supported by a bearing, a plurality of eccentric portions provided between the first shaft portion and the second shaft portion and each formed to have an axis eccentrically deviated from the axes of the first and second shaft portions, and a connection portion provided between adjacent ones of the eccentric portions to connect the adjacent eccentric portions to each other. In this crankshaft, each of the adjacent eccentric portions has a different rotational phase, and the connection portion has a concave region formed to continue from a first one of the adjacent eccentric portions and located radially inward relative to the first eccentric portion. The connection portion is formed at least over an overlapping area between the adjacent eccentric portions and an area of the other second eccentric portion protruding from the overlapping area, when viewed in an axial direction of the first and second shaft portions. Further, the connection portion has an outer periphery partially defined by an arc which extends within the protruding area of the second eccentric portion and has a center located coaxially with the axis of the first eccentric portion, in a section perpendicular to the axial direction.

It is an additional object of the present invention to provide a speed reducer having a reduced diameter based on improvement in a support structure of a crankshaft.

According to a fifth aspect of the present invention, there is provided a speed reducer which comprises an input shaft member, a crankshaft provided with an eccentric portion and adapted to be rotated in conjunction with the input shaft member, a pair of crankshaft bearings supporting the crankshaft, an internally-toothed gear member having internal teeth disposed around at least a part in an axial direction of an inner peripheral portion thereof, an externally-toothed gear member adapted to be oscillatingly moved in conjunction with the eccentric portion and provided with external teeth in meshing engagement with the internal teeth, an output shaft unit adapted to be rotated in conjunction with the externally-toothed gear member, and an intermediate bearing member rotatably supporting the crankshaft at a position between the pair of crankshaft bearings.

DETAILED DESCRIPTION OF THE PREFERRED EMBODIMENTS

Figure 1:
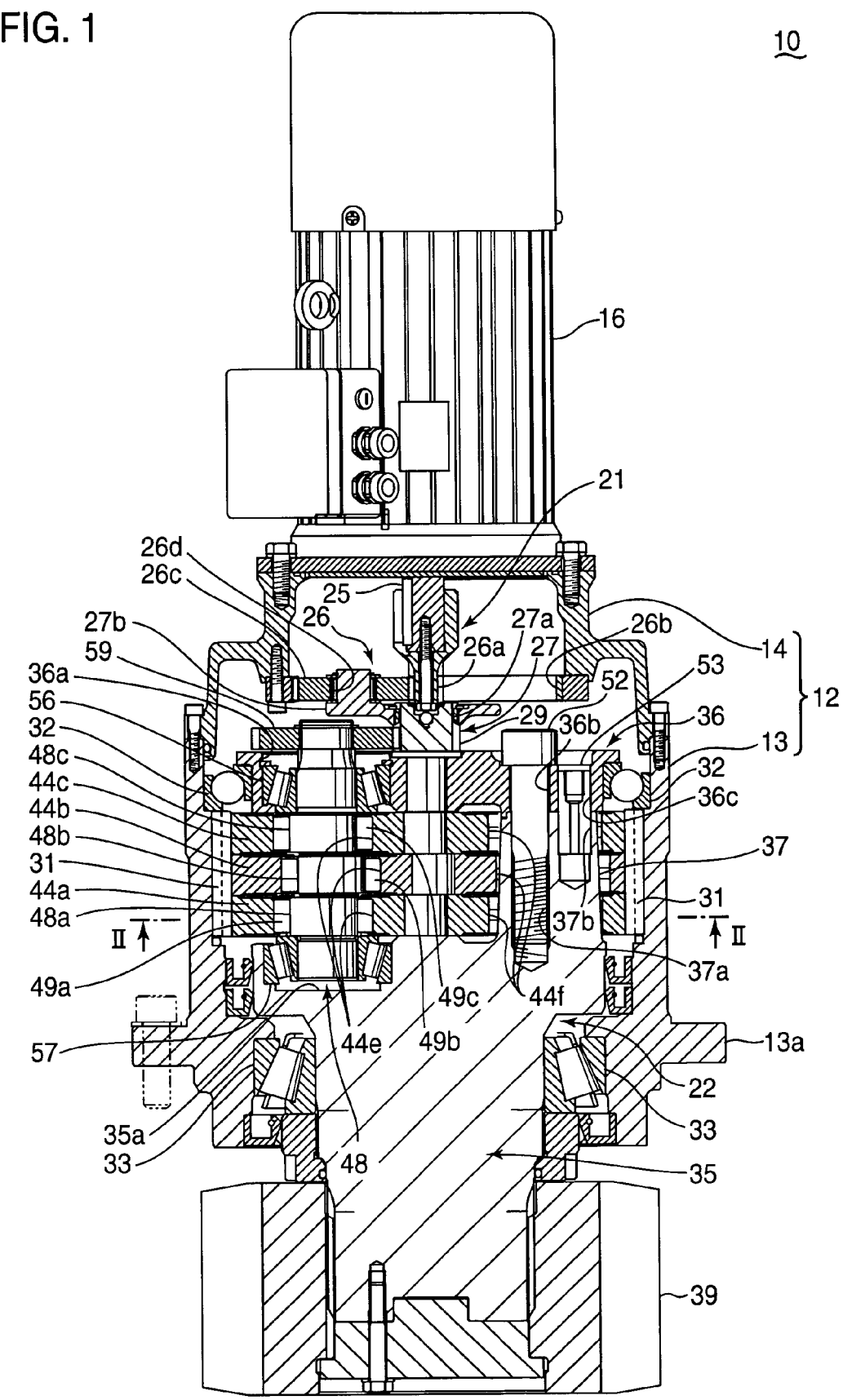
FIG. 1 is a sectional view showing the entire structure of a differential/oscillating type speed reducer according to a first embodiment of the present invention.

With reference to the drawings, a preferred embodiment of the present invention will now be specifically described.

First Embodiment

A differential/oscillating type speed reducer (hereinafter referred to simply as "speed reducer") 10 according to a first embodiment of the present invention is designed for use, for example, as a pitch controller of wind power generation equipment. The speed reducer 10 may also be used for speed reduction in a robot, a traveling or revolving device for construction machines or the like, etc. The speed reducer 10 includes an outer case 12. This outer case 12 is composed of a cylinder member 13 formed in a cylindrical shape, and a cover 14 formed in a bottomed tubular shape, which are fastened together. The cylinder member 13 is formed with a flange 13a for allowing the speed reducer 10 to be mounted to a stationary frame (not shown), for example, of power generation equipment. The cylinder member 13 is fastened to the stationary frame through the flange 13a. A drive motor 16 serving as a drive unit is fixed to the cover 14.

The speed reducer 10 includes an input shaft 21, and a carrier 22 as one example of an output shaft unit. A drive shaft 25 of the drive motor 16 is coupled to the input shaft 21 to give a rotational driving force from the drive motor 16 to the input shaft 21. The carrier 22 is disposed to be rotatable about the same axis as that of the input shaft 21. For example, the speed reducer 10 may be disposed such that the input shaft 21 is located on an upper side, and the carrier 22 is located on a lower side, as shown in FIG. 1. In this case, the carrier 22 will be rotated about a vertical axis. The following description will be made on the assumption that the speed reducer 10 is disposed in this posture.

The input shaft 21 includes a speed reduction mechanism 26 for reducing a rotational speed by a given ratio relative to the drive shaft 25 of the drive motor 16, and an intermediate shaft unit 27 adapted to receive a driving force through the speed reduction mechanism 26. The drive shaft 25 extends downward from the drive motor 16 and penetrates through a central region of the cover 14. The drive shaft 25 is rotatably supported relative to the cover 14 by a bearing (not shown).

The speed reduction mechanism 26 comprises a sun gear 26a fixed to a lower end of the drive shaft 25, an internally-toothed gear 26b fixed to an inner surface of a sidewall of the cover 14, and a planetary gear 26c in meshing engagement with the sun gear 26a and the internally-toothed gear 26b. The planetary gear 26c is adapted to be revolved around the sun gear 26a along with a rotation of the drive shaft 25.

The intermediate shaft unit 27 comprises an intermediate shaft body 27a disposed coaxially with the drive shaft 25, and an arm 27b extending radially outward from the intermediate shaft body 27a. The intermediate shaft body 27a is disposed immediately below the drive shaft 25 and rotatably supported by an after-mentioned end plate member 36. The arm 27b has a distal end inserted through a through-hole 26d formed in a central region of the planetary gear 26c. In conjunction with the revolution of the planetary gear 26c, the arm 27b is revolved, and thereby the intermediate shaft body 27a is rotated at a rotational speed reduced by the given ratio relative to a rotational speed of the drive shaft 25. The intermediate shaft body 27a has a lower portion provided with an externally-toothed drive gear 29.

A plurality of pin teeth 31 are arranged circumferential over the entire inner peripheral portion of an axially intermediate region of the cylinder member 13. Each of the pin teeth 31 is disposed to extend in the axial direction, and the pin teeth 31 are arranged at even intervals. Each of the pin teeth 31 serves as an internal tooth of an internally-toothed gear, and the cylinder member 13 constitutes an internally-toothed gear having internal teeth disposed along an inner peripheral portion thereof.

The carrier 22 is disposed radially inside the cylinder member 13. The carrier 22 is rotatably supported by the cylinder member 13 through two bearings 32, 33 disposed in axially spaced-apart relation to each other. The carrier 22 is adapted to be rotated about an axis coaxial with an axis of the cylinder member 13.

The carrier 22 comprises a base member 35, an end plate member 36 disposed above the base member 35, and a shaft portion 37 integrally formed with the base member 35 to extend toward the end plate member 36. The base member 35 has a lower end formed to protrude downward from the cylinder member 13. A transfer gear 39 is fitted onto the lower end of the base member 35 in such a manner that it is disposed coaxially with the axis of the cylinder member 13. The transfer gear 39 is adapted to give a rotational driving force, for example, to a pivot shaft of wind power generation equipment.

Figure 2:
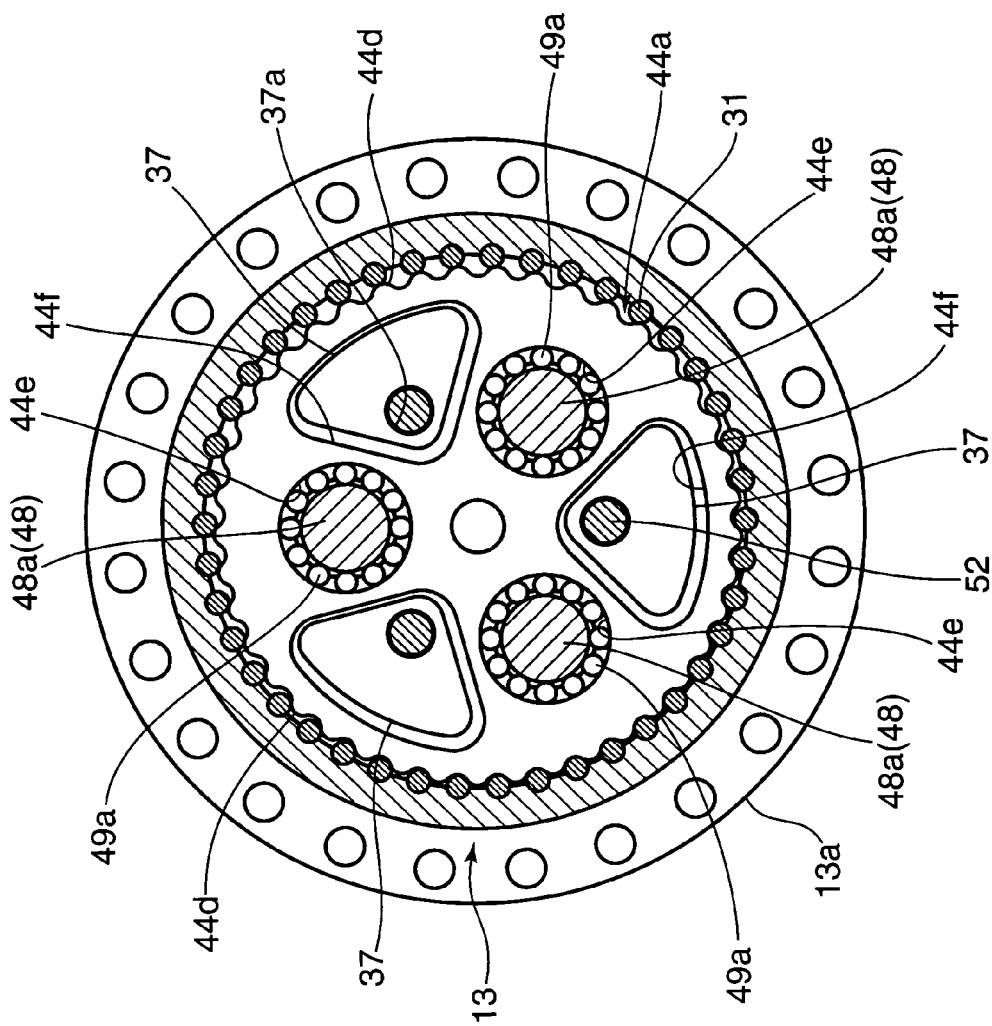
FIG. 2 is a sectional view taken along the line II-II in FIG. 1.

The shaft portion 37 is formed in a columnar shape extending axially upward from a top surface of the base member 35. As shown in FIG. 2, the carrier 22 has three of the shaft portions 37 arranged in a circumferential direction of the base member 35 at given intervals, and each of the shat portions 37 is formed in a sectionally approximately-triangular shape.

Each of the shaft portions 37 is formed with a bottomed bolt hole 37a, as shown in FIG. 1, and the end plate member 36 is formed with three bolt insertion holes 36b at respective positions corresponding to the bolt holes 37a. Then, three bolts 52 are inserted through the bolt insertion holes 36b and screwed with the bolt holes 37a of the shaft portions 37a, respectively. Further, each of the shaft portions 37 is formed with a pin hole 37b, and the end plate 36 is formed with three pin holes 36c at respective positions corresponding to the pin holes 37b. Then, three pins 53 are inserted across the pin holes 37b and the corresponding pin holes 36c, respectively. In this manner, the base member 35 and the end plate member 36 are fastened together to avoid a displacement therebetween. Thus, the base member 35 and the end plate member 36 can be integrally rotated about the axis of the cylinder member 13.

On the inside of the cylinder member 13, a closed space is defined between the base member 35 and the end plate member 36. A first externally-toothed gear 44a, a second externally-toothed gear 44b and a third externally-toothed gear 44c are disposed within the closed space in this order in an upward direction. Each of the first, second and third externally-toothed gears 44a, 44b, 44c has the same shape and the same outer diameter. The externally-toothed gear (44a, 44b or 44c) is formed to have an outer diameter slightly less than an inner diameter of the cylinder member 13, and formed with a plurality of external teeth 44d (see FIG. 2) meshingly engageable with the pin teeth 31 of the cylinder member 13. The number of external teeth 44d of the externally-toothed gear (44a, 44b or 44c) is set to be slightly less than that of the pin teeth 31, for example, only by one.

A crankshaft 48 is disposed to penetrate through the first to third externally-toothed gears 44a to 44c. The speed reducer 10 has three of the crankshafts 48 arranged in the circumferential direction at given intervals (see FIG. 2). As shown in FIG. 1, each of the crankshafts 48 is rotatably supported by a pair of upper and lower crankshaft bearings 56, 57. The upper crankshaft bearing 56 is fitted into a through-hole 36a formed in the end plate member 36. The lower crankshaft bearing 57 is fitted into a concave portion 35a formed in the top surface of the base member 35. In other words, each of the crankshafts 48 has an upper portion supported by the end plate member 36 through the upper crankshaft bearing 56, and a lower portion supported by the base member 35 through the lower crankshaft bearing 57.

Each of the crankshafts 48 has an upper end protruding upward from the upper crankshaft bearing 56, and the upper end is provided with an externally-toothed driven gear 59. Each of the externally-toothed driven gears 59 is in meshing engagement with the externally-toothed drive gear 29. Thus, each of the crankshafts 48 is revolved together with a corresponding one of the externally-toothed driven gears 59 while being rotated at a speed reduced by a gear ratio between the externally-toothed drive gear 29 and the externally-toothed driven gear 59.

Each of the crankshafts 48 is formed with three eccentric portions 48a, 48b, 48c. These eccentric portions 48a, 48b, 48c are arranged along the axial direction. Specifically, the first eccentric portion 48a, the second eccentric portion 48b and the third eccentric portion 48c are disposed in this order in an upward direction. Each of the first to third eccentric portions 48a to 48c is formed in a columnar shape having an axis deviated from an axis of the crankshaft 48 by the same eccentric distance. Further, the first to third eccentric portions 48a to 48c are formed to have substantially the same outer diameter, and a phase difference of 120 degrees with respect to each other.

The first externally-toothed gear 44a, the second externally-toothed gear 44b and the third externally-toothed gear 44c are fitted, respectively, onto the first eccentric portion 48a, the second eccentric portion 48b and the third eccentric portion 48c. Except for the phase difference, the first to third eccentric portions 48a to 48c have the same configuration.

As shown in FIG. 2, each of the first to third externally-toothed gears 44a, 44b, 44c is formed with a first through-hole 44e and a second through-hole 44f. The first through-hole 44e is formed correspondingly to the crankshaft 48. That is, three of the first through-holes 44e are formed in each of the first to third externally-toothed gear 44a, 44b, 44c in the circumferential direction at even intervals. Each of the first through-holes 44e is formed in a circular shape. Specifically, the first eccentric portion 48a in each of the crankshafts 48 is inserted into a corresponding one of the first through-holes 44e of the first externally-toothed gear 44a through a first bearing 49a. In the same manner, the second eccentric portion 48b is inserted into a corresponding one of the first through-holes 44e of the second externally-toothed gear 44b through a second bearing 49b, and the third eccentric portion 48c is inserted into a corresponding one of the first through-holes 44e of the third externally-toothed gear 44c through a third bearing 49c.

The second through-hole 44f of the first to third externally-toothed gears 44a, 44b, 44c is designed to allow the shaft portion 37 to be inserted thereinto. Specifically, the second through-hole 44f is formed in an approximately triangular shape having an area greater than a sectional area of the shaft portion 37 to define a given gap therebetween. The second through-hole 44f is formed correspondingly to the shaft portion 37. That is, three of the second through-holes 44f are formed in each of the first to third externally-toothed gears 44a to 44c in the circumferential direction at even intervals.

Figure 3:
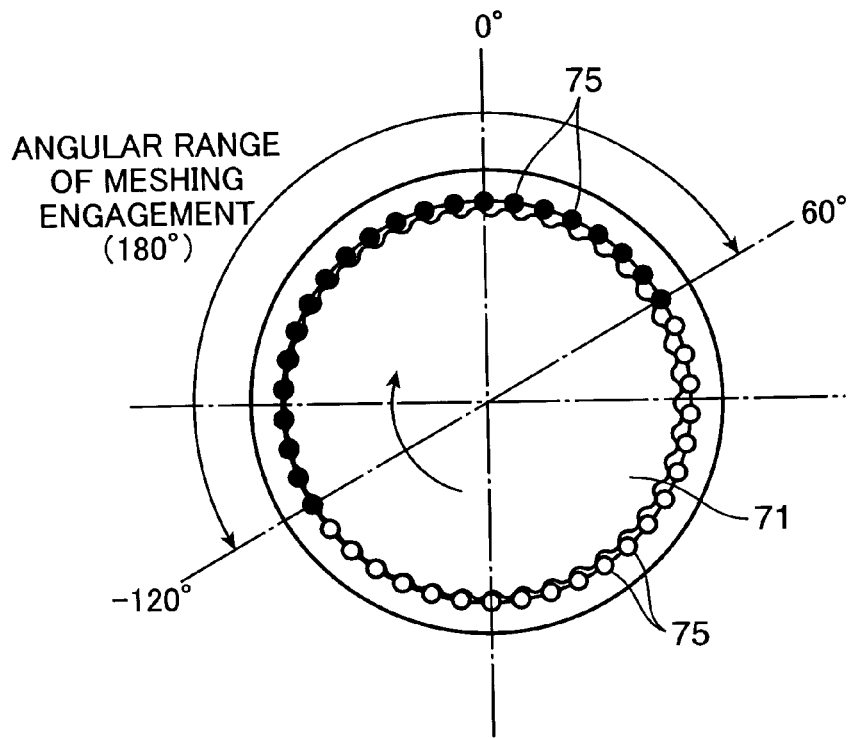
FIG. 3 is an explanatory diagram showing a state when a first externally-toothed gear is in meshing engagement with pin teeth located at a phase angle ranging from −120 degrees (or 240 degrees) to 60 degrees, in a conventional differential/oscillating type speed reducer.
Figure 4:
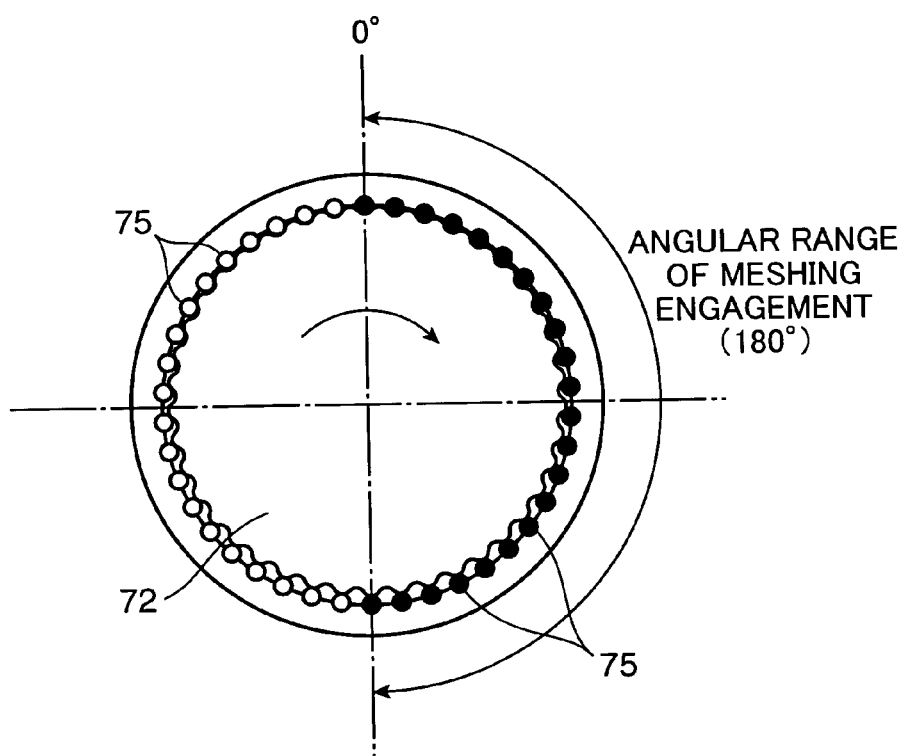
FIG. 4 is an explanatory diagram showing a state when a second externally-toothed gear is in meshing engagement with pin teeth located at a phase angle ranging from zero degree to 180 degrees, in the conventional speed reducer.
Figure 5:
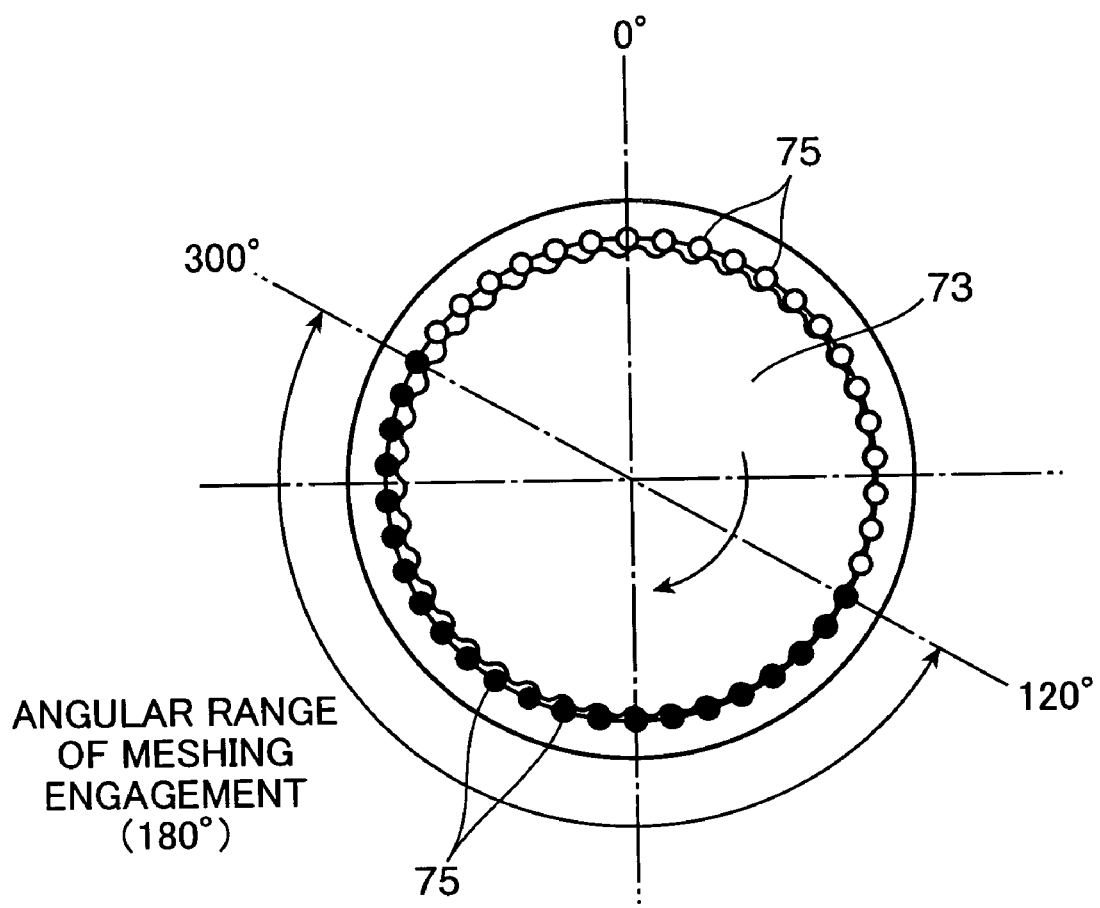
FIG. 5 is an explanatory diagram showing a state when a third externally-toothed gear is in meshing engagement with pin teeth located at a phase angle ranging from 120 degrees to 300 degrees, in the conventional speed reducer.
Figure 6:
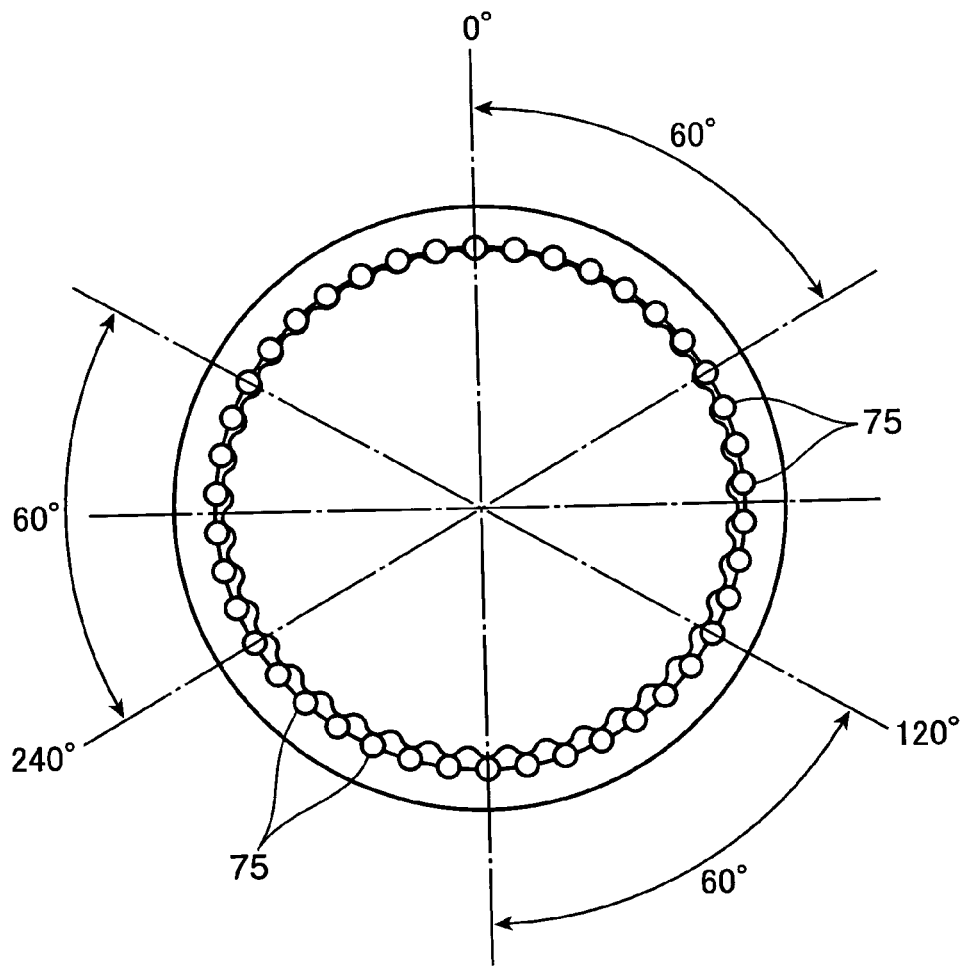
FIG. 6 is an explanatory diagram of an angular range where the plurality of externally-toothed gears are overlappingly in meshing engagement with pin teeth, in the conventional speed reducer.
Figure 7:
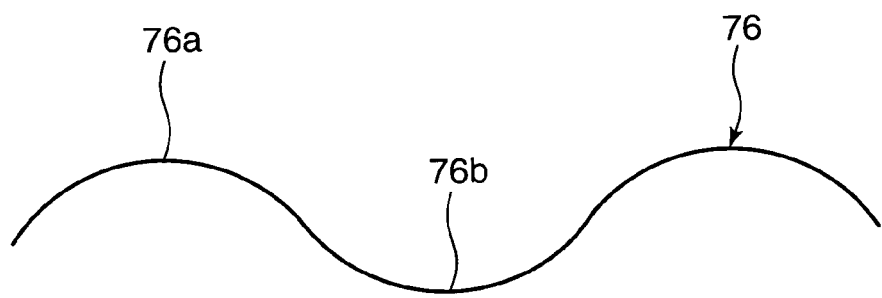
FIG. 7 is a schematic diagram partially showing a teeth profile of the externally-toothed gear in the conventional speed reducer.

A difference between the speed reducer 10 according to the first embodiment and a conventional speed reducer will be described below. As shown in FIGS. 3 to 5, in the conventional speed reducer, each of first, second and third externally-toothed gears 71, 72, 73 is in meshing engagement with pin teeth 75 in an angular range of 180 degrees. For example, given that the number of pin teeth 75 is forty two, twenty one of the pin teeth 75 is in contact with each of the externally-toothed gears 71, 72, 73. In this state, the externally-toothed gears 71, 72, 73 are arranged with a phase difference of 120 degrees with respect to each other. For example, when the first externally-toothed gear 71 is in meshing engagement with pin teeth 75 located at a phase angle ranging from −120 degrees (or 240 degrees) to 60 degrees (see FIG. 3), the second externally-toothed gear 72 is in meshing engagement with pin teeth 75 located at a phase angle ranging from zero degree to 180 degrees (see FIG. 4), and the third externally-toothed gear 73 is in meshing engagement with pin teeth 75 located at a phase angle ranging from 120 degrees to 300 degrees (see FIG. 5). Thus, as shown in FIG. 6, the first and second externally-toothed gears 71, 72 are in meshing engagement with pin teeth 75 located at a phase angle ranging from zero degree to 60 degrees, and the second and third externally-toothed gears 72, 73 are in meshing engagement with pin teeth 75 located at a phase angle ranging from 120 degrees to 180 degrees. Further, the first and third externally-toothed gears 71, 73 are in meshing engagement with pin teeth 75 located at a phase angle ranging from 240 degrees to 300 degrees. That is, two of the externally-toothed gears 71, 72, 73 are overlappingly in meshing engagement with the above pin teeth 75.

When a certain one of the pin teeth 75 is meshed with either one of the first to third externally-toothed gears 71 to 73, the certain pin tooth 75 is rotated on its axis by a force received from the externally-toothed gear. If two of the first to third externally-toothed gears 71 to 73 are overlappingly in meshing engagement with the certain pin tooth 75, at least one of the two externally-toothed gears will be slidingly moved relative to the certain pin tooth 75, because respective forces received from the two externally-toothed gears are different from each other in direction and magnitude. In the first to third externally-toothed gears 71 to 73, each of a tip 76a and a root 76b of each external tooth 76 has a curved shape.

Figure 8:
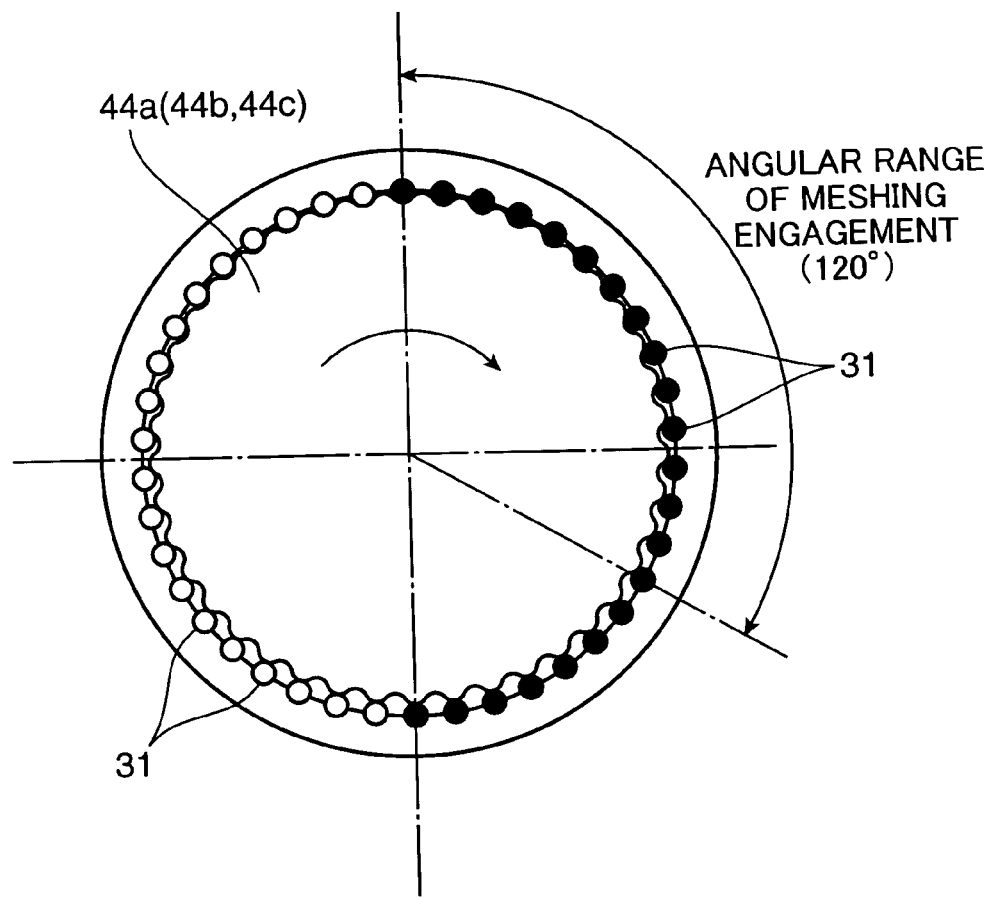
FIG. 8 is an explanatory diagram of an angular range where one of a plurality of externally-toothed gears is in meshing engagement with pin teeth, in the speed reducer according to the first embodiment.

In contrast, the speed reducer 10 according to the first embodiment is designed such that only one of the first to third externally-toothed gears 44a to 44c is meshed with one of the pin teeth 31 even if each of the first to third externally-toothed gears 44a to 44c is at any phase position. Specifically, the cylinder member 13 is provided with forty two of the pin teeth 31, and each of the first to third externally-toothed gears 44a to 44c is provided with the same number of external teeth. Further, three groups each consisting of fourteen of the pin teeth 31 are in contact with and in meshing engagement with the first to third externally-toothed gears 44a to 44c, respectively. More specifically, as shown in FIG. 8, each of the first to third externally-toothed gears 44a to 44c is in meshing engagement with pin teeth 31 in an angular range of 120 degrees, and the first to third externally-toothed gears 44a to 44c are arranged with a phase difference of 120 with respect to each other. Thus, two or more of the first to third externally-toothed gears 44a to 44c are almost never simultaneously in contact with a certain one of the pin teeth 31.

Figure 9:
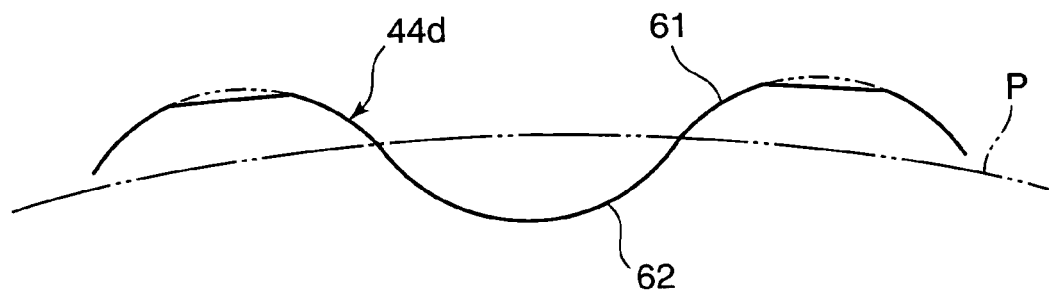
FIG. 9 is a schematic diagram partially showing a teeth profile of the externally-toothed gear in the speed reducer according to the first embodiment.

As above, in order to allow first, second and third one-thirds of the entire pin teeth 31 to be in meshing engagement, respectively, with the first, second and third externally-toothed gears 44a, 44b, 44c, each of the first to third externally-toothed gears 44a to 44c is designed to have external teeth each formed such that a length of an addendum 61 is less than that of a dedendum 62, as shown in FIG. 9. Further, a tip of the external tooth is formed in a flat shape or a gentle curved shape.

In order to allow the addendum 61 to have a length less than that of the dedendum 62, each of the first to third externally-toothed gears 44a to 44c may be subjected to a post-machining process for shaving off the tip 76a of the addendum 61 on the outside of a pitch circle P. The process of shaving off the tip 76a can be performed without difficulty. In the post-machining process, an existing externally-toothed gear may be used. Instead of the post-machining process, external teeth 44d having a profile as shown in FIG. 9 may be formed in advance.

An operation of the speed reducer 10 according to the first embodiment will be described below.

In response to a rotation of the drive shaft 25 of the drive motor 16, the externally-toothed gear drive gear 29 is rotated at a speed reduced by the given speed reduction ratio through the speed reduction mechanism 26. In conjunction with the rotation of the externally-toothed gear drive gear 29, each of the externally-toothed gear driven gears 59 is rotated. A speed of the externally-toothed gear driven gear 59 is reduced relative to the speed of the externally-toothed gear drive gear 29 by the given speed reduction ratio. In conjunction with the respective rotations of the externally-toothed gear driven gears 59, each of the crankshafts 48 is rotated together with a corresponding one of the externally-toothed gear driven gears 59. Thus, the first to third eccentric portions 48a to 48c are rotated, and thereby the first to third externally-toothed gears 44a to 44c are oscillatingly revolved while being meshed with the pin teeth 31. In this process, first, second and third one-thirds of the pin teeth 31 are meshed, respectively, with the first, second and third externally-toothed gears 44a, 44b, 44c, and each of the first to third externally-toothed gears 44a to 44c will be revolved while maintaining this meshing engagement. Thus, two or more of the first to third externally-toothed gears 44a to 44c are almost never simultaneously in contact with a certain one of the pin teeth 31.

Figure 10:
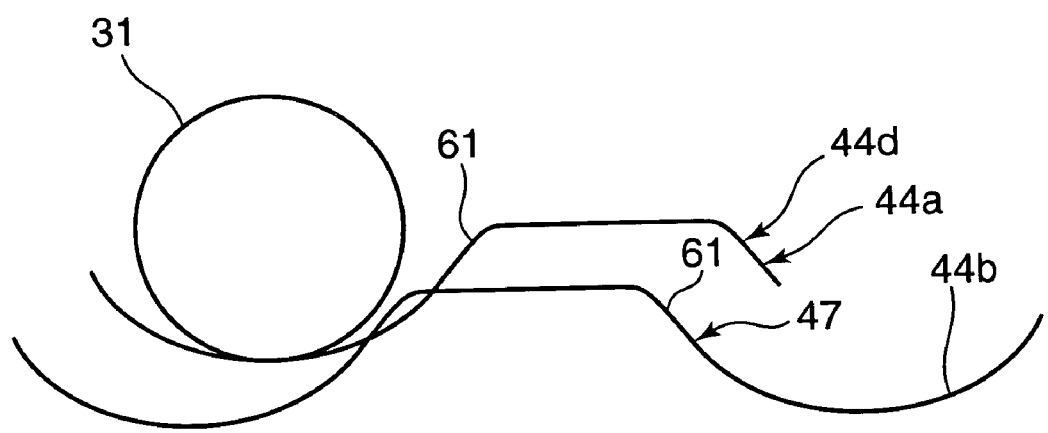
FIG. 10 is an explanatory diagram of respective positions of first and second externally-toothed gears in meshing engagement with a certain one of the pin teeth, in the speed reducer according to the first embodiment.

For example, as shown in FIG. 10, when the first externally-toothed gear 44a is located at a phase angle of zero degree where a bottom of one external tooth thereof comes in contact with a specific one of the pin teeth 31, the second externally-toothed gear 44b is located at a phase angle of 120 degrees, and the external tooth 44d (addendum 61) of the second externally-toothed gear 44b is in a state just after being moved to be spaced apart from the specific pin tooth 31. Further, a sum of respective numbers of the pin teeth 31 in meshing engagement with the first to third externally-toothed gears 44a to 44c at any phase angle is equal to the total number (forty two) of the entire pin teeth 31. Thus, two or more of the first to third externally-toothed gears 44a to 44c are never simultaneously in contact with a certain one of the pin teeth 31.

A revolution speed of each of the first to third externally-toothed gears 44a to 44c is largely reduced relative to that of each of the crankshafts 48. Then, in conjunction with the revolution of each of the first to third externally-toothed gears 44a to 44c, the shaft portions 37 are revolved to rotate the entire carrier 22. Thus, the transfer gear 39 is rotated at a speed significantly reduced relative to the rotational speed of the drive motor 16.

As described above, the speed reducer according to the first embodiment is designed such that an angular range of meshing engagement between the pin teeth 31 and each of the first to third externally-toothed gears 44a to 44c is 120 degrees, and the speed reducer a sum of respective numbers of the pin teeth 31 in meshing engagement with the first to third externally-toothed gears 44a to 44c is equal to the total number of the entire pin teeth 31. This makes it possible to maximally prevent each of the first to third externally-toothed gears 44a to 44c from being slidingly moved relative to the pin teeth 31 so as to suppress an increase in rotational resistance. Thus, while a rotational loss is likely to increase when the first to third externally-toothed gears 44a to 44c are rotated in meshing engagement with the pin teeth 31, this problem can also be suppressed. In addition, two or more of the first to third externally-toothed gears 44a to 44c are never simultaneously in contact with a certain one of the pin teeth 31. Thus, a load to be imposed on each of the pin teeth 31 can be reduced. This makes it possible to reduce a diameter of the pin tooth 31 and thereby facilitate downsizing of the entire speed reducer. The capability to reduce a diameter of the pin tooth 31 also allows the number of pin teeth 31 to be increased so as to extend a selectable range of speed reduction ratio to provide enhanced flexibility in design.

Further, the speed reducer according to the first embodiment is designed such that the first to third externally-toothed gears 44a to 44c are arranged with a phase difference of 120 degrees with respect to each other, and first, second and third one-thirds of the pin teeth 31 are in meshing engagement, respectively, with the first, second and third externally-toothed gears 44a, 44b, 44c. Thus, the first to third externally-toothed gears 44a to 44c are evenly disposed around the crankshafts. This makes it possible to reduce an eccentric load to be imposed on each of the crankshafts 48 and thereby reduce vibration.

In the first embodiment, a tip of each addendum 61 in the first to third externally-toothed gears 44a to 44c is shaved off. Thus, the first to third externally-toothed gears 44a to 44c can be obtained through a simple machining process. That is, the intended externally-toothed gear can be obtained only by shaving off tips of a part of external teeth of an existing externally-toothed gear adapted to be in contact with the pin teeth in an angular range of 180 degrees. In addition, in a production process, the existing externally-toothed gear adapted to be in contact with the pin teeth in an angular range of 180 degrees can be used as a common component before the machining.

Generally, in a tip region of first to third externally-toothed gears 44a to 44c meshed with pin teeth 31, a load component in a radial direction is relatively large, and a load component in a rotation (torque) direction is relatively small. In the first embodiment, tips of a part of external teeth in each of the first to third externally-toothed gears 44a to 44c are shaved off to set an angular range of meshing engagement with the pin teeth 31 at 120 degrees. Thus, a bottom of each external tooth having a relatively large load component in a rotation (torque) direction can be meshed with the pin teeth to provide enhanced torque transfer efficiency. In addition, the angular range of meshing engagement set at 120 degrees makes it possible to disperse a load to be imposed on each of the pin teeth 31 and reduce a load per unit area to be imposed on the cylinder member 13 from the pin teeth 31.

Second Embodiment

Figure 15:
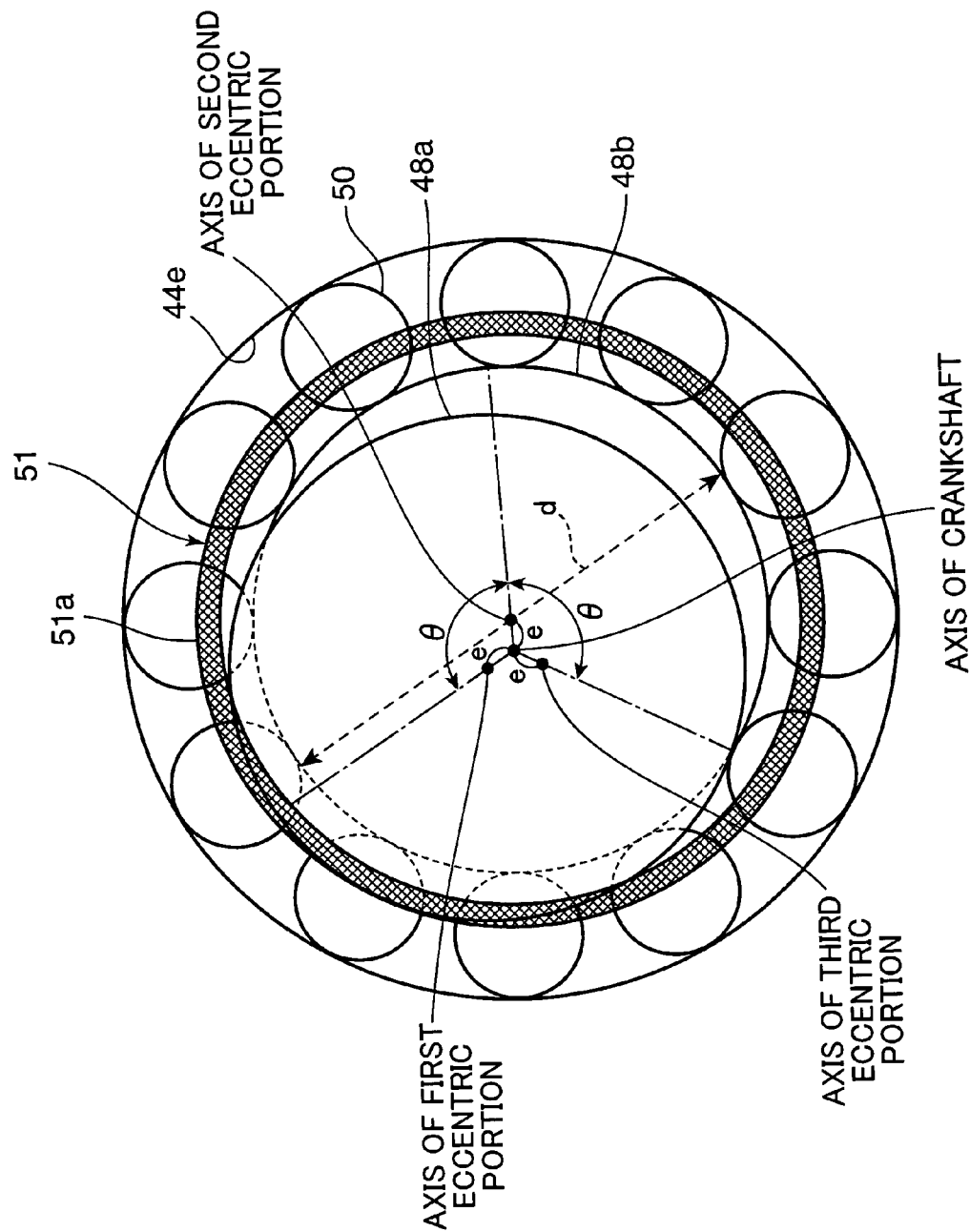
FIG. 15 is an explanatory diagram of a detailed structure of the crankshaft and the bearing illustrated in FIG. 14.

In a speed reducer 10 according to a second embodiment of the present invention, each of first, second and third eccentric portions 48a, 48b, 48c of a crank shaft 48 is formed in a columnar shape having an axis deviated from an axis of the crankshaft 48 by an eccentric distance "e". Further, the first to third eccentric portions 48a to 48c are arranged to have a phase difference of a given degree θ (in the second embodiment, θ= about 120 degrees) with respect to each other, and formed to have substantially the same outer diameter "d" (see FIG. 15).

In the speed reducer 10 according to the second embodiment, first, second and third bearings 49a, 49b, 49c have a distinctive feature. Specifically, as shown in FIGS. 11 to 15, each of the first to third bearings 49a to 49c comprises a plurality (in the second embodiment, twelve) of columnar-shaped rollers 50, and a retainer 51.

In each of the first to third bearings 49a to 49c, the retainer 51 holds the rollers 50 around an associated one of the first to third eccentric portions 48a to 48c of the crank shaft 48 at given intervals. The retainer 51 allows the rollers 50 to be evenly disposed around the associated one of the first to third eccentric portions 48a to 48c so as to receive a load from the crankshaft 48 by the entire rollers 50 disposed around the eccentric portion, in a well balanced manner. This makes it possible to suppress progression of wear in specific ones of the rollers 50 so as to provide enhanced durability of the rollers 50.

Figure 13:
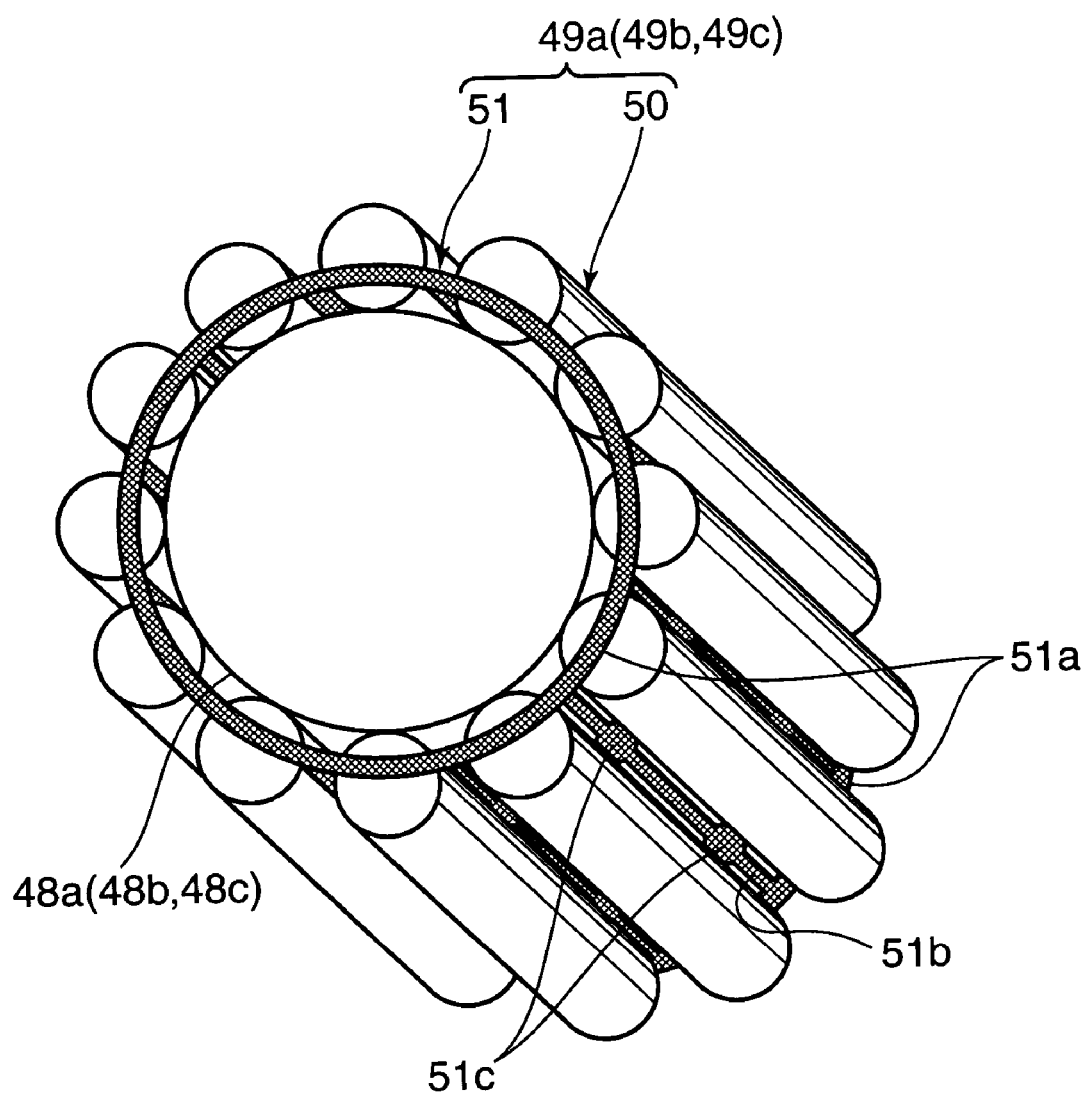
FIG. 13 is a perspective view showing the structure of a crankshaft and a (first, second or third) bearing of the speed reducer illustrated in FIG. 11.

Each of the retainers 51 has a pair of circular ring portions 51a and a plurality of column portions 51b. The pair of circular ring portions 51a are fitted onto the associated one of the first to third eccentric portions 48a to 48c of the crankshaft 48, and disposed in axially spaced-apart relation to each other. As shown in FIG. 13, the pair of circular ring portions 51a are disposed to clamp the rollers 50 from above and below so as to set out respective positions of the rollers 50 along an axial direction of the crankshaft 48. Further, in the second embodiment, each of the circular ring portions 51a has an inner diameter allowing each of the first to third eccentric portions 48a to 48c to fully fall therewithin when viewed in the axial direction of the crankshaft 48. Alternatively, the inner diameter of the circular ring portion 51a may be set at a value allowing only the first eccentric portion 48a and the second eccentric portion 48b or only the second eccentric portion 48b and the third eccentric portion 48c to fall therewithin when viewed in the axial direction of the crankshaft 48.

More specifically, each of the circular ring portions 51a has an inner diameter greater than a value of the following formula: $d+2e \cdot \sin(\theta/2)$, wherein: d is an outer diameter of the second eccentric portion 48b or the first eccentric portion 48a; e is an eccentric distance between the axis of the crankshaft 48 and an axis of each of the first to third eccentric portions 48a to 48c; and θ is an angle of the phase difference between the first eccentric portion 48a and the second eccentric portion 48b or between the second eccentric portion 48b and the third eccentric portion 48c. The value of $2e \cdot \sin(\theta/2)$ is equivalent to a distance between the respective axes of the first eccentric portion 48a and the second eccentric portion 48b or between the respective axes of the second eccentric portion 48b and the third eccentric portion 48c.

As shown in FIG. 13, the plurality of column portions 51b are formed to bridge between the pair of circular ring portions 51a, and disposed along a circumferential direction of the circular ring portions 51a at given intervals. Each of the column portions 51a is formed in the same configuration. Thus, the plurality of column portions 51b can set out respective positions of the rollers 50 along a circumferential direction of the associated one of the first to third eccentric portions 48a to 48c.

Figure 14:
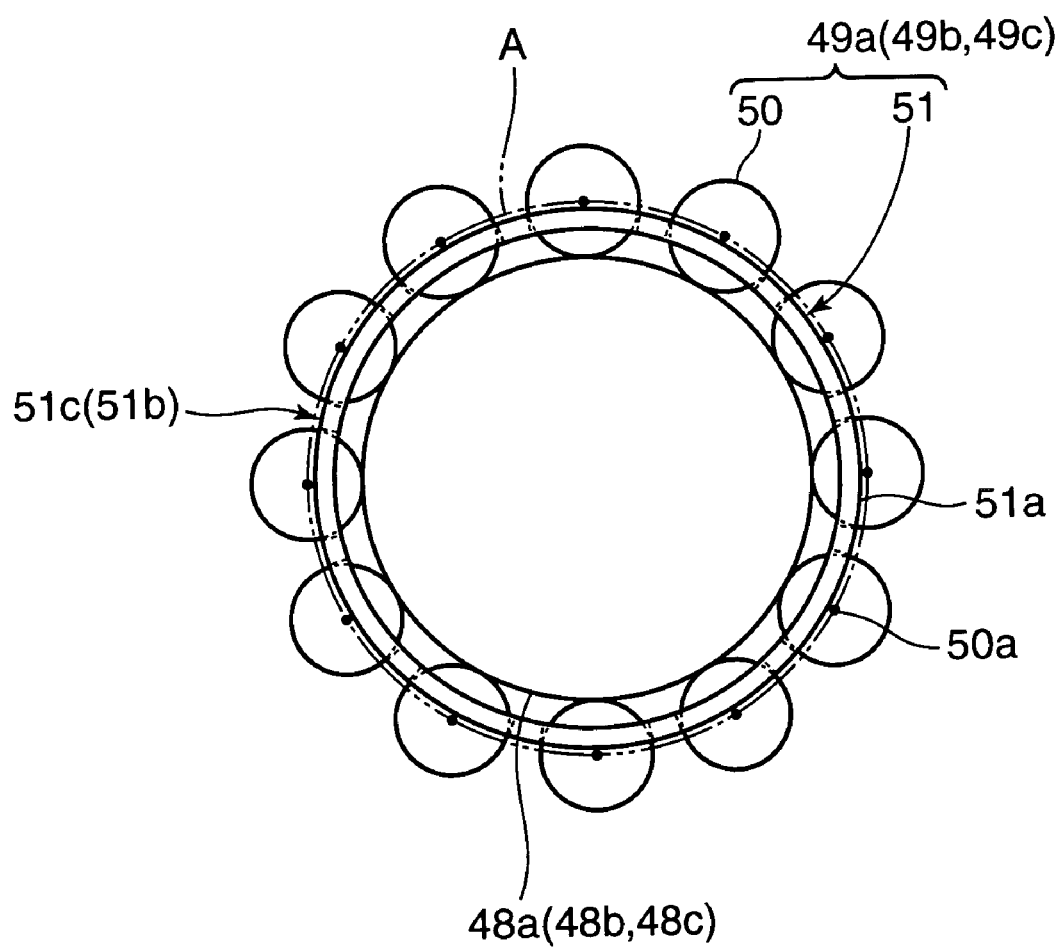
FIG. 14 is a schematic diagram showing the crankshaft and the bearing illustrated in FIG. 13, viewed from an axial direction thereof.

Each of the column portions 51b has two protrusions 51c, 51c each disposed at a position away from a corresponding one of the pair of circular ring portions 51a by a given distance and formed to protrude in both circumferential directions of the circular ring portions 51a. The protrusions 51c, 51c of the column portions 51b are in contact with given positions on respective outer peripheral surfaces of the rollers 50. Specifically, the protrusions 51c, 51c are in contact with a region located inside a circle A illustrated in FIG. 14, in each of the outer peripheral surfaces of the rollers 50. The circle A in FIG. 14 is a circle passing through respective axes 50a of the rollers 50 disposed around the associated one of the first to third eccentric portions 48a to 48c of the crankshaft 48. In this manner, the inside region relative to the circle A passing through respective axes 50a of the rollers 50 is supported by the column portions 51b.

Further, each of the rollers 50 is supported by two of the column portions 51b on opposite sides of the roller, in such a manner as to be clamped from both circumferential directions. This makes it possible to set out respective positions of the rollers 50 along the circumferential direction of the associated one of the first to third eccentric portions 48a to 48c and evenly arrange the rollers 50 around the associated one of the first to third eccentric portions 48a to 48c, while supporting the rollers 50 without wobbling movements. As above, in the second embodiment, the column portions 51b of the retainer 51 are in contact with only the inside region relative to the circle A passing through respective axes 50a of the rollers 50, and no object is in contact with an outside region relative to the circle A. Thus, each of the rollers 50 can be moved radially outward and detached from the retainer 51.

In the second embodiment, each of the first to third eccentric portions 48a to 48c of the crankshaft 48 has substantially the same outer diameter, as described above. Further, the first, second and third bearings 49a, 49b, 49c each comprising the rollers 50 and the retainer 51 are attached, respectively, to the first, second and third eccentric portions 48a, 48b, 48c, in such a manner as to have substantially the same outer diameter. In conformity to this configuration, respective first through-holes 44e of first to third externally-toothed gears 44a to 44c are formed to have the same inner diameter.

Except for the above structure/configuration, the speed reducer 10 according to the second embodiment has the same structure/configuration as that of the speed reducer 10 according to the first embodiment.

A process of installing the first to third bearings 49a to 49c and the first to third externally-toothed gears 44a to 44c onto one of the crankshafts 48 will be described below.

As a first step of this installation process, the third bearing 49c is attached from the side of the third eccentric portion 48c of the crankshaft 48 along an axial direction of the crankshaft 48 and fitted onto the third eccentric portion 48c. In this operation, the third bearing 49c having all of the rollers 50 held by the retainer 51 thereof is attached to the crankshaft 48 and fitted onto the third eccentric portion 48c. Then, the third externally-toothed gear 44c is installed in such a manner as to receive the third eccentric portion 48c and the third bearing 49c in the first through-hole 44e of the third externally-toothed gear 44c.

Then, the second bearing 49b is attached from the side of the first eccentric portion 48a of the crankshaft 48 along the axial direction and fitted onto the second eccentric portion 48b. Specifically, in the second embodiment, the second bearing 49b in a state after detaching all of the rollers 50 from the retainer 51 thereof, i.e., only the retainer 51, is moved to pass through the first eccentric portion 48a, and fitted onto the second eccentric portion 48b. In this operation, it is not essential to detach all of the rollers 50 from the retainer 51, but a part of the rollers 50, i.e., only specific one or more of the rollers 50 which are likely to interfere with the first eccentric portion 48a, may be appropriately detached. In this alternative, the second bearing 49b can also be fitted onto the second eccentric portion 48b while allowing the rollers 50 held by the retainer 51 to pass through the first eccentric portion 48a without interference therewith. Then, the detached rollers 50 are returned or re-attached to the retainer 51. Subsequently, the second externally-toothed gear 44b is installed in such a manner as to receive the second eccentric portion 48b and the second bearing 49b in the first through-hole 44e of the second externally-toothed gear 44b.

Then, the first bearing 49a is attached from the side of the first eccentric portion 48a of the crankshaft 48 along the axial direction and fitted onto the first eccentric portion 48a. In this operation, the first bearing 49a having all of the rollers 50 held by the retainer 51 thereof is attached to the crankshaft 48 and fitted onto the first eccentric portion 48a. Finally, the first externally-toothed gear 44a is installed in such a manner as to receive the first eccentric portion 48a and the first bearing 49a in the first through-hole 44e of the first externally-toothed gear 44a.

As described above, in the second embodiment, the retainer 51 of the second bearing 49b is designed to hold the rollers 50 around the second eccentric portion 48b at given intervals and hold the rollers 50 detachably in the radially outward direction of the second eccentric portion 48b. Thus, in advance of the operation of attaching the second bearing 49b from the side of the first eccentric portion 48a along the crankshaft 48 and fitting the second bearing 49b onto the second eccentric portion 48b, the rollers 50 can be detached from the retainer 51. In this detaching operation, all of the rollers 50, or only a part of rollers 50 which are likely to interfere with the first eccentric portion 48a, are detached from the retainer 51 to avoid interference between the rollers 50 and the first eccentric portion 48a. Thus, the second bearing 49b can be moved to pass through the first eccentric portion 48a, and fitted onto the second eccentric portion 48b. Then, the detached rollers 50 are returned to the retainer 51. In this manner, the second bearing 49b can be moved along the crankshaft 48 and fitted onto the second eccentric portion 48b which is an intermediate one of the three eccentric portions, without any difficulty.

Further, in the second embodiment, each of the first to third eccentric portions 48a to 48c has substantially the same outer diameter, and the first, second and third bearings 49a, 49b, 49c are attached, respectively, to the first, second and third eccentric portions 48a, 48b, 48c, in such a manner as to have substantially the same outer diameter. Thus, respective the first through-holes 44e of the first to third externally-toothed gears 44a to 44c can have substantially the same inner diameter. This makes it possible to form each of the first to third externally-toothed gears 44a to 44c into a common configuration so as to reduce the number of component types for use in the speed reducer 10. Therefore, a production process and a component management during production can be simplified. In addition, a torque transfer section comprising the first eccentric portion 48a, the first bearing 49a and the first externally-toothed gear 44a, a torque transfer section comprising the second eccentric portion 48b, the second bearing 49b and the second externally-toothed gear 44b, and a torque transfer section comprising the third eccentric portion 48c, the third bearing 49c and the third externally-toothed gear 44c, are formed in the same configuration and the same dimensions. This makes it possible to prevent uneven distribution of load during torque transfer and provide enhanced strength and quality to the torque transfer sections. Further, the first to third bearings 49a to 49c have a common structure capable of detaching the rollers 50. Thus, the number of bearing types can be reduced to one so as to simplify a component management.

In the second embodiment, the retainer 51 of the second bearing 49b has the pair of circular ring portions 51a adapted to set out respective positions of the rollers 50 in the axial direction of the second eccentric portion 48b, and the plurality of column portions 51b adapted to set out respective positions of the rollers 50 along the circumferential direction of the second eccentric portion 48b. The pair of circular ring portions 51a are fitted onto the second eccentric portion 48b and disposed spaced apart from each other in the axial direction of the second eccentric portion 48b by a given distance. Further, the plurality of column portions 5b are formed to bridge between the pair of circular ring portions 51a, and disposed along the circumferential direction of the circular ring portions 51a at given intervals. The above retainer 51 of the second bearing 49b makes it possible to reliably hold the rollers 50 around the second eccentric portion 48b in a simplified structure comprised of the circular ring portions 51a and the column portions 51b.

In the second embodiment, each of the circular ring portions 51a of the retainer 51 has an inner diameter allowing each of the first eccentric portion 48a and the second eccentric portion 48b to fall therewithin when viewed in the axial direction of the crankshaft 48, i.e., an inner diameter greater than a value of the following formula: an outer diameter of the second eccentric portion $48b + 2e \cdot \sin(\theta/2)$. Thus, in the operation of attaching the second bearing 49b from the side of the first eccentric portion 48a along the crankshaft 48 and fitting the second bearing 49b onto the second eccentric portion 48b, the interference between the first eccentric portion 48a and each of the circular ring portions 51a can be avoided.

Third Embodiment

Figure 11:
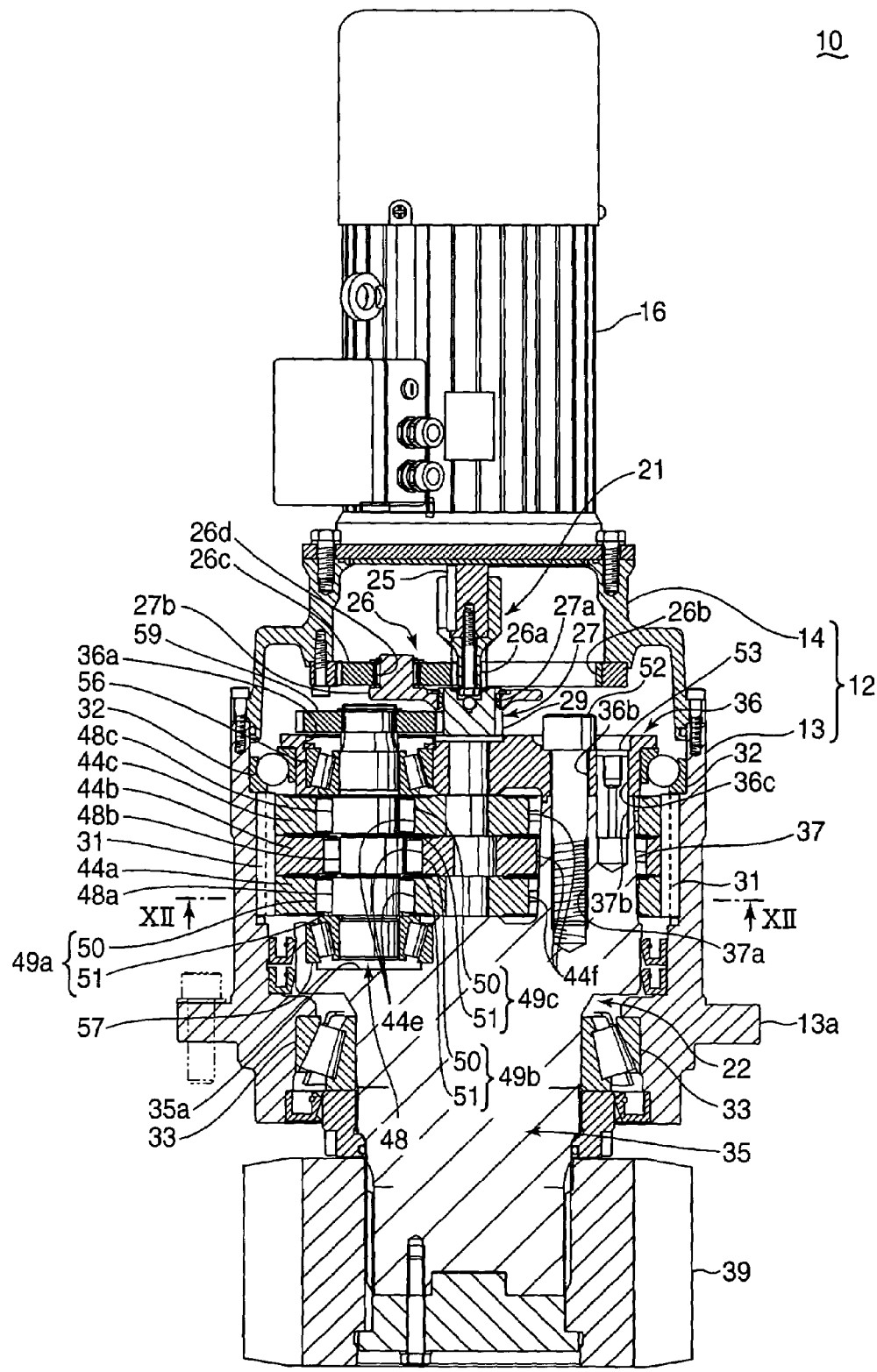
FIG. 11 is a sectional view showing the entire structure of a differential/oscillating type speed reducer according to a second embodiment of the present invention.
Figure 12:
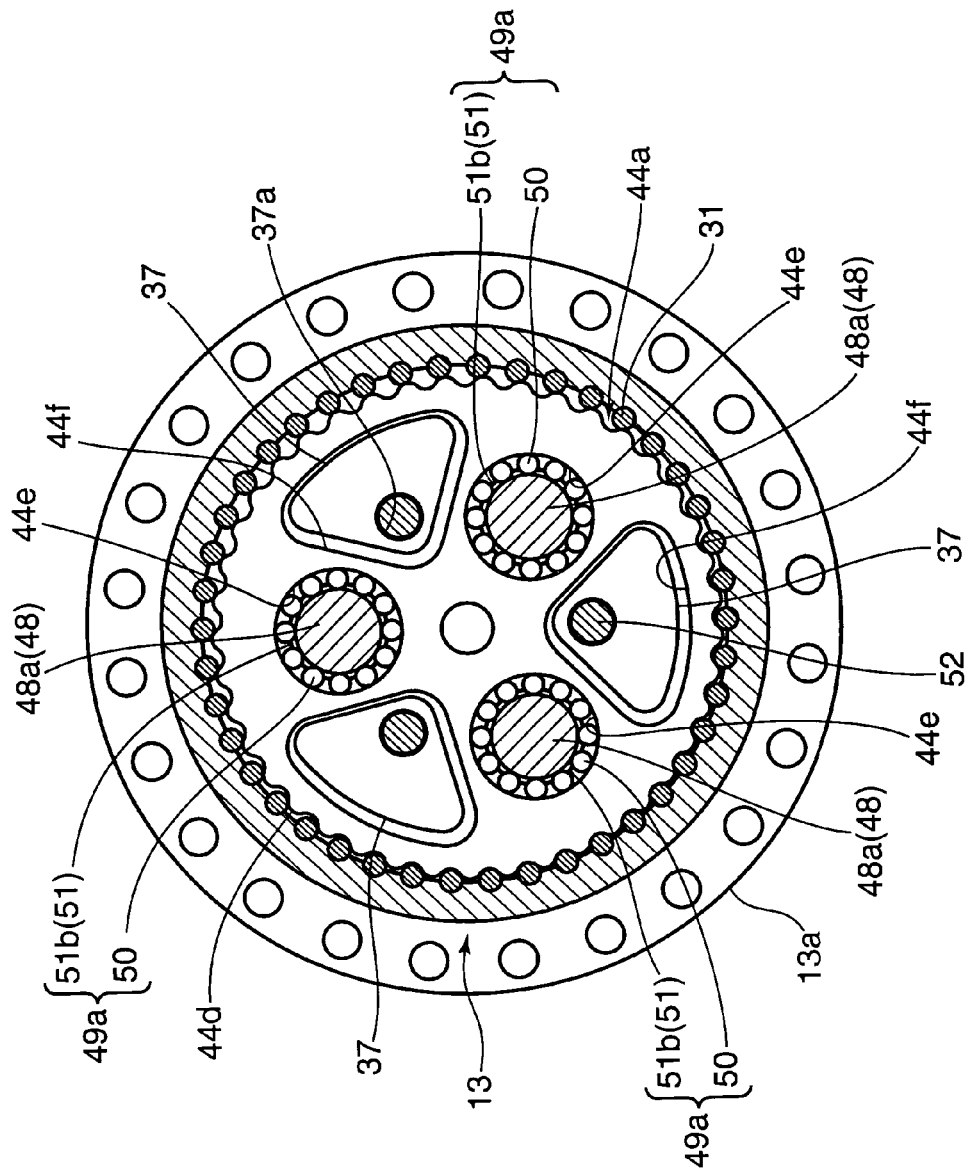
FIG. 12 is a sectional view of the speed reducer illustrated in FIG. 11, taken along the line XII-XII.

Except that first, second and third roller bearings 149a, 149b, 149c are used in place of the first, second and third bearings 49a, 49b, 49c in the second embodiment, a differential/oscillating type speed reducer according to a third embodiment of the present invention is the same as the speed reducer 10 according to the second embodiment illustrated in FIG. 11.

Figure 16:
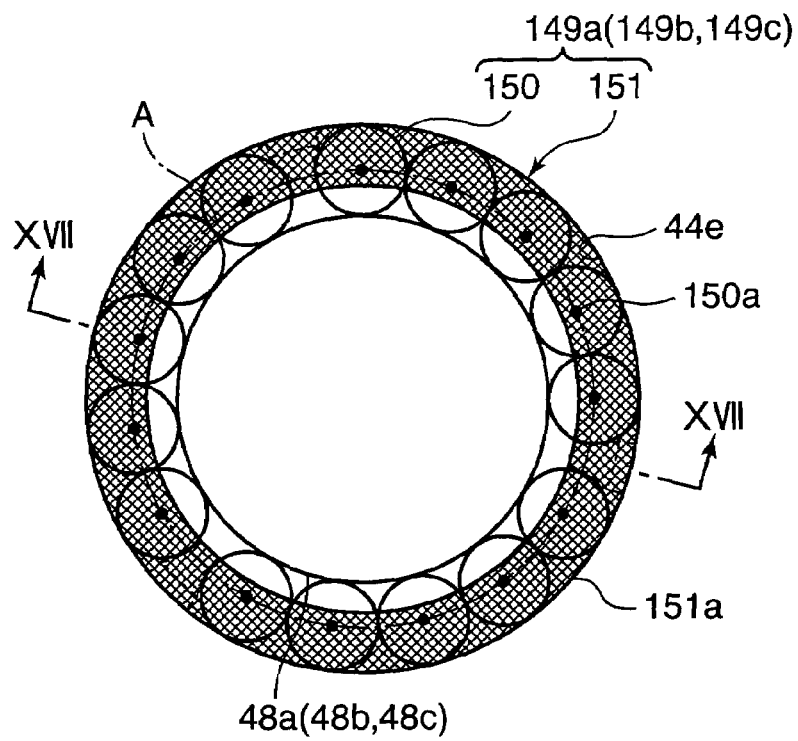
FIG. 16 is a schematic diagram showing the structure of a (first, second or third) bearing in a differential/oscillating type speed reducer according to a third embodiment of the present invention.
Figure 17:
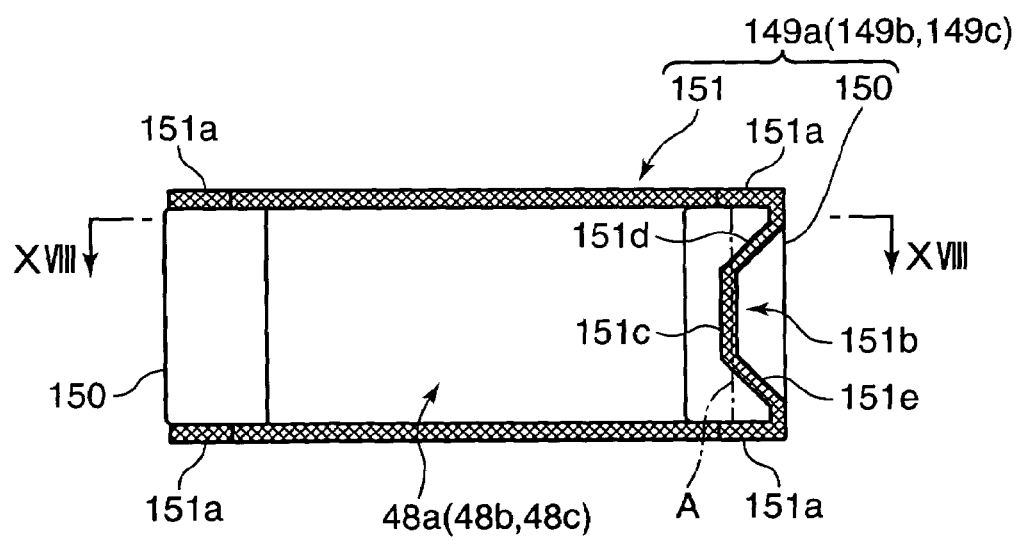
FIG. 17 is a sectional view of the bearing illustrated in FIG. 16, taken along the line XVII-XVII.
Figure 18:
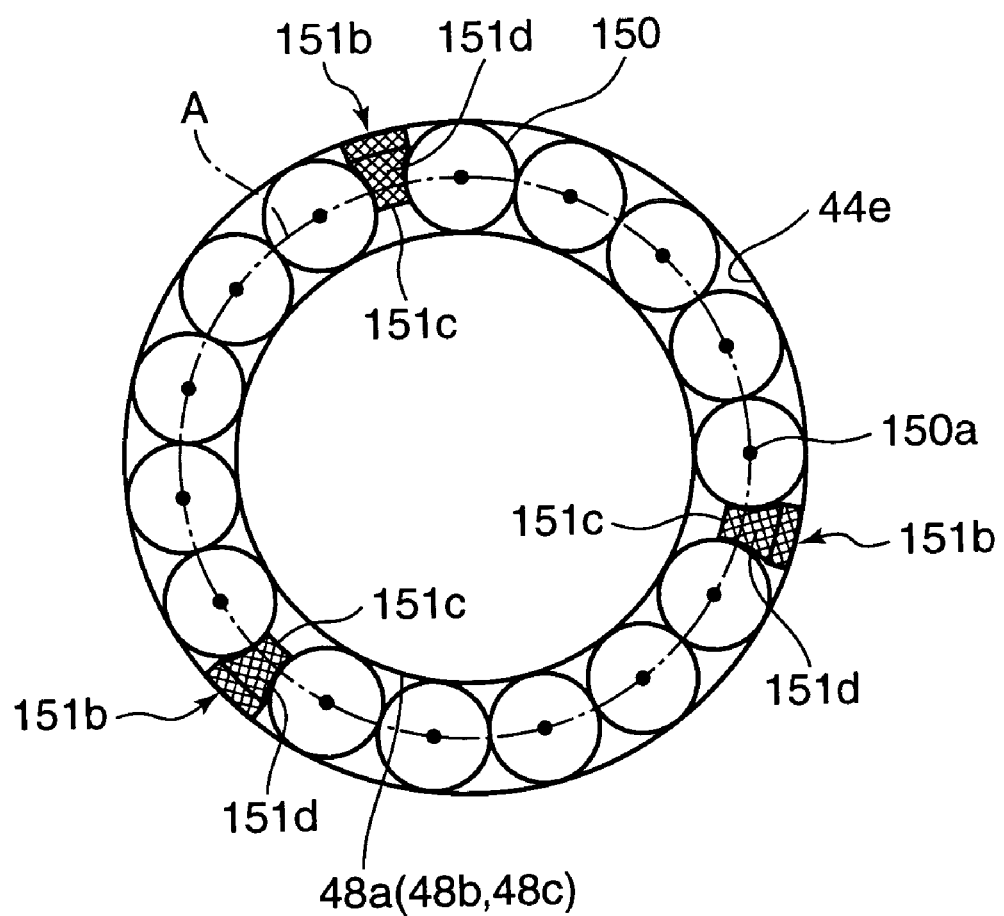
FIG. 18 is a sectional view of the bearing illustrated in FIG. 17, taken along the line XVIII-XVIII.

Specifically, in the speed reducer according to the third embodiment, the first, second and third eccentric portions 48a, 48b, 48c (shaft member) of the crankshaft 48 after being inserted, respectively, into the circular-shaped first through-holes 14e formed in the first to third externally-toothed gears 44a to 44c, are supported, respectively, by first, second and third roller bearings 149a, 149b, 149c, as shown in FIGS. 16 to 18.

Each of the first to third roller bearings 149a to 149c has the same structure, and comprises fifteen rollers 150 and a retainer 151. The rollers 150 are disposed along an outer peripheral surface of an associated one of the first to third eccentric portions 48a to 48c and between an inner wall surface of the first through-hole 44e and the outer peripheral surface of the associated one of the first to third eccentric portions 48a to 48c. In this manner, the rollers 150 can receive a load from the associated one of the first to third eccentric portions 48a to 48c in a well balanced manner.

The retainer 151 is adapted to hold the rollers 150 around the associated one of the first to third eccentric portions 48a to 48c. The retainer 151 has a pair of upper and lower circular ring portions 151a and three column portions 151b. The pair of circular ring portions 151a are fitted onto the associated one of the first to third eccentric portions 48a to 48c or fitted into the through-hole 44e, and disposed adjacent, respectively, to axially opposite ends of each of the rollers 150. The pair of circular ring portions 151a can come into contact, respectively, with the opposite ends of the roller 150, to restrict an axial movement of the roller 150. Each of the circular ring portions 151a has an outer diameter set to be approximately equal to an inner diameter of the first through-hole 44e, and an inner diameter set to be slightly less than a diameter of a circle A passing through respective axes 150a of the rollers 150. The outer diameter of the circular ring portion 151a may be set to be greater than the circle A, and the inner diameter of the circular ring portion 151a may be set to be approximately equal to the outer diameter of the associated one of the first to third eccentric portions 48a to 48c.

The three column portions 151b are disposed along a circumferential direction of the circular ring portions 151a, i.e., a circumferential direction of the associated one of the first to third eccentric portions 48a to 48c at even 120° intervals.

Each of the column portions 151b has opposite ends connected, respectively, to the pair of circular ring portions 151a. Each of the column portions 151b is disposed between first and second ones of the rollers 150 which are located in adjacent relation to each other. Each of the column portions 151b can come into contact with the first and second rollers 150 to restrict a movement of the rollers 150 in the circumferential direction of the associated one of the first to third eccentric portions 48a to 48c. Five of the rollers 150 are disposed between the adjacent column portions 151b, 151b. The five rollers 150 may be disposed in evenly spaced-apart relation to each other with a small clearance. This makes it possible to suppress the occurrence of frictional resistance between the adjacent rollers 150.

As shown in FIG. 17, each of the column portions 151b has a shape bended from a radially outward side to a radially inward side of the circular ring portions 151, in such a manner as to integrally form an intermediate region 151c and first and second connection regions 151d, 151e. The intermediate region 151c corresponds to a longitudinally intermediate region of the column portion 151b, and extends linearly along the axial direction of the rollers 150 inside the circle A. The first connection region 151d connects an upper edge of the intermediate region 151c and an outer edge of the upper circular ring portion 151a, and the second connection region 151e connects a lower edge of the intermediate region 151c and an outer edge of the lower circular ring portion 151a. The first connection region 151d extends downward from the outer edge of the upper circular ring portion 151a, and extends obliquely downward on a radially inward side of the circular ring portion 151a. The second connection region 151e extends upward from the outer edge of the lower circular ring portion 151a, and extends obliquely upward on a radially inward side of the circular ring portion 151a. Each region adjacent to two junctions between the intermediate region 151c and the first connection regions 151d and between the intermediate region 151c and the second connection region 151e is located on the circle A, and side surfaces of the junction regions are in contact, respectively, with an outer peripheral surface of the first or second roller 150 on the circle A.

Further, each side edge of the connection portions 151d, 151e is curved in conformity to a shape of the outer peripheral surface of the roller 150 to allow each side surface of the connection portions 151d, 151e to conformably come into contact with the outer peripheral surface of the first or second roller 150. This makes it possible to increase a contact area between the side surfaces of the connection portions 151d, 151e and the outer peripheral surface of the first or second roller 150 so as to allow the column portions 151b to stably suppress the movement of the rollers 150 in the circumferential direction of the associated one of the first to third eccentric portions 48a to 48c.

Furthermore, each of the connection portions 151d, 151e is formed to have a width which gradually increases in a direction from the intermediate region 151c to each of the circular ring portions 151a. In view of suppressing the movement of the rollers 150 in the circumferential direction of the associated one of the first to third eccentric portions 48a to 48c, the column portion to be disposed between the first and second rollers 150 on the circle A may have any shape. That is, the column portion may have a shape simply bridging or connecting between the pair of circular ring portions 151a along the axial direction of the rollers 150 linearly or with the same width. In this case, over the entire length of the column potion, the width of the column portion becomes less than a distance between respective outer peripheral surfaces of the first and second rollers 150 located on the circle A. This causes difficulty in ensuring enhanced strength of the support portion. In the third embodiment, each of the connection portions 151d, 151e is formed to have a width which gradually increases in the direction from the intermediate region 151c to each of the circular ring portions 151a. Thus, as compared with above case, the strength of the column portion can be increased. Further, each of the intermediate region 151c and the connection regions 151d, 151e of the column portion 151b is formed to have approximately the same thickness.

In combination with the first to third roller bearings 149a to 149c having the aforementioned configuration, a roll loading rate of the rollers between the inner wall surface of the first through-hole 44e and the outer peripheral surface of the associated one of the first to third eccentric portions 48a to 48c is in the range of 87% to 98%. The roll loading rate means a rate calculated by the following formula: a diameter of the roller 150× the number of the rollers 150/a length of the circle A×100.

In an operation of installing the first to third eccentric portions 48a to 48c and the first to third roller bearings 149a to 149c in the first through-holes 44e of the first to third externally-toothed gears 44a to 44c, the retainer 151 of the first roller bearing 149a is fitted onto the first eccentric portion 48a or into the first through-hole 44e. Then, three sets of the five rollers 150 are fitted, respectively, into three spaces between the column portions 151b of the retainer 151, from the radially outward side of the retainer 151, so that the fifteen rollers 150 held by the retainer 150 are disposed around the first eccentric portion 48a. Then, the first eccentric portion 48a and the first roller bearing 149a are inserted into the first through-hole 44e of the first externally-toothed gear 44a, while holding the rollers 150 from therearound. In the same manner, the second roller bearing 149b and the third roller bearing 149c are attached. In this manner, the first to third eccentric portions 48a to 48c and the first to third roller bearings 149a to 149c are installed, respectively, in the first through-holes 44e of the first to third externally-toothed gears 44a to 44c.

The process of installing the first to third eccentric portions 48a to 48c and the first to third roller bearings 149a to 149c are installed, respectively, in the first through-holes 44e, is not limited to the above manner. For example, the process may comprise attaching the retainers 151, respectively, to the first through-holes 44e, fitting three sets of the five rollers 150, respectively, three spaces between the column portions 151a of each of the retainers 151, and inserting the first to third eccentric portions 48a to 48c.

Except for the above differences, the speed reducer according to the third embodiment and the first to third roller bearings 149a to 149c used therein have the same structure/configuration as that of the speed reducer 10 according to the second embodiment and the first to third roller bearings 49a to 49c.

As described above, in the third embodiment, the five rollers 150 are disposed between the adjacent column portions 151b of the retainer 151. Thus, as compared with a retainer designed to arrange column portions, respectively, in all spaces between the rollers 150, the number of column portions is reduced, and thereby the number of rollers 150 to be disposed around each of the first to third eccentric portions 48a to 48c, i.e., the roller loading rate of the rollers between the inner wall surface of each of the first through-holes 44e and the outer peripheral surface of each of the first to third eccentric portions 48a to 48c, can be increased. This makes it possible to disperse a load to be imposed on the rollers 150 from the first to third eccentric portions 48a to 48c so as to provide enhanced durability of the rollers 150.

Further, in each of the retainers 151 in the third embodiment, the opposite ends of each of the column portions 151b are connected, respectively, to the pair of circular rings 151a. Thus, differently from the conventional retainer where one end of the column portion 151b is not fixed, the column portions 151b in the third embodiment can suppress the problem that when a certain force is applied from the rollers 150 to the column portion, the column portion is pressed by the force and undesirably displaced. This makes it possible to suppress wobbling of the rollers 150 due to the displacement of the column portions 151b, and prevent the rollers 150 from being obliquely inclined due to the wobbling, so as to avoid problems that an excessive load is imposed on the rollers 150 from the first to third eccentric portions 48a to 48c due to the inclination of the rollers 150, and the rollers 150 are damaged due to the excessive load.

In the third embodiment, the retainer 151 adapted to hold the rollers 150 for each of the first to third roller bearings 149a to 149c, around an associated one of the first to third eccentric portions 48a to 48c has the three column portions 151b each disposed between first and second ones of the rollers 150 which are located in adjacent relation to each other, to restrict the movement of the rollers 150 in the circumferential direction of the associated one of the first to third eccentric portions 48a to 48c. These column portions 151b can restrict the movement of the rollers 150 in the circumferential direction of the associated one of the first to third eccentric portions 48a to 48c. Thus, as compared with a roller bearing where only the plurality of rollers 150 are disposed around each of the first to third eccentric portions 48a to 48c without interposing the column portions 151b therebetween, the retainer 151 in the third embodiment can suppress the problem that a clearance between the rollers 150 is unevenly defined, i.e., a large clearance is defined at one position, in the circumferential direction of the associated one of the first to third eccentric portions 48a to 48c. This makes it possible to reduce a burden required for evenly adjusting the clearances between the rollers 150 during the operation of installing the first to third roller bearings 149a to 149c in the first to third eccentric portions 48a to 48c, and the entire burden in the operation of installing the first to third roller bearings 149a to 149c in the first to third eccentric portions 48a to 48c.

In the third embodiment, each of the column portions 151b includes the intermediate region 151c located on the circle A passing through respective axes 150a of the rollers 150, and the intermediate region 151c is in contact with the outer peripheral surfaces of the first and second rollers 150 on the circle A. Thus, even if a force in the circumferential direction of the associated one of the first to third eccentric portions 48a to 48c, i.e., in a direction along the circle A, acts on the rollers 150, the outer peripheral surfaces of the rollers 150 is never slidingly moved relative to the column portion 151b. This makes it possible to effectively suppress the movement of the rollers 150 in the circumferential direction of the associated one of the first to third eccentric portions 48a to 48c so as to effectively prevent wobbling of the rollers 150 in the circumferential direction of the associated one of the first to third eccentric portions 48a to 48c.

Fourth Embodiment

A speed reducer 10 according to a fourth embodiment (see FIG. 19) has a distinctive feature in the structure/configuration of a crankshaft 248 (eccentric shaft) disposed to penetrate first, second and third externally-toothed gears 44a, 44b, 44c.

Figure 20:
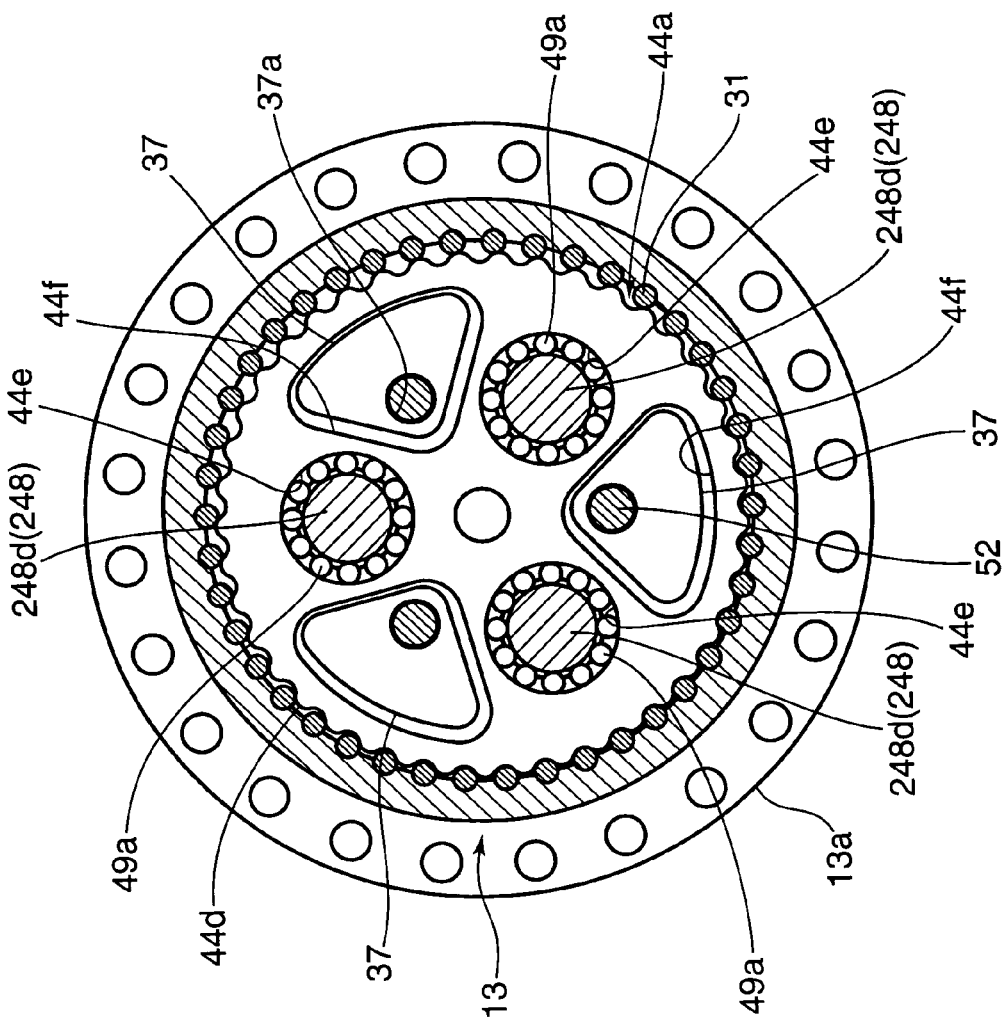
FIG. 20 is a sectional view of the speed reducer illustrated in FIG. 19, taken along the line XX-XX.
Figure 21:
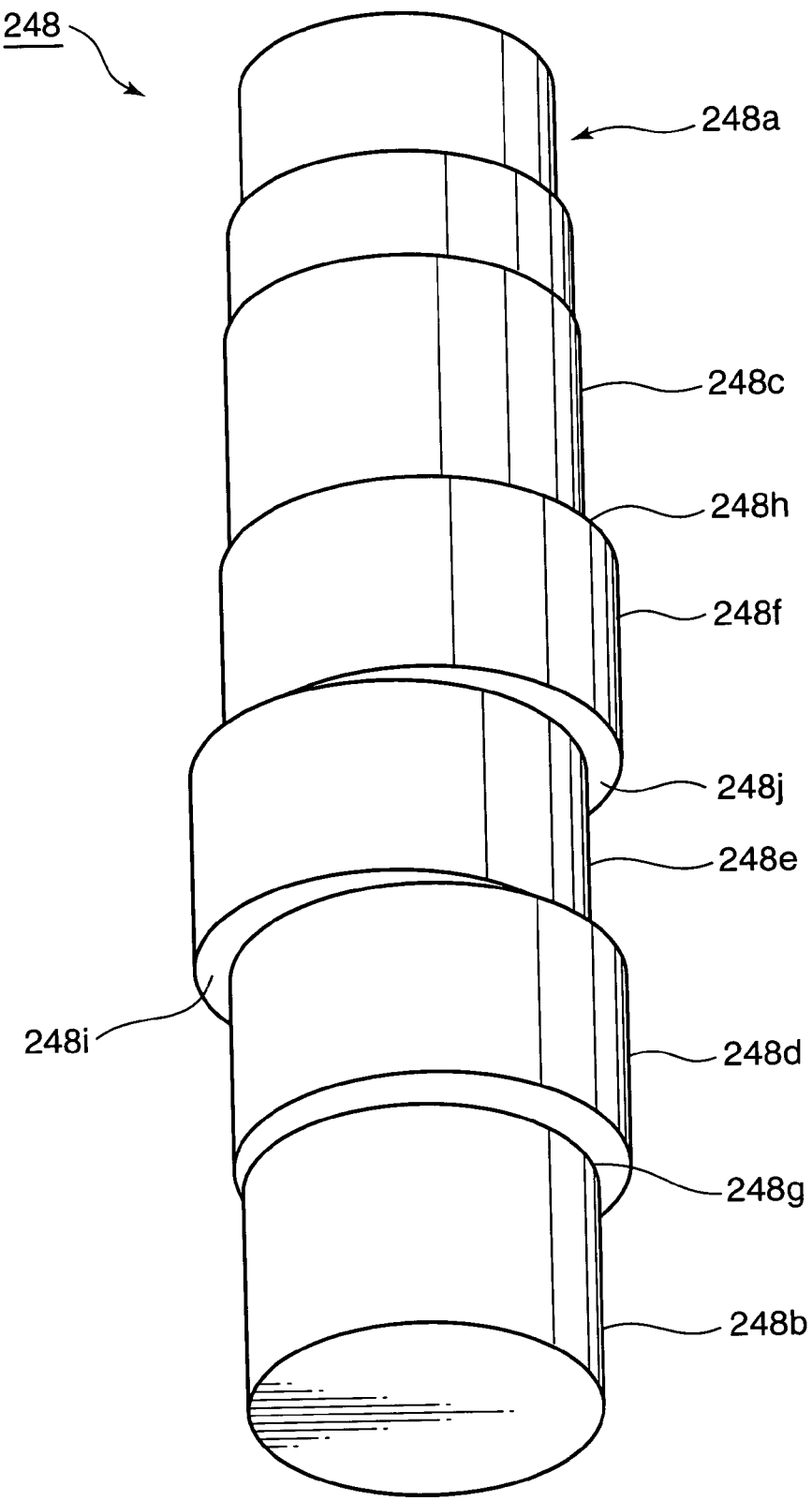
FIG. 21 is a perspective view showing the entire structure of a crankshaft for use in the speed reducer illustrated in FIG. 19.
Figure 22:
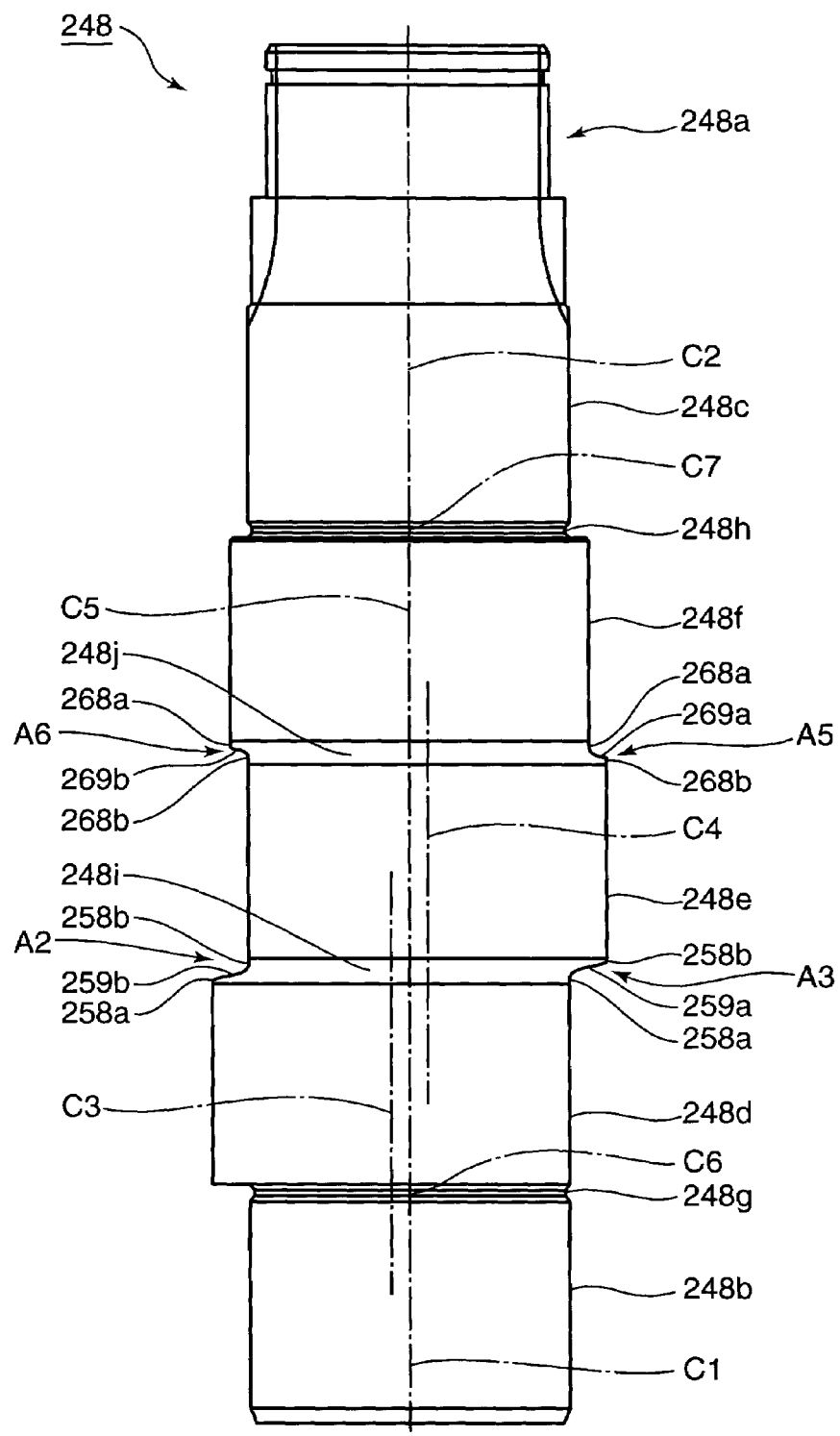
FIG. 22 is a front view showing the crankshaft illustrated in FIG. 21.

Specifically, as shown in FIG. 20, the speed reducer 10 includes three of the crankshafts 248 arranged along a circumferential direction of the first to three externally-toothed gears 44a to 44c at given intervals. As shown in FIGS. 21 and 22, each of the crankshafts 248 integrally includes a gear mounting portion 248a, a first shaft portion 248b, a second shaft portion 248c, a first eccentric portion 248d, a second eccentric portion 248e, a third eccentric portion 248f, a first connection portion 248g, a second connection portion 248h, a third connection portion 248i and a fourth connection portion 248j.

Figure 19:
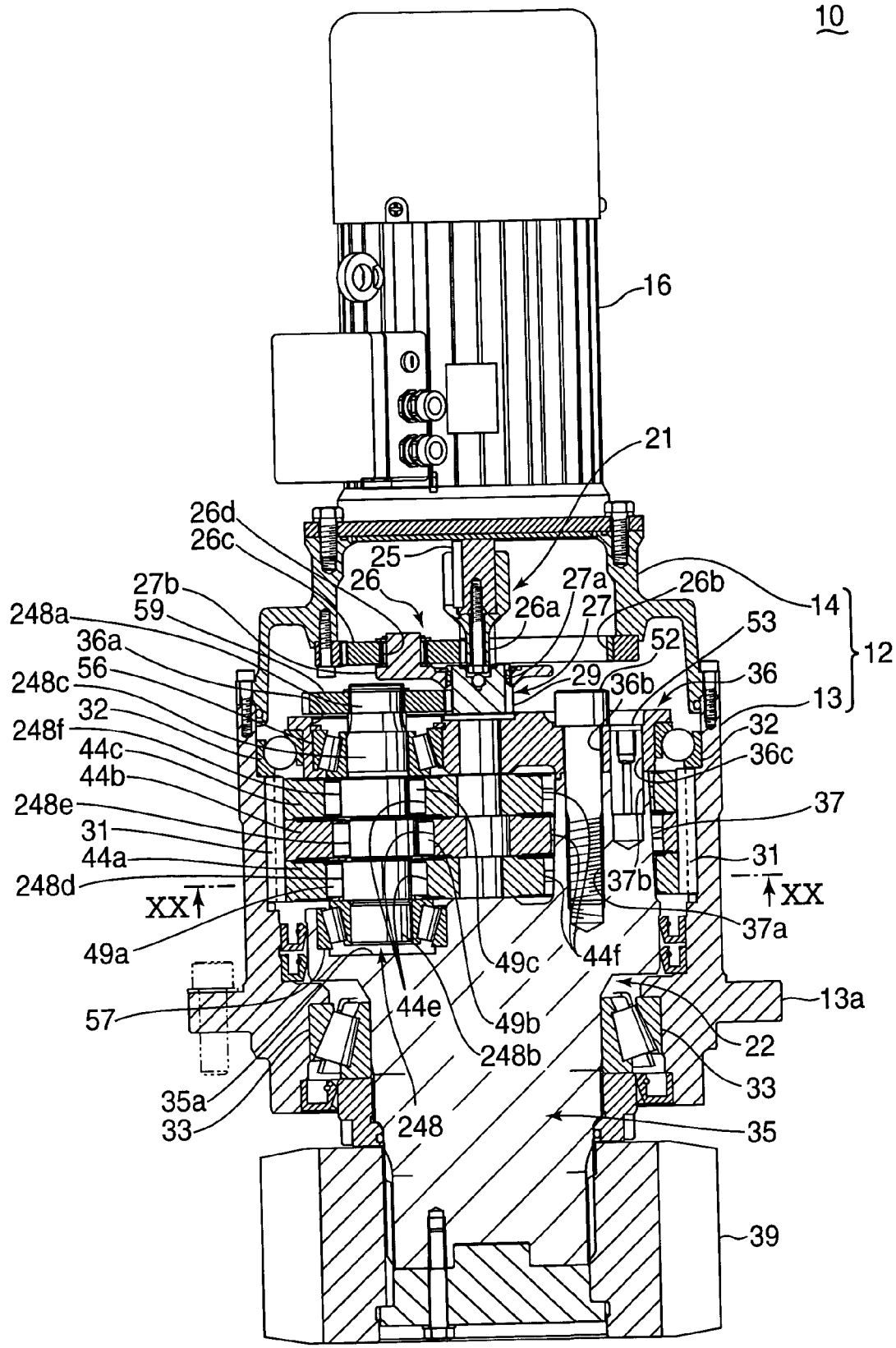
FIG. 19 is a sectional view showing the entire structure of a differential/oscillating type speed reducer according to a fourth embodiment of the present invention.

The gear mounting portion 248a is located at an upper end of the crankshaft 248, and disposed to protrude upward relative to an upper crankshaft bearing 56 (second crankshaft bearing: see FIG. 19). An externally-toothed driven gear 59 in meshing engagement with an externally-toothed drive gear 29 is fitted onto the gear mounting portion 248a. The crankshaft 248 is adapted to be revolved together with the externally-toothed driven gear 59 while being rotated at a speed reduced by a gear ratio between the externally-toothed drive gear 29 and the externally-toothed driven gear 59.

The first shaft portion 248b is formed in a columnar shape, and located at a lower end of the crankshaft 248. The first shaft portion 248b is rotatably supported by a lower crankshaft bearing 57 (first crankshaft bearing: see FIG. 19). The second shaft portion 248c is formed in a columnar shape, and located just below the gear mounting portion 248a. As shown in FIG. 22, the second shaft portion 248c is formed to have an axis C2 coaxial with an axis C1 of the first shaft portion 248b and rotatably supported by the upper crankshaft bearing 56. The axes C1 and C2 of the first shaft portion 248b and the second shaft portion 248c serves as a rotational axis of the crankshaft 248.

Figure 23:
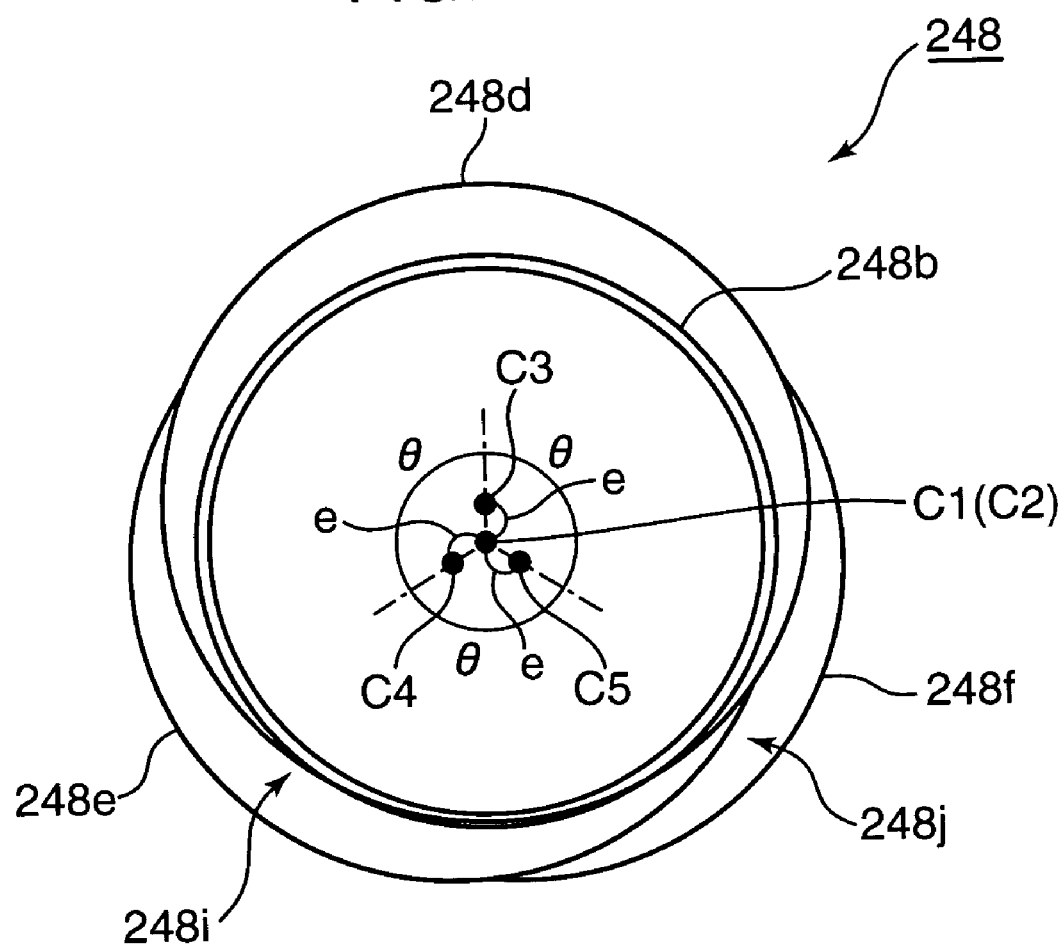
FIG. 23 is a bottom view showing the crankshaft illustrated in FIG. 21.

The first to third eccentric portions 248d to 248f are located between the first shaft portion 248b and the second shaft portion 248c. The first to third eccentric portions 248d to 248f are disposed upward along the axial direction in this order. Each of the first to third eccentric portions 248d to 248f is formed in a columnar shape. The first, second and third eccentric portions 248d, 24e, 248f have, respectively, axes C3, C4, C5 each deviated from the axes C1, C2 of the first and second shaft portions 248b, 248c by an eccentric distance "e" (see FIG. 23). Each of the adjacent first and second eccentric portions 248d, 248e has a different rotational phase. Further, each of the adjacent second and third eccentric portions 248e, 248f has a different rotational phase. That is, the first, second and third eccentric portions 248d, 24e, 248f are arranged to have a phase difference of an angle θ (see FIG. 23: in this embodiment, θ= about 120°).

The first connection portion 248g is formed between the first shaft portion 248b and the first eccentric portion 248d, to connect the first shaft portion 248b and the first eccentric portion 248d to each other. The first connection portion 248g is formed to have an axis C6 coaxial with the axis C1 of the first shaft portion 248b, and a diameter less than that of the first shaft portion 248b. The second connection portion 248h is formed between the second shaft portion 248c and the third eccentric portion 248f, to connect the second shaft portion 248c and the third eccentric portion 248f to each other. The second connection portion 248h is formed to have an axis C7 coaxial with the axis C2 of the second shaft portion 248c, and a diameter less than that of the second shaft portion 248c.

Figure 24:
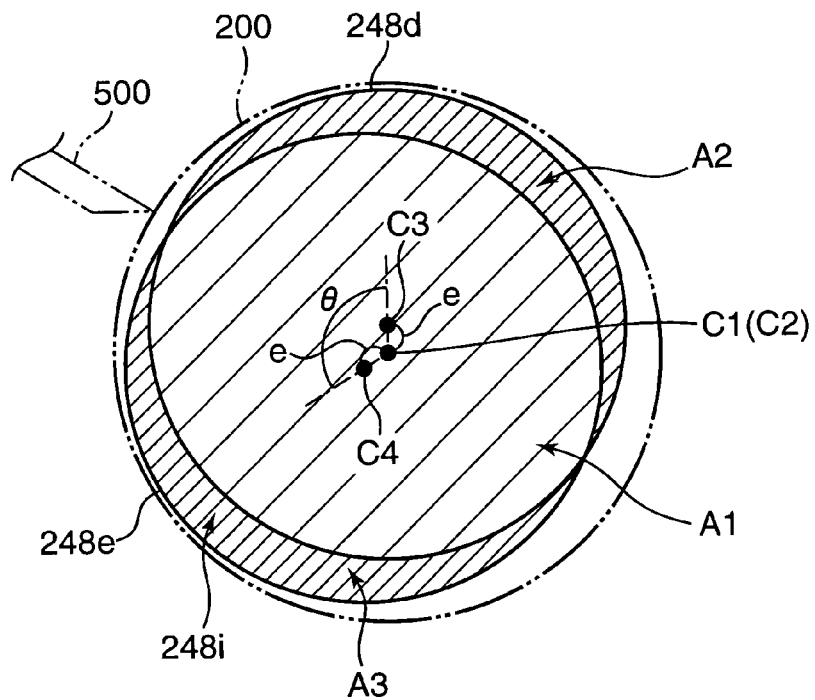
FIG. 24 is a schematic diagram showing respective configurations of a first eccentric portion and a second eccentric portion in the crankshaft illustrated in FIG. 21.

The third connection portion 248i is formed between the first eccentric portion 248d and the second eccentric portion 248e, to connect the first eccentric portion 248d and the second eccentric portion 248e to each other. The third connection portion 248i is formed in a shaded area in FIG. 24, viewed in the axial direction. Specifically, the third connection portion 248i is formed over an overlapping area A1 between the first and second eccentric portions 248d, 248e located on both sides thereof, an area A2 of the first eccentric portion 248d protruding from the overlapping area A1, and an area A3 of the second eccentric portion 248e protruding from the overlapping area A1, when viewed in the axial direction. The third connection portion 248i has an outer periphery partially defined by an arc which extends within the protruding area A2 of the first eccentric portion 248d and has a center located coaxially with the axis C4 of the second eccentric portion 248e, in a section perpendicular to the axial direction. Further, the remaining outer periphery of the third connection portion 248i is defined by an arc which extends within the protruding area A3 of the second eccentric portion 248e and has a center located coaxially with the axis C3 of the first eccentric portion 248d, in the section perpendicular to the axial direction.

As shown in FIG. 22, the third connection portion 248i includes two concave regions 258a, 258b, and two inclined regions 259a, 259b. The concave region 258a is formed to continue from an edge of the first eccentric portion 248d on the side of the second eccentric portion 248e and extend over the entire circumference of the third connection portion 248i. Further, the concave region 258a is located radially inward relative to the first eccentric portion 248d. The concave region 258a has an axial width which gradually decreases in a direction from the protruding area A3 of the second eccentric portion 248e to the protruding area A2 of the first eccentric portion 248d.

The inclined region 259a is formed to continue from an edge of the concave region 258a on the side of the second eccentric portion 248e. The inclined region 259a is formed within the protruding area A3 of the second eccentric portion 248e. Further, the inclined region 259a is formed in a linear taper shape having an axial sectional area which expands radially outward, toward the second eccentric portion 248e, and a taper angle of about 15°. Each of the inclined region 259a and the concave region 258a has a center on the axis C3 of the first eccentric portion 248d.

The concave region 258b is formed to continue from an edge of the second eccentric portion 248e on the side of the first eccentric portion 248d and extend over the entire circumference of the third connection portion 248i. Further, the concave region 258b is located radially inward relative to the second eccentric portion 248e. The concave region 258b has an axial width which gradually decreases in a direction from the protruding area A2 of the first eccentric portion 248d to the protruding area A3 of the second eccentric portion 248e.

The inclined region 259b is formed to continue from an edge of the concave region 258b on the side of the first eccentric portion 248d. The inclined region 259b is formed within the protruding area A2 of the first eccentric portion 248d. Further, the inclined region 259b is formed in a linear taper shape having an axial sectional area which expands radially outward, toward the first eccentric portion 248d, and a taper angle of about 15°. Each of the inclined region 259b and the concave region 258b has a center on the axis C4 of the second eccentric portion 248e.

Figure 25:
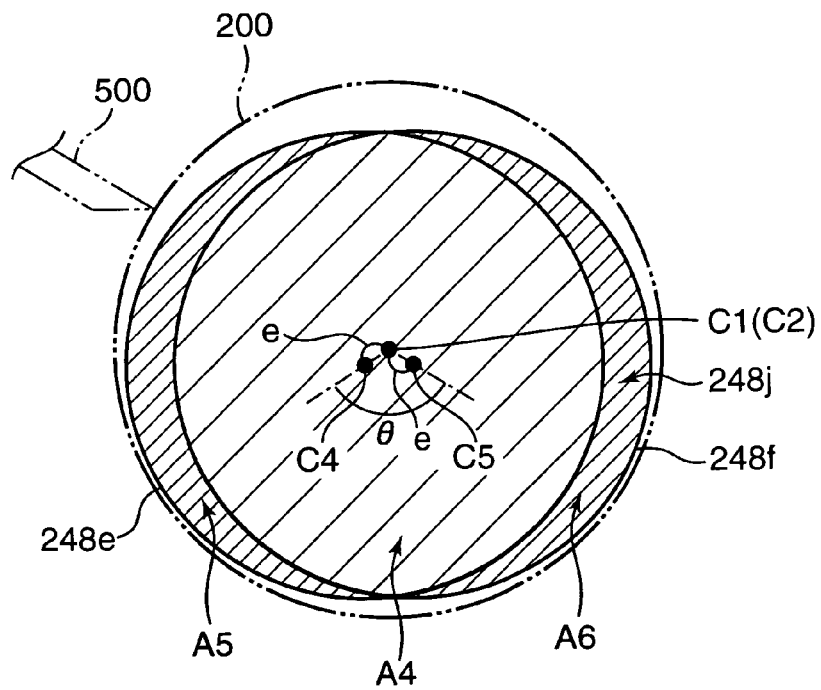
FIG. 25 is a schematic diagram showing respective configurations of the second eccentric portion and a third eccentric portion in the crankshaft illustrated in FIG. 21.

The fourth connection portion 248j is formed between the second eccentric portion 248e and the third eccentric portion 248f, to connect the second eccentric portion 248e and the third eccentric portion 248f to each other. The fourth connection portion 248j is formed in a shaded area in FIG. 25, viewed in the axial direction. Specifically, the fourth connection portion 248j is formed over an overlapping area A4 between the second and third eccentric portions 248e, 248f located on both sides thereof, an area A5 of the second eccentric portion 248e protruding from the overlapping area A4, and an area A6 of the third eccentric portion 248f protruding from the overlapping area A4, when viewed in the axial direction. The fourth connection portion 248j has an outer periphery partially defined by an arc which extends within the protruding area A5 of the second eccentric portion 248e and has a center located coaxially with the axis C5 of the third eccentric portion 248f, in a section perpendicular to the axial direction. Further, the remaining outer periphery of the fourth connection portion 248j is defined by an arc which extends within the protruding area A6 of the third eccentric portion 248f and has a center located coaxially with the axis C4 of the second eccentric portion 248e, in the section perpendicular to the axial direction.

The fourth connection portion 248j includes two concave regions 268a, 268b, and two inclined regions 269a, 269b. The concave region 268a is formed to continue from an edge of the third eccentric portion 248f on the side of the second eccentric portion 248e and extend over the entire circumference of the fourth connection portion 248j. Further, the concave region 268a is located radially inward relative to the third eccentric portion 248f. The concave region 268a has an axial width which gradually decreases in a direction from the protruding area A5 of the second eccentric portion 248e to the protruding area A6 of the third eccentric portion 248f.

The inclined region 269a is formed to continue from an edge of the concave region 268a on the side of the second eccentric portion 248e. The inclined region 269a is formed within the protruding area A5 of the second eccentric portion 248e. Further, the inclined region 269a is formed in a linear taper shape having an axial sectional area which expands radially outward, toward the second eccentric portion 248e, and a taper angle of about 15°. Each of the inclined region 269a and the concave region 268a has a center on the axis C5 of the third eccentric portion 248f.

The concave region 268b is formed to continue from an edge of the second eccentric portion 248e on the side of the third eccentric portion 248f and extend over the entire circumference of the fourth connection portion 248j. Further, the concave region 268b is located radially inward relative to the second eccentric portion 248e. The concave region 268b has an axial width which gradually decreases in a direction from the protruding area A6 of the third eccentric portion 248f to the protruding area A5 of the second eccentric portion 248e.

The inclined region 269b is formed to continue from an edge of the concave region 268b on the side of the third eccentric portion 248f. The inclined region 269b is formed within the protruding area A6 of the third eccentric portion 248f. Further, the inclined region 269b is formed in a linear taper shape having an axial sectional area which expands radially outward, toward the third eccentric portion 248f, and a taper angle of about 15°. Each of the inclined region 269b and the concave region 268b has a center on the axis C4 of the second eccentric portion 248e.

Except for the above differences, the speed reducer 10 according to the fourth embodiment has the same structure/configuration as that of the speed reducer 10 according to the first embodiment.

A method of producing the crankshaft 248 of the speed reducer 10 according to the fourth embodiment will be described below.

In this method, a material 200 (see FIG. 24) of the crankshaft 248 is firstly prepared. As the crankshaft material 200, a columnar-shaped metal member having a diameter capable of encompassing respective portions of the crankshaft 248 when viewed in the axial direction is prepared. Then, the crankshaft material 200 is held by a chuck, and a region for forming the first shaft portion 248*b* and a region for forming the second shaft portion 248*c* in the crankshaft material 200 is cut by a turning tool 500 (cutting tool) while rotating the crankshaft material 200 about the axes C1, C2 of the first and second shaft portions 248*b* and 248*c*. Thus, the first shaft portion 248*b* and the second shaft portion 248*c* are formed in the crankshaft material 200.

Then, the crankshaft material 200 is held by an eccentric chuck, and a region for forming the first eccentric portion 248*d* in the crankshaft material 200 is cut by a turning tool 500 while rotating the crankshaft material 200 about the axis C3 of the first eccentric portion 248*d*. During this cutting process, the turning tool 500 is moved relative to the crankshaft material 200 in a direction from the first shaft portion 248*b* to the second shaft portion 248*c*. Thus, the first eccentric portion 248*d* is formed in the crankshaft material 200.

Successively, a region for forming the concave region 258*a* closer to the first eccentric portion 248*d* on the side of the second shaft portion 248*c* is cut by the same turning tool 500 while rotating the crankshaft material 200 about the axis C3. Further successively, the crankshaft material 200 is cut by the same turning tool 500 while being rotated about the axis C3, to form a taper-shaped region continuing from an edge of the concave region 258*a* on the side of the second shaft portion 248*c*. This taper-shaped region is formed to have a linear taper shape in axial section having an outward edge which expands outward, toward the second eccentric portion 248*e*.

Then, a rotational axis of the crankshaft material 200 held by an eccentric chuck is moved to the axis C4 of the second eccentric portion 248*e*, and then a region for forming the second eccentric portion 248*e* is cut by a turning tool 500 while rotating the crankshaft material 200 about the axis C4 of the second eccentric portion 248*e*. During this cutting process, the turning tool 500 is moved relative to the crankshaft material 200 in a direction from the second shaft portion 248*c* to the first shaft portion 248*b*. Thus, the second eccentric portion 248*e* is formed in the crankshaft material 200.

Successively, a region for forming the concave region 258*b* closer to the second eccentric portion 248*e* on the side of the first eccentric portion 248*d* is cut by the same turning tool 500 while rotating the crankshaft material 200 about the axis C4. During this cutting process, a part of the above taper-shaped region is cut away. Specifically, during this cutting process, the area A2 of the first eccentric portion 248*d* protruding from the overlapping area A1 between the first eccentric portion 248*d* and the second eccentric portion 248*e* when viewed in the axial direction is largely cut away. Further, the taper-shaped region is less removed toward the area A3 of the second eccentric portion 248*e* protruding from the overlapping area A1 between the first and second eccentric portions 248*d*, 248*e*, when viewed in the axial direction, i.e., a cutting or removal amount in the taper-shaped region is reduced toward the area A3. In this manner, the concave region 258*b* closer to the second eccentric portion 248*e* on the side of the first eccentric portion 248*d* is formed.

Further successively, the crankshaft material 200 is cut by the same turning tool 500 while being rotated about the axis C4, to form a taper-shaped region continuing from an edge of the concave region 258*b* on the side of the first eccentric portion 248*d*. This taper-shaped region is formed to have a linear taper shape in axial section having an outward edge which expands outward, toward the first eccentric portion 248*d*. During this cutting process, on the side of the protruding area A2 of the first eccentric portion 248*d*, the taper-shaped region is cut away. In contrast, on the side of the protruding area A3 of the second eccentric portion 248*e*, the taper-shaped region is not cut away because the turning tool 500 is not in contact with the crankshaft material 200. In this manner, the inclined region 259*b* continuing from the concave region 258*b* to the first eccentric portion 248*d* is formed in the protruding area A2 of the first eccentric portion 248*d*, and the inclined region 259*a* continuing from the concave region 258*a* to the second eccentric portion 248*e* is formed in the protruding area A3 of the second eccentric portion 248*e*. Thus, the third connection portion 248*i* is made up of the inclined regions 259*a*, 259*b* and the concave regions 258*a*, 258*b*.

Then, a region for forming the concave region 268*b* closer to the second eccentric portion 248*e* on the side of the second shaft portion 248*c* is cut by the same turning tool 500 while rotating the crankshaft material 200 about the axis C4. Further successively, the crankshaft material 200 is cut by the same turning tool 500 while being rotated about the axis C4, to form a taper-shaped region continuing from an edge of the concave region 268*b* on the side of the second shaft portion 248*c*. This taper-shaped region is formed to have a linear taper shape in axial section having an outward edge which expands outward, toward the second shaft portion 248*c*.

Then, a rotational axis of the crankshaft material 200 held by an eccentric chuck is moved to the axis C5 of the third eccentric portion 248*f*, and then a region for forming the third eccentric portion 248*f* is cut by a turning tool 500 while rotating the crankshaft material 200 about the axis C5 of the third eccentric portion 248*f*. During this cutting process, the turning tool 500 is moved relative to the crankshaft material 200 in a direction from the second shaft portion 248*c* to the first shaft portion 248*b*. Thus, the third eccentric portion 248*f* is formed in the crankshaft material 200.

Successively, a region for forming the concave region 268*a* closer to the third eccentric portion 248*f* on the side of the second eccentric portion 248*e* is cut by the same turning tool 500 while rotating the crankshaft material 200 about the axis C5. During this cutting process, a part of the taper-shaped region formed to continue from an edge of the concave region 268*b* on the side of the second shaft portion 248*c* is cut away. Specifically, during this cutting process, the area A5 of the second eccentric portion 248*e* protruding from the overlapping area A4 between the second eccentric portion 248*e* and the third eccentric portion 248*f* when viewed in the axial direction is largely cut away. Further, the taper-shaped region is less removed toward the area A6 of the third eccentric portion 248*f* protruding from the overlapping area A4 between the second and third eccentric portions 248*e*, 248*f*, when viewed in the axial direction, i.e., a cutting amount in the taper-shaped region is reduced toward the area A6. In this manner, the concave region 268*a* closer to the third eccentric portion 248*f* on the side of the second eccentric portion 248*e* is formed.

Further successively, the crankshaft material 200 is cut by the same turning tool 500 while being rotated about the axis C5, to form a taper-shaped region continuing from an edge of the concave region 268*a* on the side of the second eccentric portion 248*e*. This taper-shaped region is formed to have a linear taper shape in axial section having an outward edge which expands outward, toward the second eccentric portion 248*e*. During this cutting process, on the side of the protruding area A5 of the second eccentric portion 248*e*, the taper-shaped region formed to continue from an edge of the concave region 268b on the side of the second shaft portion 248c is cut away. In contrast, on the side of the protruding area A6 of the third eccentric portion 248f, the taper-shaped region is not cut away because the turning tool 500 is not in contact with the crankshaft material 200. In this manner, the inclined region 269a continuing from the concave region 268a to the second eccentric portion 248e is formed in the protruding area A5 of the second eccentric portion 248e, and the inclined region 269b continuing from the concave region 268b to the third eccentric portion 248f is formed in the protruding area A6 of the third eccentric portion 248f. Thus, the fourth connection portion 248j is made up of the inclined regions 269a, 269b and the concave regions 268a, 268b.

Then, an rotational axis of the crankshaft material 200 is moved to the axes C1, C2 of the first and second shaft portions 248b, 248c, and then a region for forming the first connection portion 248g between the first shaft portion 248b and the first eccentric portion 248d and a region for forming the second connection portion 248h between the second shaft portion 248c and the second eccentric portion 248h are cut while rotating the crankshaft material 200 about the axes C1, C2. Thus, the first connection portion 248g and the second connection portion 248h are formed in the crankshaft material 200.

Figure 26:
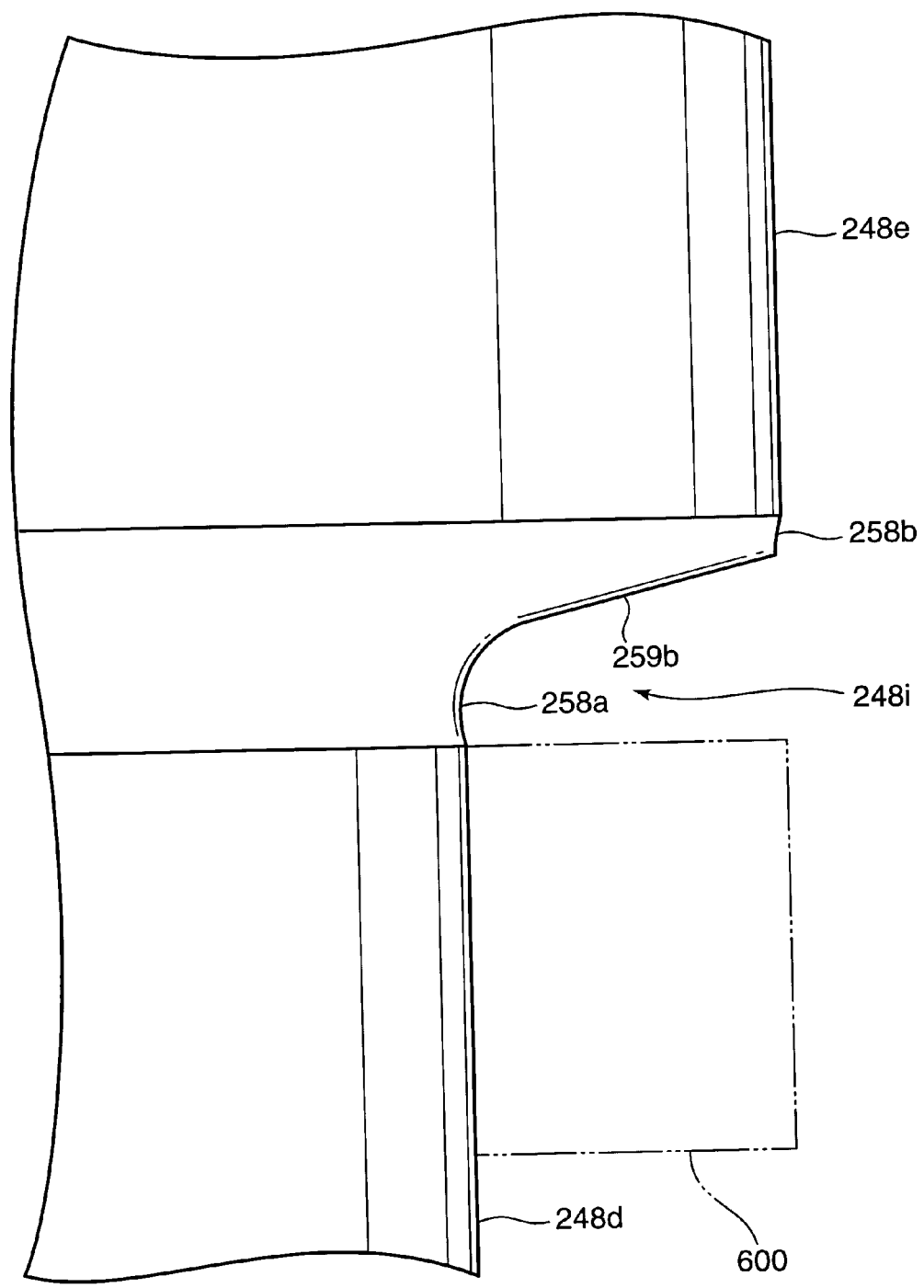
FIG. 26 is a fragmentary enlarged view showing a third connection portion connecting the first and second eccentric portions of the crankshaft in the speed reducer according to the fourth embodiment.

Subsequently, the crankshaft material 200 is subjected to a carburizing treatment, and then respective surfaces of the first to third eccentric portions 248d to 248f is polished by a buff 600 (see FIG. 26) serving as a polishing tool. In this polishing process, the first eccentric portion 248d is polished while rotating the crankshaft material 200 about the axis C3 of the first eccentric portion 248d and bringing the buff 600 into contact with the surface of the first eccentric portion 348d. Further, as shown in FIG. 26, when an edge of the first eccentric portion 248d on the side of the third connection portion 248i is polished, the concave region 258a of the third connection portion 248i acts as an undercut for avoiding interference with the buff 600. For example, if the third connection portion 248i has only the inclined region 259b continuing from the first eccentric portion 248d without the concave region 258a, it is difficult to accurately polish the first eccentric portion 248d including its edge by the buff 600. In this embodiment, the concave region 258a makes it possible to avoid interference between the buff 600 and the third connection portion 248i even if the buff 600 protrudes from the first eccentric portion 248d toward the third connection portion 248i to some extent. Thus, the first eccentric portion 248d including its edge on the side of the third connection portion 248i can be accurately polished.

The second eccentric portion 248e is polished while rotating the crankshaft material 200 about the axis C4 of the second eccentric portion 248e and bringing the buff 600 into contact with the surface of the second eccentric portion 348e. As with the concave region 258a, the concave region 258b of the third connection portion 248i acts as an undercut for avoiding interference with the buff 600 when an edge of the second eccentric portion 248e on the side of the third connection portion 248i is polished, and the concave region 268b of the fourth connection portion 248j acts as an undercut for avoiding interference with the buff 600 when an edge of the second eccentric portion 248e on the side of the fourth connection portion 248j is polished. Thus, the surface of the second eccentric portion 248e including its edges on the side of the third and fourth connection portions 248i, 248j can be accurately polished.

The third eccentric portion 248f is polished while rotating the crankshaft material 200 about the axis C5 of the third eccentric portion 248f and bringing the buff 600 into contact with the surface of the third eccentric portion 348f. As with the concave region 258a, the concave region 268a of the fourth connection portion 248j acts as an undercut for avoiding interference with the buff 600 when an edge of the third eccentric portion 248f on the side of the fourth connection portion 248j is polished. Thus, the surface of the third eccentric portion 248f including its edge on the side of the fourth 248j can be accurately polished. Through the above process, the crankshaft 248 in this embodiment is produced.

As described above, in the crankshaft 248 of the speed reducer 10 according to the fourth embodiment, the third connection portion 248i has the concave region 258a formed to continue from the first eccentric portion 248d and located radially inward relative to the first eccentric portion 248d, and the concave region 258b formed to continue from the second eccentric portion 248e and located radially inward relative to the second eccentric portion 248e. Thus, in the process of polishing the edge of the first eccentric portion 248d, the concave region 258a makes it possible to avoid interference between the buff 600 and the third connection portion 248i even if the buff 600 protrudes on the side of the second eccentric portion 248e. In the process of polishing the edge of the second eccentric portion 248e, the concave region 258b makes it possible to avoid interference between the buff 600 and the third connection portion 248i even if the buff 600 protrudes on the side of the first eccentric portion 248d. Further, in the crankshaft 248 of the speed reducer 10 according to the fourth embodiment, the fourth connection portion 248j has the concave region 268b formed to continue from the second eccentric portion 248e and located radially inward relative to the second eccentric portion 248e, and the concave region 268a formed to continue from the third eccentric portion 248f and located radially inward relative to the third eccentric portion 248f. Thus, in the process of polishing the edge of the second eccentric portion 248e, the concave region 268b makes it possible to avoid interference between the buff 600 and the fourth connection portion 248j even if the buff 600 protrudes on the side of the third eccentric portion 248f. In the process of polishing the edge of the third eccentric portion 248f, the concave region 268a makes it possible to avoid interference between the buff 600 and the fourth connection portion 248j even if the buff 600 protrudes on the side of the second eccentric portion 248e. This makes it possible to accurately polish the first, second and third eccentric portions 248d, 248e, 248f including their edges.

In the crankshaft 248 of the speed reducer 10 according to the fourth embodiment, the third connection portion 248i is formed over the overlapping area A1 between the first eccentric portion 248d and the second eccentric portion 248e located on both sides thereof, the area A2 of the first eccentric portion 248d protruding from the overlapping area A1, and the area A3 of the second eccentric portion 248e protruding from the overlapping area A1, when viewed in the axial direction. Thus, as compared with a crankshaft where a connection portion is formed only the overlapping area A1 between the first eccentric portion 248d and the second eccentric portion 248e when viewed in the axial direction, a sectional area of the third connection portion 248i in the section perpendicular to the axial direction can be increased. Further, the fourth connection portion 248j is formed over the overlapping area A4 between the second eccentric portion 248e and the third eccentric portion 248f located on both sides thereof, the area A5 of the second eccentric portion 248e protruding from the overlapping area A4, and the area A6 of the third eccentric portion 248f protruding from the overlapping area A4, when viewed in the axial direction. Thus, as compared with a crankshaft where a connection portion is formed only the overlapping area A4 between the second eccentric portion 248e and the third eccentric portion 248f when viewed in the axial direction, a sectional area of the fourth connection portion 248j in the section perpendicular to the axial direction can be increased. This configuration in the fourth embodiment makes it possible to increase the strength of the third connection portion 248i and the fourth connection portion 248j so as to provide enhanced strength of the crankshaft 248.

In the crankshaft 248 of the speed reducer 10 according to the fourth embodiment, the third connection portion 248i has an outer periphery partially defined by an arc which extends within the protruding area A2 of the first eccentric portion 248d and has a center located coaxially with the axis C4 of the second eccentric portion 248e, in the section perpendicular to the axial direction. Further, the remaining outer periphery of the third connection portion 248i is defined by an arc which extends within the protruding area A3 of the second eccentric portion 248e and has a center located coaxially with the axis C3 of the first eccentric portion 248d, in the section perpendicular to the axial direction. Thus, the second eccentric portion 248e, and the outer periphery of the third connection portion 248i within the protruding area A2 of the first eccentric portion 248d, can be formed by cutting the crankshaft material 200 while rotating the crankshaft material 200 about the axis C4 of the second eccentric portion 248e. Further, the first eccentric portion 248d, and the outer periphery of the third connection portion 248i within the protruding area A3 of the second eccentric portion 248e, can be formed by cutting the crankshaft material 200 while rotating the crankshaft material 200 about the axis C3 of the first eccentric portion 248d. This makes it possible to form the second eccentric portion 248e and the outer periphery of the third connection portion 248i within the protruding area A2 of the first eccentric portion 248d, through a continuous process without changing the rotational axis of the crankshaft material 200, and to form the first eccentric portion 248d and the outer periphery of the third connection portion 248i within the protruding area A3 of the second eccentric portion 248e, through a continuous process without changing the rotational axis of the crankshaft material 200. In the crankshaft 248 of the speed reducer 10 according to the fourth embodiment, the fourth connection portion 248j has an outer periphery partially defined by an arc which extends within the protruding area A5 of the second eccentric portion 248e and has a center located coaxially with the axis C5 of the third eccentric portion 248f, in a section perpendicular to the axial direction. Further, the remaining outer periphery of the fourth connection portion 248j is defined by an arc which extends within the protruding area A6 of the third eccentric portion 248f and has a center located coaxially with the axis C4 of the second eccentric portion 248e, in the section perpendicular to the axial direction. Thus, the third eccentric portion 248f, and the outer periphery of the fourth connection portion 248j within the protruding area A5 of the second eccentric portion 248e, can be formed by cutting the crankshaft material 200 while rotating the crankshaft material 200 about the axis C5 of the third eccentric portion 248f. Further, the second eccentric portion 248e, and the outer periphery of the fourth connection portion 248j within the protruding area A6 of the third eccentric portion 248f, can be formed by cutting the crankshaft material 200 while rotating the crankshaft material 200 about the axis C4 of the second eccentric portion 248e. This makes it possible to form the third eccentric portion 248f and the outer periphery of the fourth connection portion 248j within the protruding area A5 of the second eccentric portion 248e, through a continuous process without changing the rotational axis of the crankshaft material 200, and to form the second eccentric portion 248e and the outer periphery of the fourth connection portion 248j within the protruding area A6 of the third eccentric portion 248f, through a continuous process without changing the rotational axis of the crankshaft material 200. Thus, the crankshaft 248 of the speed reducer 10 according to the fourth embodiment makes it possible to reduce a process time and operational burden required for changing the rotational axis of the crankshaft material 200 during machining of the crankshaft 248, so as to simplify the production process of the crankshaft 248.

In the crankshaft 248 of the speed reducer 10 according to the fourth embodiment, the third connection portion 248i includes the inclined region 259b having an axial section formed in a linear taper shape within the protruding area A2 of the first eccentric portion 248d, and the inclined region 259a having an axial section formed in a linear taper shape within the protruding area A3 of the second eccentric portion 248e. Thus, the third connection portion 248i can have a shape smoothly connected to the first eccentric portion 248d and the second eccentric portion 248e. This makes it possible to reduce stress concentration occurring in each junction between the third connection portion 248i and the first eccentric portion 248d/the second eccentric portion 248e, as compared with a crankshaft where a step is formed in each junction between the third connection portion 248i and the first eccentric portion 248d/the second eccentric portion 248e. Further, in the crankshaft 248 of the speed reducer 10 according to the fourth embodiment, the fourth connection portion 248j includes the inclined region 269a having an axial section formed in a linear taper shape within the protruding area A5 of the second eccentric portion 248e, and the inclined region 269b having an axial section formed in a linear taper shape within the protruding area A6 of the third eccentric portion 248f. Thus, the fourth connection portion 248j can have a shape smoothly connected to the second eccentric portion 248e and the third eccentric portion 248f. This makes it possible to reduce stress concentration occurring in each junction between the fourth connection portion 248j and the second eccentric portion 248e/the third eccentric portion 248f, as compared with a crankshaft where a step is formed in each junction between the fourth connection portion 248j and the second eccentric portion 248e/the third eccentric portion 248f. Thus, the crankshaft 248 of the speed reducer 10 according to the fourth embodiment makes it possible to suppress the occurrence of cracks due to stress concentration in each junction between the third connection portion 248i and the first eccentric portion 248d/the second eccentric portion 248e and between the fourth connection portion 248j and the second eccentric portion 248e/the third eccentric portion 248f.

In the production method for the crankshaft 248 of the speed reducer 10 according to the fourth embodiment, the process of forming the outer periphery of the third connection portion 248i within the protrusion area A2 of the first eccentric portion 248d, and the process of forming the second eccentric portion 248e, are performed as a continuous process of cutting the crankshaft material 200 using the bite 500 while rotating the crankshaft material 200 about the axis C4 of the second eccentric portion 248e. In addition, the process of forming the outer periphery of the third connection portion 248i within the protrusion area A3 of the second eccentric portion 248e, and the process of forming the first eccentric portion 248d, are performed as a continuous process of cutting the crankshaft material 200 using the bite 500 while rotating the crankshaft material 200 about the axis C3 of the first eccentric portion 248d. Further, in the production method for the crankshaft 248, the process of forming the outer periphery of the fourth connection portion 248j within the protrusion area A5 of the second eccentric portion 248e, and the process of forming the third eccentric portion 248f, are performed as a continuous process of cutting the crankshaft material 200 using the bite 500 while rotating the crankshaft material 200 about the axis C5 of the third eccentric portion 248f. In addition, the process of forming the outer periphery of the fourth connection portion 248j within the protrusion area A6 of the third eccentric portion 248f, and the process of forming the second eccentric portion 248e, are performed as a continuous process of cutting the crankshaft material 200 using the bite 500 while rotating the crankshaft material 200 about the axis C4 of the second eccentric portion 248e. This makes it possible to reduce a process time and operational burden required for changing the rotational axis of the crankshaft material 200 and the cutting tool during machining of the crankshaft 248, so as to simplify the production process of the crankshaft 248. In addition, the number of cutting tool types required for machining the crankshaft 248 can also be reduced.

The speed reduce 10 according to the fourth embodiment employing the above crankshaft 248 can utilize the above feature of the crankshaft 248 having enhanced strength. Generally, if each diameter of the first to third externally-toothed gears 44a to 44c is reduced to facilitate reduction in size of the speed reducer, a torque required for rotating the first to third externally-toothed gears 44a to 44c will be increased, and thereby a load to be imposed on the crankshaft 248 when transferring a torque from the crankshaft 248 to rotate the first to third externally-toothed gears 44a to 44c will be increased. In the speed reduce 10 according to the fourth embodiment, the crankshaft 248 can have enhanced strength as described above to suppress damages thereof. Thus, the speed reduce 10 according to the fourth embodiment can facilitate reduction in size while suppressing damages of the crankshaft 248.

Fifth Embodiment

Differently from the first to fourth embodiments, in addition to the crankshaft bearings 56, 57 for supporting a crankshaft 48, a speed reducer 10 according to a fifth embodiment includes an intermediate bearing member 346 disposed between the crankshaft bearings 56, 57 to further support the crankshaft 48.

Figure 27:
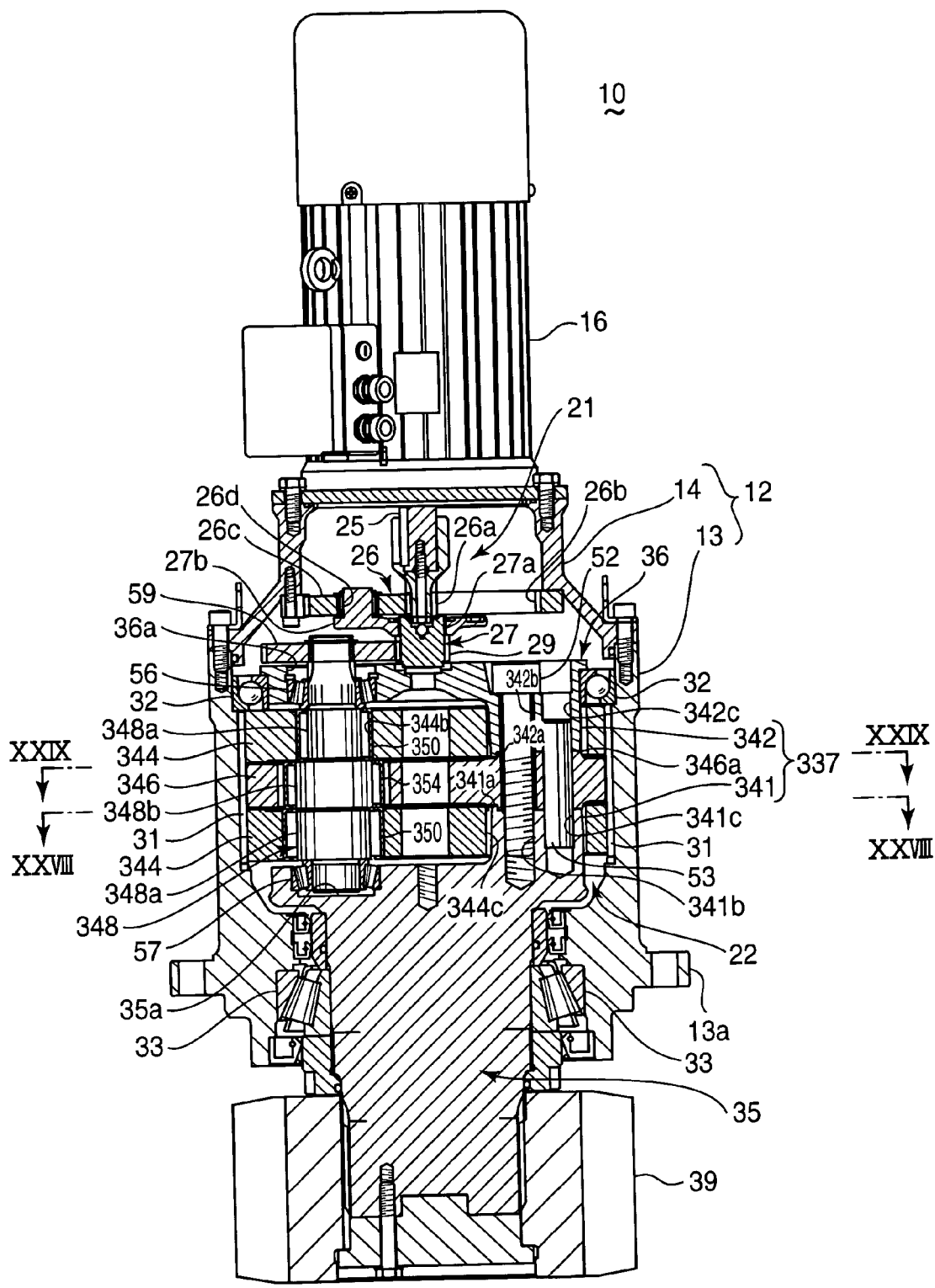
FIG. 27 is a sectional view showing the structure of a differential/oscillating type speed reducer according to a fifth embodiment of the present invention.

Specifically, as shown in FIG. 27, two externally-toothed gears 344, 344 (externally-toothed gear members) and the intermediate bearing member 346 are disposed within a closed space defined between a base member 35 and an end plate member 36 inside a cylinder member 13. Three crankshafts 348 are disposed to penetrate the externally-toothed gears 344, 344 and the intermediate bearing member 346.

Further, in the fifth embodiment, a shaft portion 337 serving as a carrier 22 is divided into a base-side shaft portion 341 fixed to the base member 35, and an end-side shaft portion 342 fixed to the end plate 36. The base-side shaft portion 341 is formed in a columnar shape extending axially upward from a top surface of the base member 35, and the end-side shaft portion 342 is formed in a columnar shape extending axially downward from a bottom surface of the end plate member 36. The base-side shaft portion 341 and the end-side shaft portion 342 are disposed in opposed relation to each other. The speed reducer 10 according to the fifth embodiment includes three of the shaft portions 337, and each of the shaft portions is formed in a sectionally approximately-rectangular shape.

Figure 28:
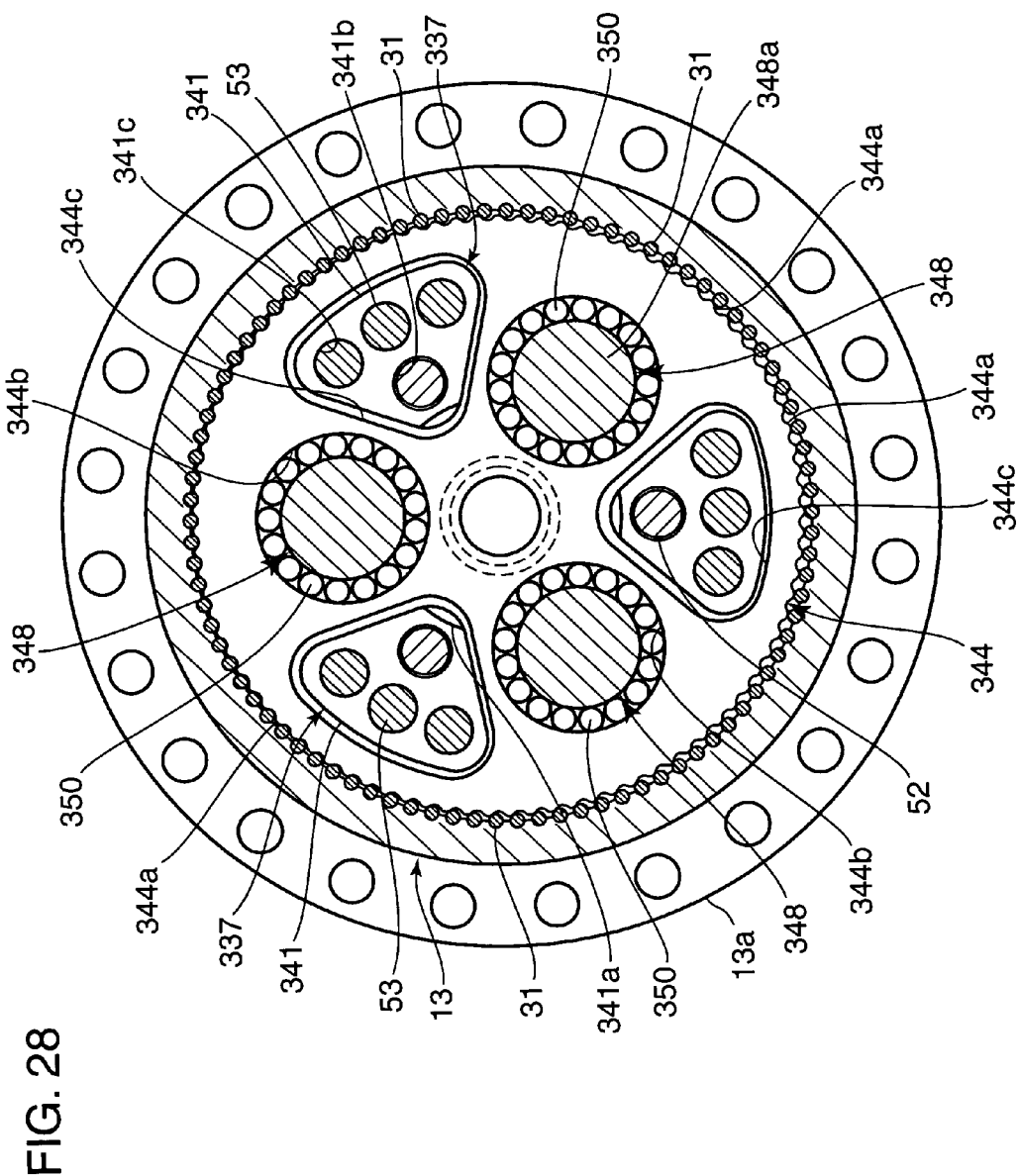
FIG. 28 is a sectional view taken along the line XXVIII-XXVIII in FIG. 27.

The two externally-toothed gears 344 are disposed in an axial direction of the speed reducer 10 (in a vertical direction). Each of the externally-toothed gears 344 has the same structure/configuration. As shown in FIG. 28, each of the externally-toothed gears 344 is formed to have a diameter slightly less than an inner diameter of the cylinder member 13, and formed with external teeth 344a meshingly engageable with pin teeth 31 of the cylinder member 13. The number of external teeth 344a of the externally-toothed gear 344 is set to be slightly less than that of the pin teeth 31, for example, by one.

Each of the externally-toothed gears 344 is formed with a first through-hole 344b and a second through-hole 344c. The first through-hole 344b is formed in a circular shape. The first through-hole 344b is formed correspondingly to the crankshaft 48. That is, three of the first through-holes 344b are formed in each of the externally-toothed gears 344 in the circumferential direction at even intervals, and each of the crankshafts 348 is inserted into a corresponding one of the first through-holes 344b through a roller bearing 350.

The shaft portion 337 is inserted through the second through-hole 344c. The second through-hole 344c is formed in an approximately rectangular shape having an area slightly greater than that of the shaft portion 337 to define a given gap therebetween. The second through-hole 344c is formed correspondingly to the shaft portion 337. That is, three of the second through-holes 344c are formed in each of the externally-toothed gears 344 in the circumferential direction at even intervals.

As shown on FIG. 27, each of the crankshafts 348 is rotatably supported by the pair of upper and lower crankshaft bearings 56, 57 and the intermediate bearing member 346. Each of the crankshafts 348 has an upper end protruding upward from the upper crankshaft bearing 56, and the upper end is provided with an externally-toothed driven gear 59. Each of the externally-toothed driven gears 59 is in meshing engagement with an externally-toothed drive gear 29. Respective structures of the crankshaft bearings 56, 57 for supporting the crankshaft 348 and respective structure of the externally-toothed driven gear 59 and the externally-toothed drive gear 29 are the same as those in the first embodiment.

Figure 29:
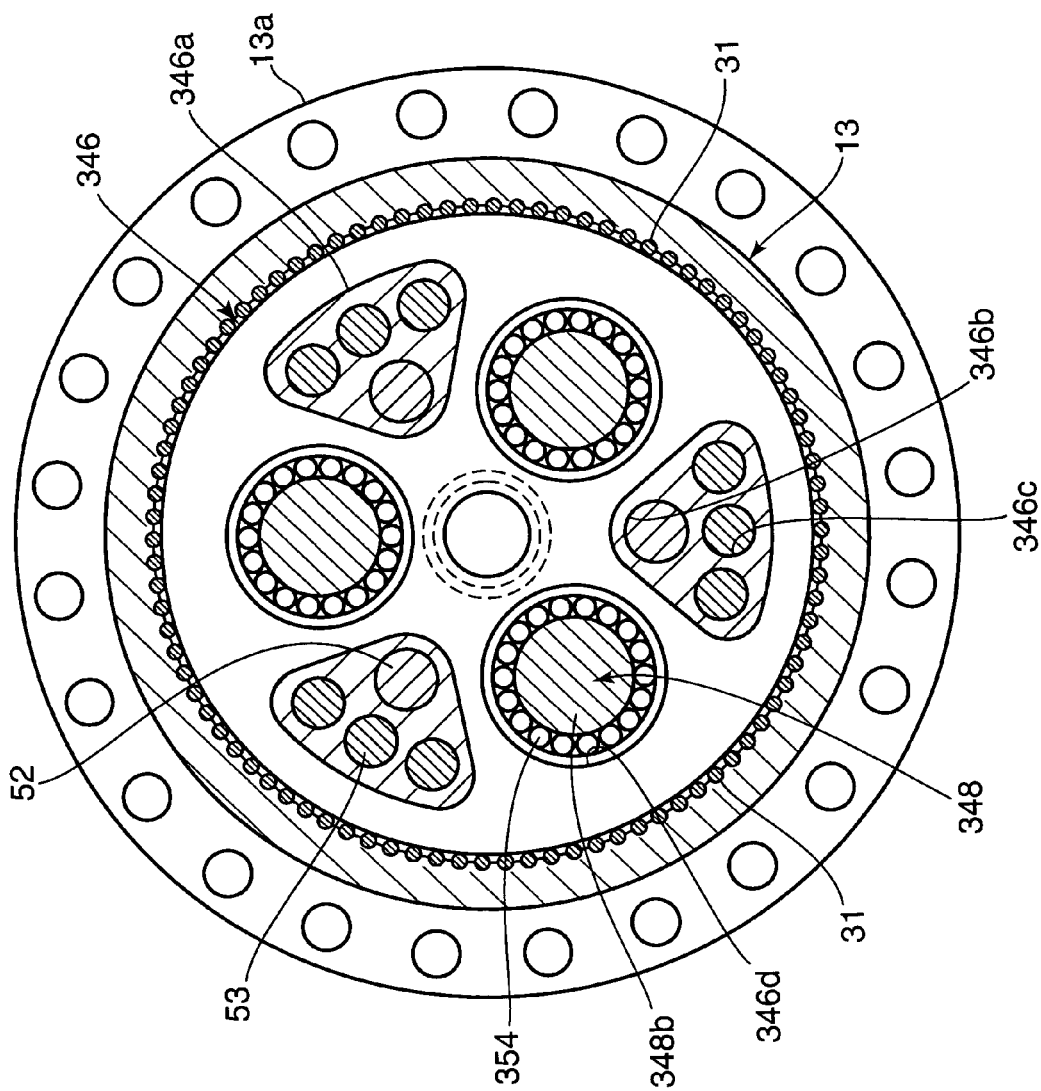
FIG. 29 is a sectional view taken along the line XXIX-XXIX in FIG. 27.
Figure 30:
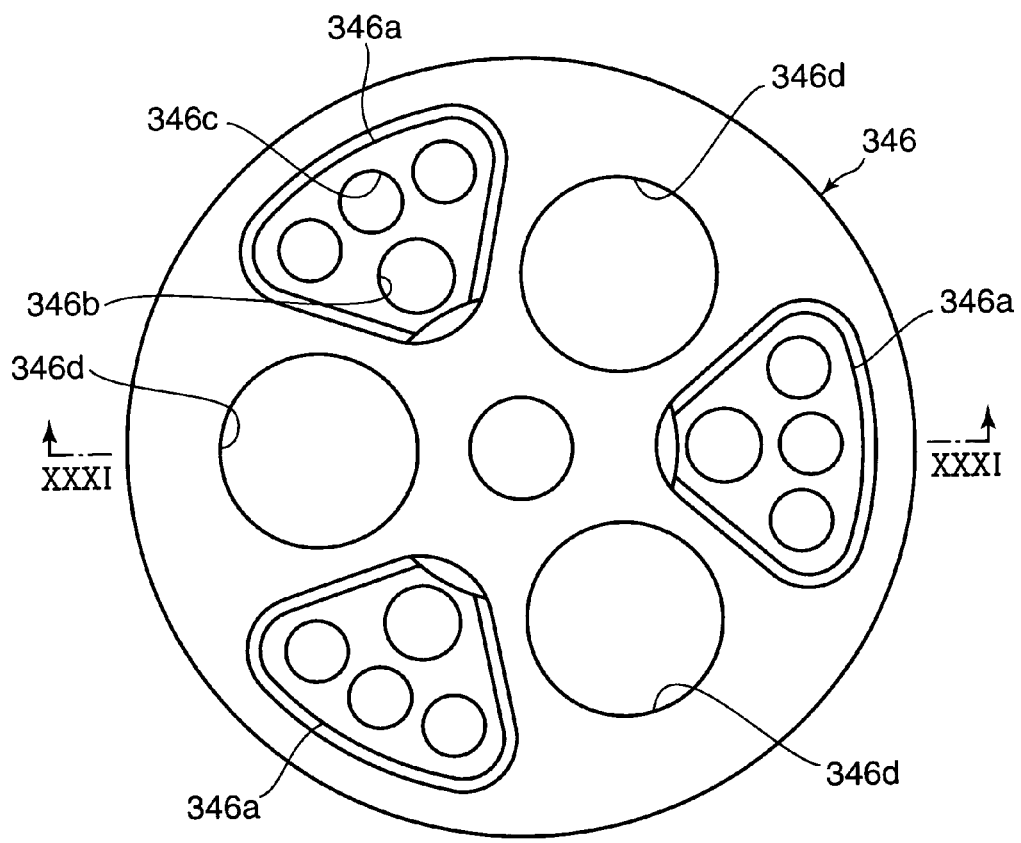
FIG. 30 is a top plan view of an intermediate bearing member in the speed reducer according to the fifth embodiment.

The crankshaft 348 is formed with two eccentric portions 348a, 348a disposed correspondingly to the externally-toothed gears 344, and a large-diameter portion 348b disposed between the eccentric portions 348a. The large diameter portion 348b is formed in a columnar shape having an axis coaxial with that of the crankshaft 348. Each of the eccentric portions 348a is formed in a columnar shape having an axis eccentric to that of the crankshaft 348. Further, the eccentric portions 348a are formed to have a phase difference of 180 degrees with respect to each other. The eccentric portions 348a are disposed, respectively, in the first through-holes 344b of the externally-toothed gears 344. Thus, the externally-toothed gears 344, 344 are revolved while being meshed with the pin teeth 31, with the phase difference of 180 degrees therebetween As shown in FIGS. 29 and 30, the intermediate bearing member 346 is formed in a disk shape. A certain gap is defined between an outer periphery of the intermediate bearing member 346 and the pin teeth 31 disposed in a circumferential pattern.

The intermediate bearing member 346 is disposed between the externally-toothed gears 344, 344. Further, the intermediate bearing member 346 is clamped between and supported by the base-side shaft portion 341 and the end-side shaft portion 342. More specifically, the intermediate bearing member 346 is supported by the three shaft portions 337. That is, the intermediate bearing member 346 is integrally formed with three intermediate bearing members to be used for the three crankshafts 348 individually, and shared by the three crankshafts 348.

Figure 31:
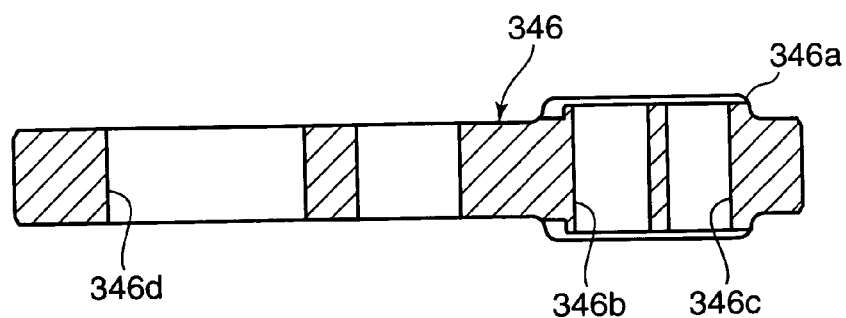
FIG. 31 is a sectional view taken along the line XXXI-XXXI in FIG. 30.

As shown in FIG. 31, a portion of the intermediate bearing member 346 corresponding to the base-side shaft portion 341 and the end-side shaft portion 342 are formed to have a thickness greater than that of the remaining portion. This thick-walled portion 346a has an approximately-rectangular shape. Each of the base-side shaft portions 341 has a top surface (top end face) formed with a protrusion 341a. Each of the protrusions 341a is formed at one apex of the rectangular-shaped top end face to be located on the side of the center of the externally-toothed gears 344, and adapted to be engageable with a side surface region of the thick-walled portion 346a of the intermediate bearing member 346 to be located on the side of the center of the externally-toothed gears 344. Thus, the three base-side shaft portions 341 are fittingly engaged with the intermediate bearing member 346. Further, in the same manner, a protrusion 342a is formed in each bottom surface (bottom end face) of the end-side shaft portions 342, and the three end-side shaft portions 342 are fittingly engaged with the intermediate bearing member 346.

The base-side shaft portion 341 is formed with a bottomed bolt hole 341b, and the end-side shaft portion 342 and the intermediate bearing member 346 are formed, respectively, with bolt insertion holes 342b, 346b in alignment with the bolt hole 341b. A bolt 52 inserted into the bolt insertion holes 342b, 346b is screwed with the bolt hole 341b of the base-side shaft portion 341. The base-side shaft portion 341, the end-side shaft portion 342 and the intermediate bearing member 346 are formed, respectively, with pin holes 341c, 342c, 346c aligned with each other, and a pin 53 is inserted across the pin holes 341c, 342c, 346c. In this manner, the base member 35, the intermediate bearing member 346 and the end plate member 36 are fastened together to avoid a displacement therebetween. Thus, the base member 35, the intermediate bearing member 346 and the end plate member 36 can be integrally rotated about the axis of the cylinder member 13.

The intermediate bearing member 346 is formed with a crankshaft insertion hole 346d for allowing the crankshaft 348 to be inserted therethrough. The number of the crankshafts 348 in this embodiment is three, and therefore three of the crankshaft insertion holes 346d are formed in the intermediate bearing member 346. A roller bearing 354 is fitted in each of the crankshaft insertion holes 346d, and the large-diameter portion 348b of the crankshaft 348 is supported by the intermediate bearing member 346 through the roller bearing 354.

The intermediate bearing member 346 is disposed at a center position between the crankshaft bearings 56, 57 in the axial direction of the crankshaft 348. All of the crankshafts 348 are supported by the crankshaft bearings 56, 57 at a position between the crankshaft bearings 56, 57.

Except for the above differences, the speed reducer 10 according to the fifth embodiment has the same structure/configuration as that of the speed reducer 10 according to the first embodiment.

An operation of the speed reducer 10 according to the fifth embodiment will be described below.

An operation in a period from activation of the drive motor 16 through until each of the crankshafts 348 starts rotating in response to a rotation of the drive shaft 25 of the drive motor 16 is the same as that in the first embodiment. Then, in conjunction with the rotation of the crankshaft 348, the eccentric portions 348a are rotated to induce a revolution of the externally-toothed gears 344 being in meshing engagement with the pin teeth 31 and thereby a revolution of the crankshafts 348. In this movement, the externally-toothed gears 344 are revolved at a speed largely reduced relative to a revolution speed of the crankshaft 348. Then, in conjunction with the revolution of the externally-toothed gears 344, the shaft portions 337 are revolved to rotate the entire carrier 22. Thus, the transfer gear 39 is rotated at a speed significantly reduced relative to the rotational speed of the drive motor 16.

As above, in the fifth embodiment, in addition to the crankshaft bearings 56, 57 for supporting the crankshaft 348, the intermediate bearing member 346 is disposed between the crankshaft bearings 56, 57 to further support the crankshaft 348. Thus, a load to be received by the crankshaft bearings 56, 57 can be reduced to allow the crankshaft bearings 56, 57 to be reduced in diameter while suppressing bending and deformation of the crankshaft 348. This makes it possible to arrange the crankshaft 348 at a position closer to the center of the career 22 so as to facilitate reduction in size of the speed reducer 10.

In the fifth embodiment, the intermediate bearing member 346 can be fixed to the plurality of shaft portions 337 arranged along the circumferential direction, to effectively prevent the intermediate bearing member 346 from being wobbled or deformed. In addition, the shaft portion 337 is divided into two parts, and the intermediate bearing member 346 is clamped therebetween. Thus, the supporting strength for the intermediate bearing member 346 can be effectively increased to reliably prevent wobbling of the intermediate bearing member 346.

In the fifth embodiment, a certain gap is defined between the intermediate bearing member 346 and the cylinder member 13. Alternatively, the intermediate bearing member 346 may be supported by the cylinder member 13. In this case, the intermediate bearing member 346 may be supported only by an internally-toothed gear member, or may be supported by both the internally-toothed gear member and the support portions 337. This makes it possible to increase an area of the intermediate bearing member 346 to be supported, and support the entire outer periphery of the intermediate bearing member 346. Thus, the supporting strength for the intermediate bearing member 346 can further be increased to facilitate reduction in diameter of the intermediate bearing member 346. The intermediate bearing member 346 supported through its outer periphery can avoid the occurrence of wobbling to suppress wobbling of the crankshaft 348. Thus, a load to be received by the crankshaft bearings 56, 57 can be reduced to allow the crankshaft bearings 56, 57 to be further reduced in diameter. In addition, the cylinder member 13 having relatively high rigidity can be utilized to effectively support the intermediate bearing member 346 without increasing the number of components.

In the fifth embodiment, the intermediate bearing member 346 is disposed at a center position between the crankshaft bearings 56, 57 in the axial direction of the crankshaft 348. Thus, respective load to be received by the crankshaft bearings 56, 57 can be equalized. This makes it possible to support the crankshaft 348 in well balanced manner, and prevent crankshaft 348 from being increased in size.

In the fifth embodiment, the plurality of crankshafts 348 are supported by the single intermediate bearing member 346. This makes it possible to provide enhanced supporting strength for the crankshafts 348 while preventing an increase in the number of components. While a plurality of intermediate bearing members 346 arranged for each of the crankshafts 348 involves the need for allowing the intermediate bearing members 346 to be aligned with each other in the axial direction so as to avoid interference therebetween, the single common intermediate bearing member 346 as in the fifth embodiment makes it possible to support all of the crankshafts 348 at a single position between the crankshaft bearings 56, 57 so as to eliminate the need for increasing a length of the crankshaft 348.

Other Embodiment

It is to be understood that the disclosed embodiments of the invention has been presented for purposes of illustration in all aspects but is not intended to be exhaustive or limited to the invention in the form disclosed. On the contrary, the invention is intended to cover alternatives, modifications and equivalents, which may be included within the spirit and scope of the invention as defined by the appended claims.

For example, instead of the structure in the first embodiment where first, second and third one-thirds of the pin teeth 31 are in meshing engagement, respectively, with the externally-toothed gears 44a, 44b, 44c, the number of pin teeth 31 to be in meshing engagement with each of the externally-toothed gears 44a to 44c may be changed. For example, the externally-toothed gears 44a, 44b, 44c may be designed to be in meshing engagement with the pin teeth 31, respectively, in angular ranges of 115 degrees, 115 degrees and 130 degrees. Even in the case of making a difference between angular ranges for meshing with the pin teeth 13 as in the above example, as long as a sum of the three angular ranges is set just at 360 degrees, a load to be imposed on each of the pin teeth 31 can be reduced. Thus, such a setting is preferable. However, as long as an angular range for meshing between the pin teeth 31 and each of the externally-toothed gears 44a to 44c is less than 180 degrees, even if a sum of the three angular ranges becomes greater than 360 degrees, the number of pin teeth to be simultaneously in meshing engagement with two of the externally-toothed gears 44a to 44c can be reduced to reduced a rotational resistance as compared with the conventional techniques. Thus, it is not essential to set a sum of the angular ranges at 360 degrees.

Further, in the case of making a difference between angular ranges for meshing with the pin teeth 13, an angular range for meshing between the pin teeth 31 and each of the externally-toothed gears 44a to 44c is preferably set at 90 degrees or more. Generally, a mechanism where two or more pin can come into meshing engagement with each of the externally-toothed gears 44a to 44c is operable as a speed reducer 10.

While the first embodiment has been described in connection with one example of shaving off a tooth top, the present invention is not limited to such a manner. For example, the dedendum 62 may be shaved off, or both the addendum 61 and the dedendum 62 may be shaved off. In the case of shaving off both the addendum 61 and the dedendum 62, pin teeth 31 will be in non-contact with a tooth top and a tooth bottom. A circumferential force hardly acts on the tooth top and the tooth bottom. Thus, when both a tooth top and a tooth bottom are shaved off, a deterioration in rotational efficiency of the externally-toothed gears 44a to 44d can be suppressed.

While the second embodiment has been described in connection with one example where the third, second and first bearings 49c, 49b, 49a are attached to the crankshaft 48 in this order, the present invention is not limited to this process. For example, the first, second and third bearings 49a, 49b, 49c may be attached to the crankshaft 48 in this order. Alternatively, the second, first and third bearings 49b, 49a, 49c, or the second, third and first bearings 49b, 49c, 49a, may be attached to the crankshaft 48 in this order.

While the second embodiment has been described in connection with one example where the second bearing 49b is attached from the side of the first eccentric portion 48a along the axial direction and fitted onto the second eccentric portion 48b of the crankshaft 48, the present invention is not limited to this process, but the second bearing 49b may be attached from the side of the third eccentric portion 48c along the axial direction and fitted onto the second eccentric portion 48b of the crankshaft 48.

While the retainer 51 in the second embodiment has been designed to allow the rollers 50 to be detached in a radially outward direction of the crankshaft 48, the present invention is not limited to this structure, but the retainer 51 may be designed to allow the rollers 50 to be detached along an axial direction of the crankshaft 48.

While the retainer 51 in the second embodiment has been designed to allow all of the rollers 50 to be detached therefrom, the present invention is not limited to this structure, but the retainer 51 may be designed to allow at least one or more of the rollers 50 to be detached therefrom. In this case, the retainer 51 may be designed to allow specific one or more of the rollers 50 to be detached therefrom, and fixedly hold the remaining rollers 50.

While all of the first to third bearings 49a to 49c in the second embodiment has been designed to allow the rollers to be detached therefrom, the present invention is not limited to this structure, but the first bearing 49a or/and the third bearing 49c may be designed to preclude any roller 50 from being detached therefrom.

Further, in addition to the structure in the second embodiment, a support device for preventing drop-off of the roller 50 from the retainer 51 may be attached to the retainer 51. This structure makes it possible to prevent the rollers 50 from dropping out of the retainer 51 during an operation of attaching to the crankshaft 48 the retainer 51 holding the rollers 50. This supporting device may be designed to be detachable after the first to third eccentric portions 48a to 48c of the crankshaft 48 and the first to third bearings 49a to 49c are installed in the first through-holes 44e of the externally-toothed gears 44a to 44d.

While the second embodiment has been described in connection with one example where the three crankshafts 48 adapted to be rotated in conjunction with the input shaft 21 are disposed along the circumferential direction at even intervals, and the first to third externally-toothed gears 44a to 44c are attached, respectively, to the crankshafts 48 through the first to third bearings 49a to 49c, the present invention is not limited to this structure, but a single crankshaft adapted to be rotated in conjunction with the input shaft 21 may be disposed on an axis of the input shaft 21, and the first to third externally-toothed gears may be attached to the crankshaft through the first to third bearings (e.g. the structure disclosed in the Japanese Patent Laid-Open Publication No. 64-15556 described in the "Description of the Related Art").

Further, while the roller bearing in the third embodiment has been applied to a differential/oscillating type speed reducer, the present invention is not limited to such a manner, but the roller bearing in the third embodiment may be applied to any other suitable type of speed reducer.

While the roller bearing in the third embodiment has been used for supporting the first to third eccentric portions 48a to 48c of the crankshaft 48 of a differential/oscillating type speed reducer, the present invention is not limited to such a manner, but the roller bearing in the third embodiment may be used for any other suitable purpose of supporting a shaft member inserted onto a through-hole of a given member.

While the retainer 151 in the third embodiment has been designed to have the three columns 151b, the present invention is not limited to this structure, but the number of columns 151b to be provided in the retainer 151 may be any other suitable plural number other than three.

While the retainer 151 in the third embodiment has been designed to arrange the five rollers 150 between the adjacent columns 151b, 151b, the present invention is not limited to this structure, but the number of rollers 150 to be interposed between the adjacent columns 151b, 151b may be any other suitable plural number other than five. In this case, the number of rollers to be interposed between the adjacent columns 151b, 151b means a maximum number of rollers capable to interposed therebetween.

While the fourth embodiment has been described in connection with one example where the third and fourth connection portions 248i, 248j having distinctive features are applied to the crankshaft 248 formed with the first to third eccentric portions 248d to 248f, in such a manner that the third connection portion 248i connects the first eccentric portions 248d and the second eccentric portion 248e, and the fourth connection portion 248j connects the second eccentric portions 248e and the third eccentric portion 248f, the present invention is not limited to this structure. For example, the second and third eccentric portion 248e, 248f may be omitted from the crankshaft 248 in the fourth embodiment to leave only a single eccentric portion (e.g. the first eccentric portions 248d). Then, the crankshaft 248 may be designed to align the first shaft portion 248b, the first connection portion 248g, the first eccentric portions 248d, the second connection portion 248h and the second shaft portion 248c, along the axial direction in this order, and apply the above feature to the first connection portion 248g and the second connection portion 248h. More specifically, in the crankshaft 248 formed with the first shaft portion 248b, the first connection portion 248g, the first eccentric portions 248d, the second connection portion 248h and the second shaft portion 248c, along the axial direction in this order, the crankshaft 248 may be designed such that: the first connection portion 248g is formed over an overlapping area between the first shaft portion 248b and the first eccentric portion 248d and an area of the first eccentric portion 248d protruding from the overlapping area, when viewed in the axial direction; and the first connection portion 248g has an outer periphery partially defined by an arc which extends within the protruding area of the first eccentric portion 248d and has a center located coaxially with the axis C1 of the first shaft portion 248b, in a section perpendicular to the axial direction.

Further, the crankshaft 248 may be designed such that: the second connection portion 248h is formed over an overlapping area between the second shaft portion 248c and the third eccentric portion 248f and an area of the third eccentric portion 248f protruding from the overlapping area, when viewed in the axial direction; and the second connection portion 248h has an outer periphery partially defined by an arc which extends within the protruding area of the third eccentric portion 248f and has a center located coaxially with the axis C2 of the second shaft portion 248c, in a section perpendicular to the axial direction.

Thus, as compared with a crankshaft designed such that, when viewed in the axial direction, the first connection portion 248g is formed in an area less than the overlapping area between the first shaft portion 248b and the first eccentric portion 248d, and the second connection portion 248h is formed in an area less than the overlapping area between the second shaft portion 248c and the third eccentric portion 248f, respective sectional areas of the first connection portion 248g and the second connection portion 248h can be increased, in a section perpendicular to the axial direction. This makes it possible to increase respective strengths in the first connection portion 248g and the second connection portion 248h so as to provide enhanced strength in the crankshaft 248 having the single first eccentric portion 248d.

Further, the first connection portion 248g has an outer periphery partially defined by an arc which extends within the area of the first eccentric portion 248d protruding from the overlapping area between the first shaft portion 248b and the first eccentric portion 248d and has a center located coaxially with the axis C1 of the first shaft portion 248b, in a section perpendicular to the axial direction. Thus, the outer periphery of the first connection portion 248g within the protruding area of the first eccentric portion 248d, and the first shaft portion 248b, can be formed by cutting the crankshaft material 200 while rotating the crankshaft material 200 about the axis C1 of the first shaft portion 248b. Furthermore, in the above crankshaft 248, the second connection portion 248h has an outer periphery partially defined by an arc which extends within the area of the third eccentric portion 248f protruding from the overlapping area between the second shaft portion 248c and the third eccentric portion 248f and has a center located coaxially with the axis C2 of the second shaft portion 248c, in a section perpendicular to the axial direction. Thus, the outer periphery of the second connection portion 248h within the protruding area of the third eccentric portion 248f, and the second shaft portion 248c, can be formed by cutting the crankshaft material 200 while rotating the crankshaft material 200 about the axis C2 of the second shaft portion 248c. This makes it possible to form the outer periphery of the first connection portion 248g within the protruding area of the first eccentric portion 248d, and the first shaft portion 248b, without changing a rotational axis of the crankshaft material 200, and to form the outer periphery of the second connection portion 248h within the protruding area of the third eccentric portion 248f, and the second shaft portion 248c, without changing a rotational axis of the crankshaft material 200. Thus, the above crankshaft 248 also makes it possible to reduce a process time and operational burden required for changing the rotational axis of the crankshaft material 200 during machining of the crankshaft 248, so as to simplify the production process of the crankshaft 248.

The features of the present invention applied to the above first second connection portions 248g, 248h may also be applied to the first second connection portions 248g, 248h for the first to third eccentric portions 248d to 248f in the fourth embodiment.

Figure 32:
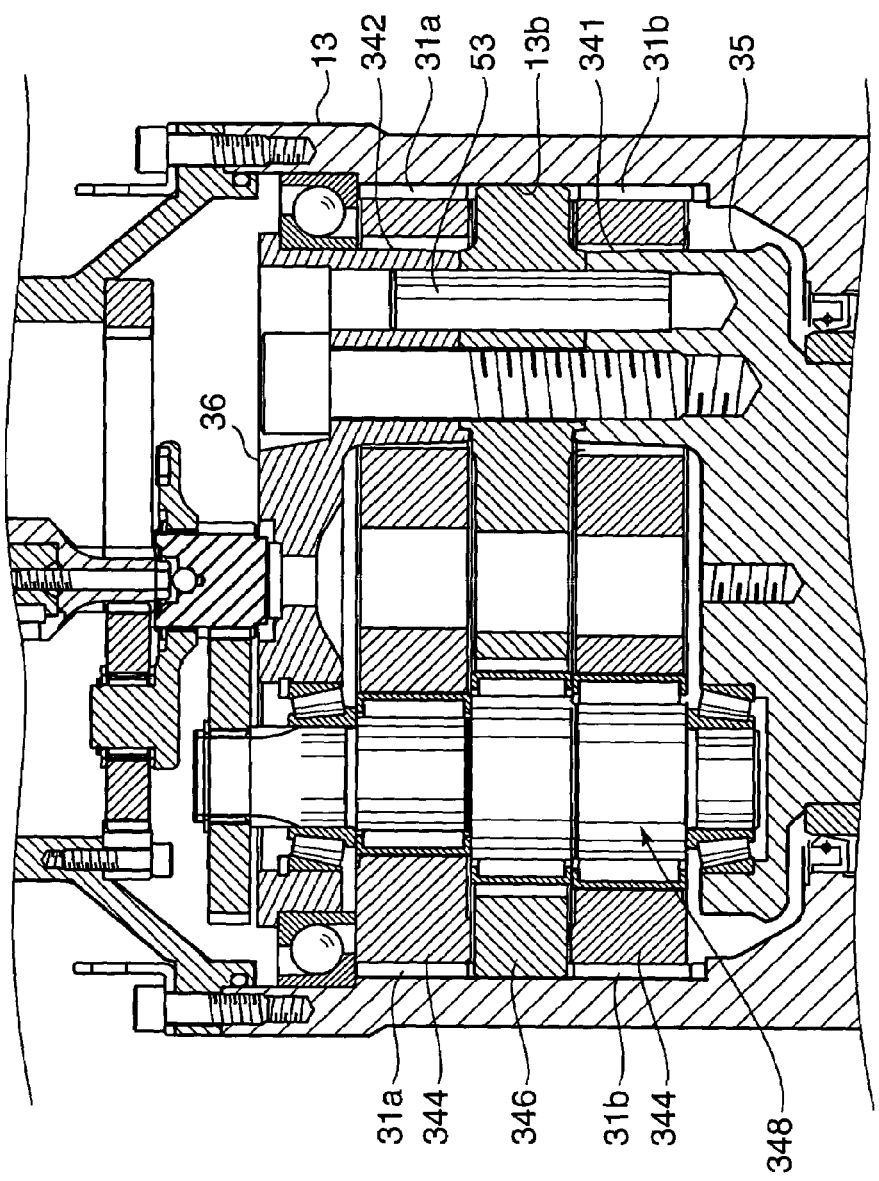
FIG. 32 is a fragmentary sectional view showing a differential/oscillating type speed reducer according to another embodiment of the present invention.

Further, while the fifth embodiment has been described in connection with one example where the outer peripheral surface of the intermediate bearing member 346 comes into contact with the pin teeth 31, the present invention is not limited to this structure. For example, as shown in FIG. 32, each of the pin teeth 31 is divided into a first pin tooth 31a associated with one of the externally-toothed gears 344, and a second pin tooth 31b associated with the other externally-toothed gear 344, and a gap equivalent to a thickness of the intermediate bearing member 346 is defined between the first pin tooth 31a and the second pin tooth 31b. This structure allows the intermediate bearing member 346 to be in contact with an inner peripheral surface 13b of the cylinder member 13. In this structure, the outer peripheral surface of the intermediate bearing member 346 is supported by the cylinder member 13, as with the fifth embodiment.

While the fifth embodiment has been described in connection with one example where each of the shaft portions 337 is divided into the base-side shaft portion 341 and the end-side shaft portion 342, to allow the intermediate bearing member 346 to be clamped therebetween, the present invention is not limited to this structure. For example, a gap may be formed between the intermediate bearing member 346 and each of the shaft portions 337, to support the intermediate bearing member 346 only by the cylinder member 13. However, in view of assuring high support rigidity for the intermediate bearing member 346, it is preferable to clamp the intermediate bearing member 346 between the base-side shaft portion 341 and the end-side shaft portion 342, as in the fifth embodiment.

Figure 33:
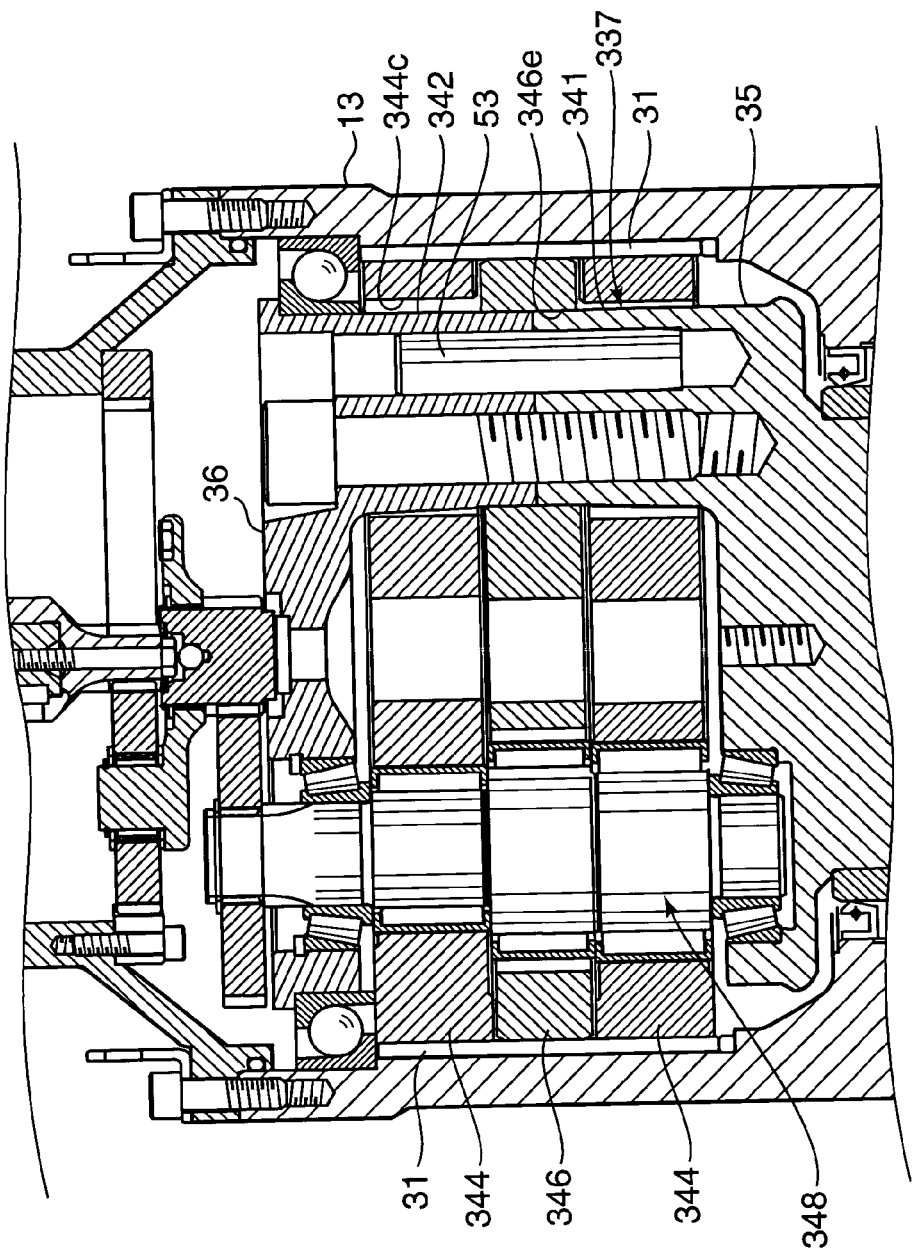
FIG. 33 is a fragmentary sectional view showing a differential/oscillating type speed reducer according to another embodiment of the present invention.
Figure 34:
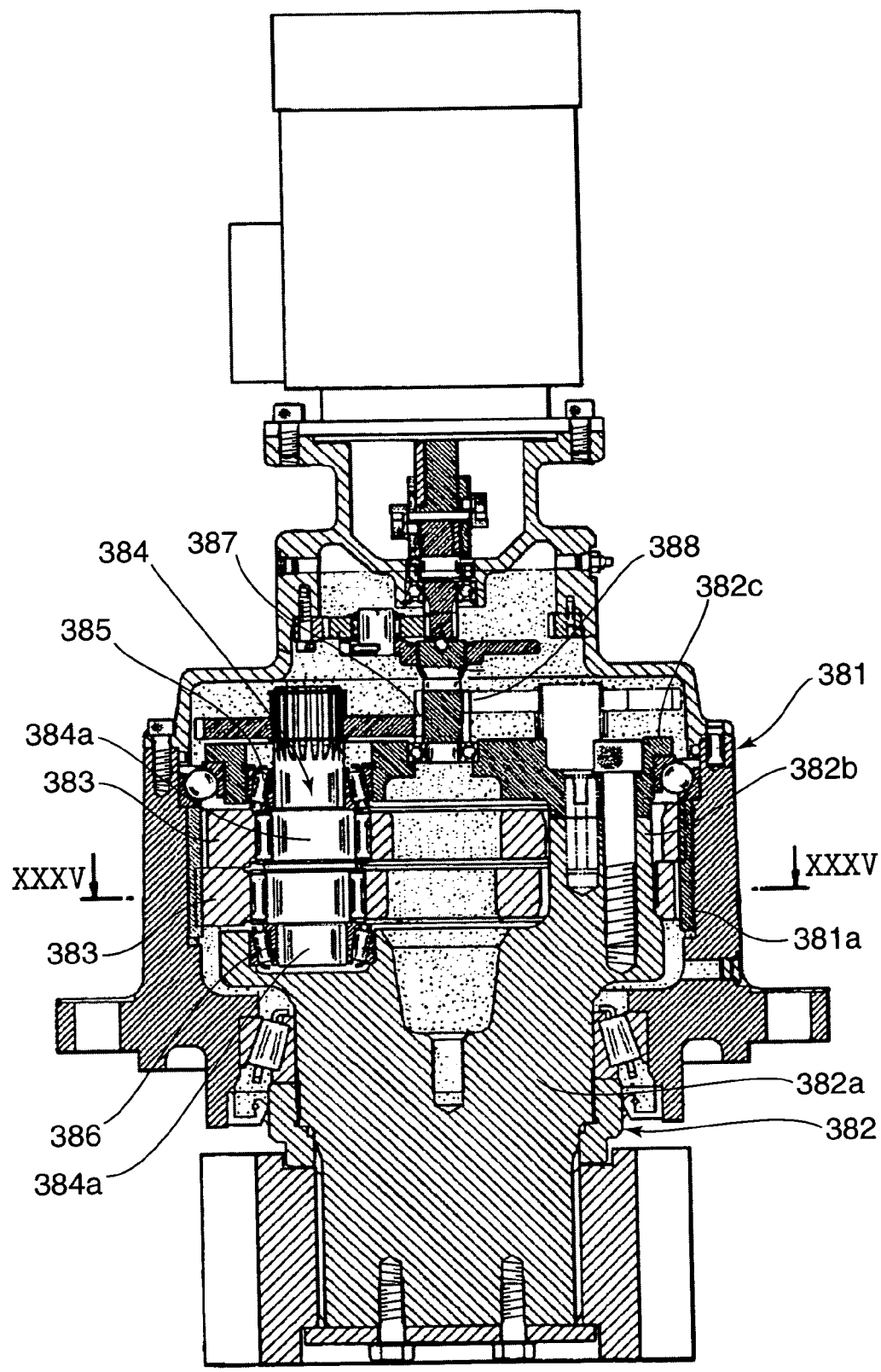
FIG. 34 is a sectional view showing a conventional differential/oscillating type speed reducer.
Figure 35:
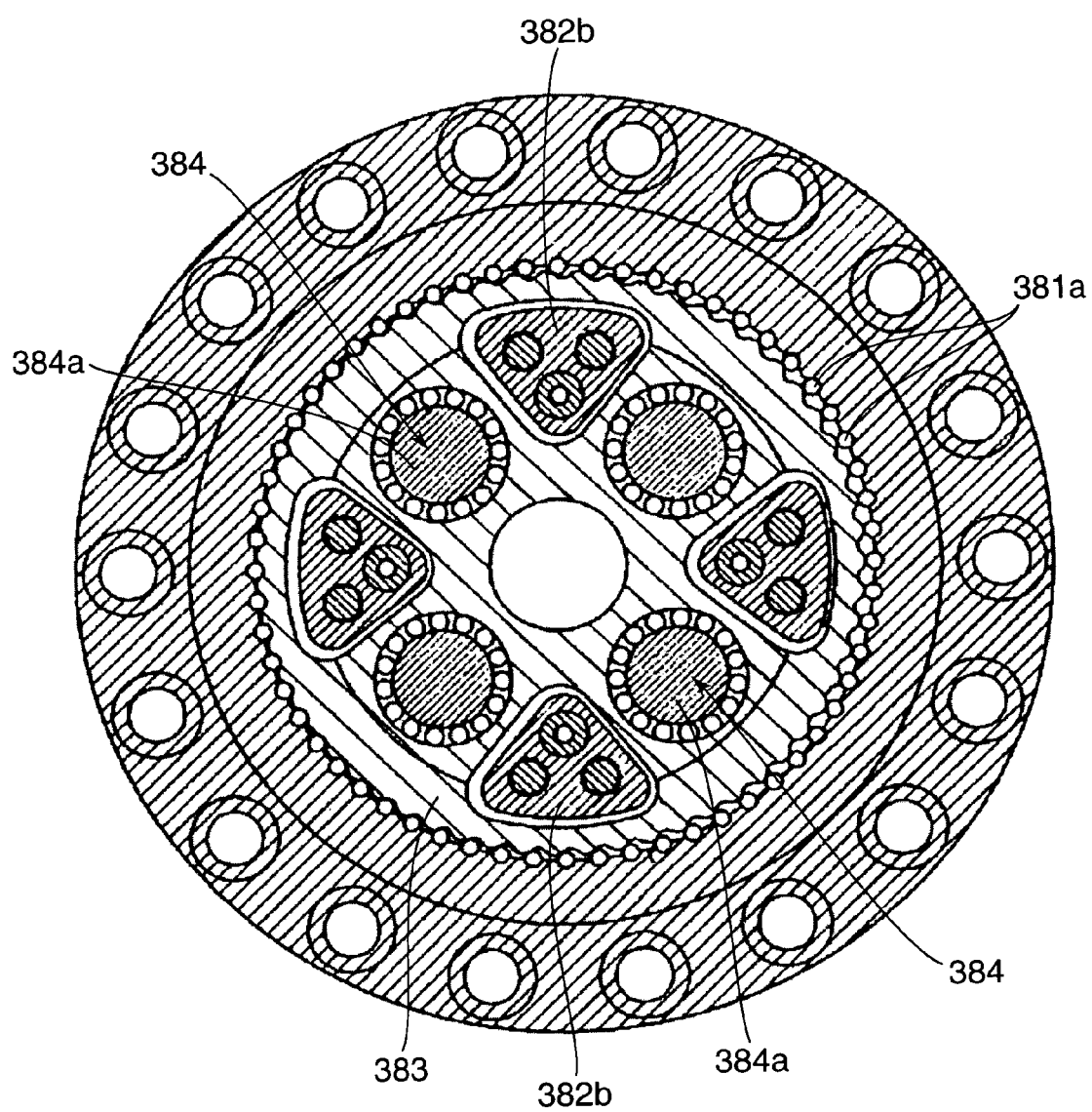
FIG. 35 is a sectional view taken along the line XXXV-XXXV in FIG. 34.

Alternatively, as shown in FIG. 33, the base-side shaft portion 341 and the end-side shaft portion 342 may be designed to be directly connectable to each other, and the intermediate bearing member 346 may be formed with a shaft insertion hole 346e for allowing the shaft portion 337 to penetrate therethrough. Further, the intermediate bearing member 346 may be designed to be engageable with a side surface of the shaft portion 337. In this case, each of the base-side shaft portion 341 and the end-side shaft portion 342 may be formed in a tapered shape having a sectional area which gradually decreases toward a protrusion direction thereof to facilitate an engagement between the shaft insertion hole 346e and each side surface of the shaft portions 341, 342. In this case, the original one-piece shaft portion 337 before being divided into the base-side shaft portion 341 and the end-side shaft portion 342 may also be used. Specifically, the shaft portion 337 may be formed to either one of the base member 35 and the end plate member 36, and the shaft portion 337 may be defined to be fastened to the other member. Alternatively, the shaft portion 337, the base member 35 and the end plate member 36 may be formed as separated components individually, and may be designed to be fastened together.

While the number of crankshafts 348 in the fifth embodiment has been three, it may be appropriately changed to any other suitable value, such as one or four.

While the crankshaft 348 in the fifth embodiment has been designed to be disposed eccentrically to the drive shaft 25, it may be disposed coaxially with the drive shaft 25. In this case, the crankshaft 348 may be rotated at speed reduced relative to that of the input shaft 21, or may be connected directly to the input shaft 21.

While the above embodiments have been described in connection with one example where the speed reducer 10 is designed as a pitch controller of wind power generation equipment, the present invention is not limited to this application, but may be used, for example, as a speed reducer for a robot arm, a traveling motor or revolving motor for construction machines. Further, the present invention may be used as a speed reducer of a type in which an internally-toothed gear is rotated to generate an output, as seen in a traveling mechanism for construction machines.

The present invention may be summarized as follows.

The present invention provides a speed reducer which comprises a crankshaft adapted to be rotated in conjunction with a drive unit, a first eccentric portion provided on the crankshaft, a second eccentric portion provided on the crankshaft, a third eccentric portion provided on the crankshaft, a first externally-toothed gear adapted to be moved in conjunction with the first eccentric portion, a second externally-toothed gear adapted to be moved in conjunction with the second eccentric portion, a third externally-toothed gear adapted to be moved in conjunction with the third eccentric portion, a plurality of pin teeth disposed along an inner periphery of a case to allow each of the first, second and third externally-toothed gears to be in meshing engagement therewith, and an output shaft unit adapted to be rotated in conjunction with the first, second and third externally-toothed gears. The first, second and third eccentric portions are arranged with a given phase difference in a rotation direction of the crankshaft with respect to each other. In the speed reducer, each of the first, second and third externally-toothed gears is designed to be in meshing engagement with less than half of the plurality of pin teeth.

According to the above speed reducer of the present invention, the angular range of meshing engagement between each of the externally-toothed gears and the pin teeth becomes less than 180 degrees. Thus, even if there exist certain ones of the pin teeth are simultaneously in meshing engagement with two of the externally-toothed gears, the number of such pin teeth can be reduced. That is, the number of pin teeth to be subjected to sliding movement of the externally-toothed gears can be reduced to suppress an increase in rotational resistance. This makes it possible to suppress an increase in rotational loss to be caused when the externally-toothed gears are rotated while being meshed with the pin teeth.

In the speed reducer of the present invention, preferably, a sum of the respective numbers of pin teeth in meshing engagement with the first, second and third externally-toothed gears is equal to a total number of the plurality of pin teeth.

According to this specific embodiment, a sum of the respective numbers of pin teeth in meshing engagement with the externally-toothed gears is equal to a total number of the pin teeth. This makes it possible to maximally prevent each pin teeth from being simultaneously meshed with two of the externally-toothed gears.

Further, when a total number of the plurality of pin teeth is an integral multiple of three, and the first, second and third eccentric portions are arranged to have a phase difference of 120 degrees with respect to each other, the first, second and third externally-toothed gears are preferably in meshing engagement, respectively, with first, second and third one-thirds of the plurality of pin teeth.

According to this specific embodiment, the externally-toothed gears can be evenly disposed around the crankshaft to reduce an eccentric load to be imposed on the crankshaft and vibration due to the eccentric load. In addition, one-thirds of the pin teeth come into meshing engagement with the externally-toothed gears, respectively. Thus, each of the pin teeth can be reduced in diameter to facilitate reduction in size of the entire reducer. The capability to reduce a diameter of the pin tooth also allows the number of pin teeth to be increased so as to extend a selectable range of speed reduction ratio to provide enhanced flexibility in design.

Preferably, at least either one of the first, second and third externally-toothed gears has external teeth each formed such that a length of an addendum is less than that of a dedendum.

According to this specific embodiment, the number of pin teeth to be meshed with each of the externally-toothed gears can be reduced to less than half of the pin teeth arranged in the case only by reducing a length of the addendum without the need for changing design of other component. This makes it possible to reduce burden in design required for narrowing the angular range of meshing between each of the externally-toothed gears and the pin teeth.

The present invention provides a speed reducer which comprises an eccentric shaft provided with a first eccentric portion, a second eccentric portion and a third eccentric portion in a serial arrangement along an axial direction thereof, and adapted to be rotated in conjunction with an input shaft, a first externally-toothed gear attached to the first eccentric portion through a first bearing and adapted to be oscillatingly moved in conjunction with the first eccentric portion, a second externally-toothed gear attached to the second eccentric portion through a second bearing and adapted to be oscillatingly moved in conjunction with the second eccentric portion, a third externally-toothed gear attached to the third eccentric portion through a third bearing and adapted to be oscillatingly moved in conjunction with the third eccentric portion, and an output shaft unit adapted to be rotated in conjunction with the first, second and third externally-toothed gears. In this speed reducer, the first, second and third eccentric portions are arranged to have a given phase difference with respect to each other and formed to have substantially the same outer diameter, the first bearing, the second bearing and the third bearing are attached, respectively, to the first eccentric portion, the second eccentric portion and the third eccentric portion, in such a manner as to have substantially the same outer diameter, and the second bearing includes a plurality of rollers, and a retainer holding the plurality of rollers around the second eccentric portion at given intervals while holding at least one of the plurality of rollers detachably in a radially outward direction or an axial direction of the second eccentric portion.

According to this speed reducer of the present invention, the retainer of the second bearing holds the rollers around the second eccentric portion at given intervals, and holds at least one of the plurality of rollers detachably in a radially outward direction or an axial direction of the second eccentric portion. Thus, in advance of an operation of attaching the second bearing from the side of the first or third eccentric portion along the eccentric shaft and fitting the second bearing onto the second eccentric portion, the roller can be detached from the retainer. In this case, at least one of the rollers having the risk of interference with the first or third eccentric portion can be detached to avoid interference with the first or third eccentric portion. Thus, the remaining rollers held by the retainer can be moved to pass through the first or third eccentric portion. This makes it possible to move the second bearing along the eccentric shaft and fit the second bearing onto the second eccentric portion as an intermediate one of the three eccentric portions, without difficulty. Further, in this speed reducer, each of first, second and third eccentric portions has substantially the same outer diameter, and each of the first, second and third bearings is attached to an associated one of the first, second and third eccentric portions, in such a manner as to have substantially the same outer diameter. Thus, each of the first, second and third externally-toothed gears to be attached to an associated one of the first, second and third eccentric portions through the respective first, second and third bearings can be formed with a mounting hole having substantially the same inner diameter. This allows each of the first, second and third externally-toothed gears to have a common structure/dimension so as to reduce the number of component types for use in the speed reducer and thereby simplify production process and component management during production.

In the above speed reducer of the present invention, it is preferable that the retainer of the second bearing has a pair of circular ring portions which are fitted onto the second eccentric portion and disposed spaced apart from each other in the axial direction of the second eccentric portion by a given distance to set out respective positions of the plurality of rollers in the axial direction of the second eccentric portion, and a plurality of column portions which are formed to bridge between the pair of circular ring portions and disposed along a circumferential direction of the circular ring portions at given intervals to set out respective positions of the plurality of rollers along a circumferential direction of the second eccentric portion. Each of the circular ring portions may have an inner diameter allowing each of the first and second eccentric portions or each of the second and third eccentric portions to fall therewithin when viewed in the axial direction of the eccentric shaft. According to this specific embodiment, when viewed in the axial direction of the circular ring portions, the rollers can be reliably held around the second eccentric portion at given intervals by the retainer with a simplified structure comprising the circular ring portions and column portions. In addition, in the retainer comprising the circular ring portions and column portions, each of the circular ring portions has an inner diameter allowing each of the first and second eccentric portions or each of the second and third eccentric portions to fall therewithin when viewed in the axial direction of the eccentric shaft. This makes it possible to avoid interference between each of the circular ring portions and the first or third eccentric portion, during the operation of attaching the second bearing from the side of the first or third eccentric portion along the eccentric shaft and fitting the second bearing onto the second eccentric portion.

Further, each of the circular ring portions of the retainer preferably has an inner diameter greater than a value of the following formula: $d+2e \cdot \sin(\theta/2)$, wherein: $d$ is an outer diameter of the second eccentric portion; $e$ is an eccentric distance between an axis of the eccentric shaft and an axis of each of the first, second and third eccentric portions; and $\theta$ is an angle of the phase difference between two of the first, second and third eccentric portions. According to this specific embodiment, when viewed in the axial direction of the circular ring portions, each of the circular ring portions has an inner diameter allowing each of the first and second eccentric portions or each of the second and third eccentric portions to fall therewithin when viewed in the axial direction of the eccentric shaft. This makes it possible to reliably avoid interference between each of the circular ring portions and the first or third eccentric portion, during the operation of attaching the second bearing from the side of the first or third eccentric portion along the eccentric shaft and fitting the second bearing onto the second eccentric portion.

In the above holder comprising the circular ring portions and the column portions, the column portions of the retainer are preferably formed to support an inside region of the plurality of rollers relative to a circle passing through respective axes of the plurality of rollers. According to this specific embodiment, the retainer with a structure capable of holding the rollers around the second eccentric portion at given intervals and holding the rollers detachably in the radially outward direction of the second eccentric portion can be readily prepared.

Preferably, a method of producing the above speed reducer, comprises detaching at least one of the plurality of rollers from the retainer before attaching the second bearing to the second eccentric portion, slidingly moving the retainer devoid of the at least one detached roller, from the side of the first or third eccentric portion along the eccentric shaft, and fitting the retainer onto the second eccentric portion, and then returning the at least one detached roller to the retainer. According to this speed-reducer production method, in advance of an operation of attaching the second bearing from the side of the first or third eccentric portion along the eccentric shaft and fitting the second bearing onto the second eccentric portion, at least one of the rollers having the risk of interference with the first or third eccentric portion is detached to avoid interference with the first or third eccentric portion. Thus, the remaining rollers held by the retainer can be moved to pass through the first or third eccentric portion. Then, the detached roller is retuned to the retainer. This makes it possible to move the second bearing along the eccentric shaft and fit the second bearing onto the second eccentric portion as an intermediate one of the three eccentric portions, without difficulty.

The present invention provides a roller bearing for supporting a shaft member inserted into a circular-shaped through-hole formed in a given member, which comprises a plurality of rollers each disposed between an inner wall surface of the through-hole and an outer peripheral surface of the shaft member, and a retainer for holding the plurality of rollers around the shaft member. The retainer includes a pair of circular ring portions adapted to be fitted onto the shaft member or into the through-hole, at positions adjacent, respectively, to axially opposite ends of each of the plurality of rollers so as to restrict an axial movement of the plurality of rollers, and a column portion having opposite ends each connected to a corresponding one of the pair of circular ring portions, the column portion being disposed between first and second ones of the plurality of rollers which are located in adjacent relation to each other, to restrict a movement of the plurality of rollers in a circumferential direction of the shaft member. The retainer includes a plurality of the column portions disposed along a circumferential direction of the circular ring portions at given intervals while interposing at least two or more of the plurality of rollers between adjacent ones of the column portions.

According to the roller bearing of the present invention, at least two or more of the rollers are interposed between adjacent ones of the column portions. Thus, as compared with a retainer designed to arrange column portions, respectively, in all spaces between the rollers, the number of column portions is reduced, and thereby the number of rollers to be disposed around the shaft member. This makes it possible to disperse a load to be imposed on the rollers from the shaft member so as to provide enhanced durability of the rollers. Further, according to this roller bearing, the opposite ends of each of the column portions are connected, respectively, to the pair of circular rings. Thus, differently from the conventional retainer where one end of the column portion is not fixed, the column portions can suppress the problem that when a certain force is applied from the rollers to the column portion, the column portion is pressed by the force and undesirably displaced. This makes it possible to suppress wobbling of the rollers due to the displacement of the column portions, and prevent the rollers from being obliquely inclined due to the wobbling, so as to avoid problems that an excessive load is imposed on the rollers due to the inclination of the rollers, and the rollers are damaged due to the excessive load. In addition, according to this roller bearing, the retainer adapted to hold the plurality of rollers around the shaft member has the plurality of column portions each disposed between first and second ones of the rollers which are located in adjacent relation to each other, to restrict the movement of the rollers in the circumferential direction of the shaft member. These column portions can restrict the movement of the rollers in the circumferential direction of the shaft member. Thus, as compared with a roller bearing where only the plurality of rollers are disposed around each of the shaft member without interposing the column portions therebetween, the retainer can suppress the problem that a clearance between the rollers is unevenly defined in the circumferential direction of the shaft member. This makes it possible to reduce a burden required for evenly adjusting the clearances between the rollers during the operation of installing the roller bearing in the shaft member, and the entire burden in the operation of installing the roller bearing in the shaft member.

In the above roller bearing of the present invention, each of the column portions preferably includes a region located on a circle passing through respective axes of the plurality of rollers, the region being adapted to come into contact with respective outer peripheral surfaces of the adjacent rollers on the circle.

According to this specific embodiment, the column portion is in contact with the outer peripheral surfaces of the rollers on the circle. Thus, even if a force in the circumferential direction of the shaft member, i.e., a circumferential direction of the circle, acts on the rollers, the outer peripheral surfaces of the rollers is never slidingly moved relative to the column portion. This makes it possible to effectively suppress the movement of the rollers in the circumferential direction of the shaft member so as to effectively prevent wobbling of the rollers in the circumferential direction of the shaft member.

The present invention provides a speed reducer which comprises the roller bearing, an internally-toothed gear having internal teeth disposed along an inner peripheral portion thereof, an externally-toothed gear having external teeth disposed around an outer peripheral portion thereof, and being in meshing engagement with the internal teeth and having a number of teeth less than that of the internal teeth, a crankshaft having an eccentric portion, and a pair of crankshaft bearings supporting the crankshaft. In this speed reducer, the externally-toothed gear has a circular-shaped through-hole penetrating therethrough in an axial direction thereof, and the eccentric portion of the crankshaft is inserted into the through-hole. Further, the roller bearing supports the eccentric portion of the crankshaft. The plurality of rollers are disposed between an inner wall surface of the through-hole and an outer peripheral surface of the eccentric portion, and the pair of circular ring portions of the retainer are fitted onto the eccentric portion of the crankshaft or into the through-hole. The column portions of the retainer are adapted to restrict a movement of the plurality of rollers in a circumferential direction of the eccentric portion.

This speed reducer employs the above roller bearing so as to provide enhanced durability of the roller. In addition, damages in roller due to excessive load can be avoided. Further, as in the aforementioned effect of the roller bearing, this speed reducer can reduce a burden in the operational of installing the roller bearing in the shaft member.

The present invention provides a crankshaft which integrally comprises a first shaft portion adapted to be rotatably supported by a bearing, a second shaft portion formed to have an axis located coaxially with an axis of the first shaft portion and adapted to be rotatably supported by a bearing, a plurality of eccentric portions provided between the first shaft portion and the second shaft portion and each formed to have an axis eccentrically deviated from the axes of the first and second shaft portions, and a connection portion provided between adjacent ones of the eccentric portions to connect the adjacent eccentric portions to each other. In this crankshaft, each of the adjacent eccentric portions has a different rotational phase. The connection portion has a concave region formed to continue from a first one of the adjacent eccentric portions and located radially inward relative to the first eccentric portion. The connection portion is formed at least over an overlapping area between the adjacent eccentric portions and an area of the other second eccentric portion protruding from the overlapping area, when viewed in an axial direction of the first and second shaft portions. The connection portion has an outer periphery partially defined by an arc which extends within the protruding area of the second eccentric portion and has a center located coaxially with the axis of the first eccentric portion, in a section perpendicular to the axial direction.

According to the above crankshaft of the present invention, the connection portion has the concave region formed to continue from the first eccentric portion and located radially inward relative to the first eccentric portion. Thus, in a process of polishing the edge of the first eccentric portion, the concave region makes it possible to avoid interference between a polishing tool and a crankshaft material even if the polishing tool protrudes on the side of the second eccentric portion. This makes it possible to accurately polish the eccentric portion including its edge. In addition, according to the above crankshaft of the present invention, the connection portion is formed at least over the overlapping area between the first and second eccentric portions located on both sides thereof, and the area of the second eccentric portion protruding from the overlapping area, when viewed in the axial direction. Thus, as compared with a crankshaft where a connection portion is formed in an area less than the overlapping area between the adjacent first and second eccentric portions when viewed in the axial direction, a sectional area of the connection portion in the section perpendicular to the axial direction can be increased. Thus, the strength of the connection portion can be increased so as to provide enhanced strength of the crankshaft. Further, according to the above crankshaft of the present invention, when viewed in the axial direction, in a section perpendicular to the axial direction, the connection portion has an outer periphery partially defined by an arc which extends within the area of the second eccentric portion protruding from the overlapping area between the first and second eccentric portions and has a center located coaxially with the axis of the first eccentric portion. Thus, the first eccentric portion and the outer periphery of the connection portion within the protruding area of the second eccentric portion can be formed by cutting the crankshaft material while rotating the crankshaft material about the axis of the first eccentric portion. This makes it possible to form the outer periphery of the connection portion within the protruding area of the second eccentric portion, and the first eccentric portion, without changing a rotational axis of the crankshaft material. Thus, the above crankshaft makes it possible to reduce a process time and operational burden required for changing the rotational axis of the crankshaft material during machining of the crankshaft, so as to simplify the production process of the crankshaft.

In the above crankshaft of the present invention, a section of the connection portion along the axial direction preferable includes an inclined region formed in a linear taper shape within the protruding area of the second eccentric portion. Thus, the connection portion can have a shape smoothly connected to the first eccentric portion and the second eccentric portion. This makes it possible to reduce stress concentration occurring in each junction between the connection portion and the eccentric portion, as compared with a crankshaft where a step is formed in each junction between the connection portion and each of the first and second eccentric portions. Thus, the crankshaft can suppress the occurrence of cracks due to stress concentration in the junction between the connection portion and each of the first and second eccentric portions.

Preferably, a method of producing the above crankshaft, comprises the step of cutting a crankshaft material with a cutting tool while rotating the crankshaft material about the axis of the first eccentric portion, to form the outer periphery of the connection portion.

According to this crankshaft production method, a connection portion formed at least over an overlapping area between the adjacent first and second eccentric portions and an area of the second eccentric portion protruding from the overlapping area, when viewed in the axial direction can be formed in a crankshaft. This makes it possible to obtain a crankshaft having a connection portion formed between adjacent eccentric portions with enhanced strength.

Preferably, this method includes the step of forming the first eccentric portion. Further, the step of forming the outer periphery of the connection portion and the step of forming the first eccentric portion are performed by a continuous process of cutting the crankshaft material with a common cutting tool while rotating the crankshaft material about the axis of the first eccentric portion. In the crankshaft of the present invention, when viewed in the axial direction, in a section perpendicular to the axial direction, the connection portion has an outer periphery partially defined by an arc which extends within the area of the second eccentric portion protruding from the overlapping area between the first and second eccentric portions and has a center located coaxially with the axis of the first eccentric portion. Thus, the outer periphery of the connection portion within the protruding area of the second eccentric portion, and the first eccentric portion can be formed as a continuous cutting process without changing a rotational axis of the crankshaft material and the type of cutting tool. This makes it possible to reduce a process time and operational burden required for changing the rotational axis of the crankshaft material during machining of the crankshaft, so as to simplify the production process of the crankshaft.

The present invention provides a speed reducer which comprises the above crankshaft, an internally-toothed gear having internal teeth disposed around an inner peripheral portion thereof, a plurality of externally-toothed gears having external teeth disposed around an outer peripheral portion thereof, the external teeth being in meshing engagement with the internal teeth and having a number of teeth less than that of the internal teeth, a first crankshaft bearing rotatably supporting the first shaft portion of the crankshaft, and a second crankshaft bearing rotatably supporting the second shaft portion of the crankshaft. In this speed reducer, each of the plurality of externally-toothed gears has a circular-shaped through-hole penetrating therethrough in an axial direction thereof, and each of the plurality of eccentric portions of the crankshaft is inserted into the through-hole of a corresponding one of the plurality of externally-toothed gears through a bearing.

This speed reducer of the present invention employing the above crankshaft can utilize the above feature of the crankshaft having enhanced strength. Generally, if each diameter of the externally-toothed gears is reduced to facilitate reduction in size of the speed reducer, a torque required for rotating the externally-toothed gears will be increased, and thereby a load to be imposed on the crankshaft when transferring a torque from the crankshaft to rotate the externally-toothed gears will be increased. In this speed reducer of the present invention, the crankshaft can have enhanced strength as described above to suppress damages thereof. Thus, this speed reducer of the present invention can facilitate reduction in size while suppressing damages of the crankshaft.

The present invention provides a crankshaft which integrally comprises a first shaft portion adapted to be rotatably supported by a bearing, a second shaft portion formed to have an axis located coaxially with an axis of the first shaft portion and adapted to be rotatably supported by a bearing, a single eccentric portion provided between the first shaft portion and the second shaft portion and formed to have an axis eccentrically deviated from the axes of the first and second shaft portions, a first connection portion provided between the first shaft portion and the eccentric portion to connect the first shaft portion to the eccentric portion, and a second connection portion provided between the second shaft portion and the eccentric portion to connect the second shaft portion to the eccentric portion. In this speed reducer, the first connection portion has a concave region formed to continue from the first shaft portion and located radially inward relative to the first shaft portion. The first connection portion is formed over an overlapping area between the first shaft portion and the eccentric portion and an area of the eccentric portion protruding from the overlapping area, when viewed in an axial direction of the first and second shaft portions. The first connection portion has an outer periphery partially defined by an arc which extends within the protruding area of the eccentric portion and has a center located coaxially with the axis of the first shaft portion, in a section perpendicular to the axial direction. The second connection portion has a concave region formed to continue from the second shaft portion and located radially inward relative to the second shaft portion. The second connection portion is formed over an overlapping area between the second shaft portion and the eccentric portion and an area of the eccentric portion protruding from the overlapping area, when viewed in the axial direction. The second connection portion has an outer periphery partially defined by an arc which extends within the protruding area of the eccentric portion and has a center located coaxially with the axis of the second shaft portion, in a section perpendicular to the axial direction.

According to the crankshaft of the present invention, the first connection portion has a concave region formed to continue from the first shaft portion and located radially inward relative to the first shaft portion, and the second connection portion has a concave region formed to continue from the second shaft portion and located radially inward relative to the second shaft portion. Thus, even if the polishing tool protrudes toward the eccentric portion during a process of polishing the edge of the first shaft portion, interference between a polishing tool and a crankshaft material can be avoided. Further, even if the polishing tool protrudes toward the eccentric portion during a process of polishing the edge of the second shaft portion, interference between a polishing tool and a crankshaft material can be avoided. This makes it possible to accurately polish the eccentric portion including its both edges. In addition, according to the crankshaft of the present invention, the first connection portion is formed over an overlapping area between the first shaft portion and the eccentric portion and an area of the eccentric portion protruding from the overlapping area, when viewed in an axial direction of the first and second shaft portions. Further, the second connection portion is formed over an overlapping area between the second shaft portion and the eccentric portion and an area of the eccentric portion protruding from the overlapping area, when viewed in the axial direction. Thus, as compared with a crankshaft where a first connection portion is formed in an area less than the overlapping area between the first shaft portion and the eccentric portion when viewed in the axial direction, and a second connection portion is formed in an area less than the overlapping area between the second shaft portion and the eccentric portion when viewed in the axial direction, respective sectional areas of the first and second connection portions in the section perpendicular to the axial direction can be increased. Thus, respective strengths of the first and second connection portions can be increased so as to provide enhanced strength of the crankshaft. Furthermore, according to the crankshaft of the present invention, the first connection portion has an outer periphery partially defined by an arc which extends within the protruding area of the eccentric portion and has a center located coaxially with the axis of the first shaft portion, in a section perpendicular to the axial direction, and the second connection portion has an outer periphery partially defined by an arc which extends within the protruding area of the eccentric portion and has a center located coaxially with the axis of the second shaft portion, in a section perpendicular to the axial direction. Thus, the first shaft portion and the outer periphery of the first connection portion within the protruding area of the eccentric portion can be formed by cutting the crankshaft material while rotating the crankshaft material about the axis of the first shaft portion, and the second shaft portion and the outer periphery of the second connection portion within the protruding area of the eccentric portion can be formed by cutting the crankshaft material while rotating the crankshaft material about the axis of the second shaft portion. This makes it possible to form the outer periphery of the first connection portion within the protruding area of the eccentric portion, and the first shaft portion, without changing a rotational axis of the crankshaft material, and to form the outer periphery of the second connection portion within the protruding area of the eccentric portion, and the second shaft portion, without changing a rotational axis of the crankshaft material. Thus, the above crankshaft makes it possible to reduce a process time and operational burden required for changing the rotational axis of the crankshaft material during machining of the crankshaft, so as to simplify the production process of the crankshaft.

The present invention provides a speed reducer which comprises an input shaft member, a crankshaft provided with an eccentric portion and adapted to be rotated in conjunction with the input shaft member, a pair of crankshaft bearings supporting the crankshaft, an internally-toothed gear member having internal teeth disposed around at least a part in an axial direction of an inner peripheral portion thereof, an externally-toothed gear adapted to be oscillatingly moved in conjunction with the eccentric portion, and provided with external teeth in meshing engagement with the internal teeth, an output shaft unit adapted to be rotated in conjunction with the externally-toothed gear, and an intermediate bearing member rotatably supporting the crankshaft at a position between the pair of crankshaft bearings.

According to the above speed reducer of the present invention, in addition to the crankshaft bearings for supporting the crankshaft, the intermediate bearing member is disposed between the crankshaft bearings to further support the crankshaft. Thus, a load to be received by the crankshaft bearings can be reduced to allow the crankshaft bearings to be reduced in diameter while suppressing bending and deformation of the crankshaft, and facilitate reduction in size of the differential/oscillation type speed reducer.

In the above speed reducer of the present invention, the intermediate bearing member preferably has an outer peripheral surface supported by the internally-toothed gear member. According to this specific embodiment, the outer peripheral surface of the intermediate bearing member is supported by the internally-toothed gear member. Thus, an area of the intermediate bearing member to be supported can be increased, and the intermediate bearing member can be supported through the entire periphery thereof. This makes it possible to increase the supporting strength for the intermediate bearing member, and facilitate reduction in diameter of the intermediate bearing member. Further, the intermediate bearing member supported through the periphery thereof can avoid displacement to suppress bending and deformation of the crankshaft. This makes it possible to reduce a load acting on the crankshaft bearings so as to further facilitate reduction in diameter of the crankshaft bearings. Furthermore, the intermediate bearing member can be effectively supported without increasing the number of components.

In the above speed reducer, the output shaft unit may have a columnar portion formed in a columnar shape extending in an axial direction thereof, and the intermediate bearing member may be supported through an engagement with the columnar portion. According to this specific embodiment, the intermediate bearing member is supported by the columnar portion through its radially central region. Thus, a radial or circumferential movement of the intermediate bearing member can be restricted. This makes it possible to reduce a load acting on the crankshaft so as to facilitate reduction in diameter of the crankshaft. In this support structure, the intermediate bearing member may be engaged with the columnar portion in such a manner as to allow the axial movement or preclude the axial movement.

In the above speed reducer, the output shaft unit may have a plurality of columnar portions each formed in a columnar shape extending in an axial direction thereof, and the plurality of columnar portions may be disposed along a circumferential direction of the output shaft unit. Further, the intermediate bearing member may be supported by each of the columnar portions. According to this specific embodiment, the speed reducer includes the plurality of columnar portions. Thus, a torsional deformation of the columnar portions can be suppressed. Further, the intermediate bearing member can be fixed at a plurality of circumferential positions to effectively prevent the intermediate bearing member from being moved.

In this case, preferably, the columnar portion is axially divided into at least two pieces in such a manner as to clamp the intermediate bearing member from both sides thereof in the axial direction. In this case, the columnar portions can support the intermediate bearing member while clamping the intermediate bearing member from both sides thereof in the axial direction. Thus, the supporting strength for the intermediate bearing member can be effectively increased to reliably prevent wobbling of the intermediate bearing member.

Preferably, the intermediate bearing member is disposed at a central position between the pair of crankshaft bearings in an axial direction of the crankshaft. According to this specific embodiment, respective load to be received by the crankshaft bearings can be equalized. This makes it possible to support the crankshaft in well balanced manner, and prevent crankshaft from being increased in size.

Preferably, the speed reducer includes a plurality of the crankshafts each supported by one piece of the intermediate bearing member. According to this specific embodiment, the plurality of crankshafts can be supported by a common member. This makes it possible to provide enhanced supporting rigidity for the crankshafts while avoiding an increase in the number of components. While a plurality of intermediate bearing members arranged for each of the crankshafts involves the need for allowing the intermediate bearing members to be aligned with each other in the axial direction so as to avoid interference therebetween, the single common intermediate bearing member makes it possible to support all of the crankshafts at a single position between the crankshaft bearings so as to eliminate the need for increasing a length of the crankshaft.

This application is based on Japanese patent application serial No. 2005-278527, No. 2005-353269, No. 2006-055926, No. 2006-230898, No. 2006-230921, filed in Japan Patent Office on Sep. 26, 2005, Dec. 7, 2005, Mar. 2, 2006, Aug. 28, 2006 and Aug. 28, 2006, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A speed reducer comprising:
   a crankshaft adapted to be rotated in conjunction with a drive unit;
   a first eccentric portion provided on said crankshaft;
   a second eccentric portion provided on said crankshaft;
   a third eccentric portion provided on said crankshaft;
   a first externally-toothed gear adapted to be moved in conjunction with said first eccentric portion;
   a second externally-toothed gear adapted to be moved in conjunction with said second eccentric portion;
   a third externally-toothed gear adapted to be moved in conjunction with said third eccentric portion;
   a plurality of pin teeth disposed along an inner periphery of a case to allow each of said first, second and third externally-toothed gears to be in meshing engagement therewith; and
   an output shaft unit adapted to be rotated in conjunction with said first, second and third externally-toothed gears,
   wherein said first, second and third eccentric portions are arranged with a given phase difference in a rotation direction of said crankshaft with respect to each other,
   wherein each of said first, second and third externally-toothed gears is in meshing engagement with less than half of said plurality of pin teeth.

2. The speed reducer as defined in claim 1, wherein a sum of the respective numbers of pin teeth in meshing engagement with said first, second and third externally-toothed gears is equal to a total number of said plurality of pin teeth.

3. The speed reducer as defined in claim 1, wherein:
   a total number of said plurality of pin teeth is an integral multiple of three;
   said first, second and third eccentric portions are arranged to have a phase difference of 120 degrees with respect to each other; and
   said first, second and third externally-toothed gears are in meshing engagement, respectively, with first, second and third one-thirds of said plurality of pin teeth.

4. The speed reducer as defined in claim 1, wherein at least either one of said first, second and third externally-toothed gears has external teeth each formed such that a length of an addendum is less than that of a dedendum.

* * * * *